US012583606B2

(12) United States Patent
Bower et al.

(10) Patent No.: US 12,583,606 B2
(45) Date of Patent: Mar. 24, 2026

(54) SYSTEMS AND METHODS FOR AIRCRAFT ENERGY OPTIMIZATION

(71) Applicant: Archer Aviation Inc., San Jose, CA (US)

(72) Inventors: Geoffrey Christien Bower, Sunnyvale, CA (US); Nathan Thomas Depenbusch, Mountain View, CA (US); Nansi Xue, Redondo Beach, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 19/229,196

(22) Filed: Jun. 5, 2025

(65) Prior Publication Data

US 2025/0296692 A1      Sep. 25, 2025

Related U.S. Application Data

(63) Continuation of application No. PCT/US2024/036864, filed on Jul. 5, 2024.

(Continued)

(51) Int. Cl.
B64D 31/18          (2024.01)
B60L 15/38          (2006.01)
(Continued)

(52) U.S. Cl.
CPC .............. B64D 31/18 (2024.01); B60L 15/38 (2013.01); B64D 31/06 (2013.01); B64D 31/16 (2024.01);
(Continued)

(58) Field of Classification Search
CPC ..... B64D 31/18; B64D 31/06; B64D 2221/00
See application file for complete search history.

(56)                References Cited

U.S. PATENT DOCUMENTS 6,178,736  B1 *   1/2001   Massey ..................... F02C 7/26
                                                                  60/779
8,972,765  B1 *   3/2015   Krolak .................. H02J 7/0018
                                                                  713/340
(Continued)

FOREIGN PATENT DOCUMENTS

CN          112163269 A        1/2021
EP            3919375 A1      12/2021

OTHER PUBLICATIONS

International Search Report and Written Opinion of the International Search Authority in International Application No. PCT/US2024/036864 dated Oct. 1, 2024 (15 pages).

*Primary Examiner* — Mussa A Shaawat
(74) *Attorney, Agent, or Firm* — FINNEGAN, HENDERSON, FARABOW, GARRETT & DUNNER LLP

(57)                    ABSTRACT

Disclosed embodiments generally relate to systems and methods for flight control of aircrafts. In some embodiments, a flight control system is configured to determine desired commands for the electric aircraft, determine at least one reference command for an effector based on the desired commands and one or more aircraft conditions, monitor energy states of the plurality of battery packs, where at least a first battery pack of the plurality of battery packs is electrically isolated from at least a second battery pack of the plurality of battery packs, adjust the at least one reference command based on the monitored energy states of the plurality of battery packs, generate control commands for the plurality of effectors based on the adjusted at least one effector reference command, and control the plurality of effectors according to the generated control commands to meet the one or more desired commands of the electric aircraft.

28 Claims, 29 Drawing Sheets

Related U.S. Application Data

(60) Provisional application No. 63/512,784, filed on Jul. 10, 2023.

(51) Int. Cl.
  B64D 31/06          (2024.01)
  B64D 31/16          (2024.01)

(52) U.S. Cl.
  CPC ..... *B60L 2200/10* (2013.01); *B60L 2240/425* (2013.01); *B60L 2240/80* (2013.01); *B64D 2221/00* (2013.01)

(56)               References Cited

U.S. PATENT DOCUMENTS

| | | | | |
|---|---|---|---|---|
| 9,616,771 | B2 * | 4/2017 | Grossard | B60L 3/12 |
| 10,322,824 | B1 * | 6/2019 | Demont | B60L 50/40 |
| 10,608,304 | B2 * | 3/2020 | Ruehle | H01M 10/6557 |
| 11,065,979 | B1 * | 7/2021 | Demont | H02P 29/025 |
| 11,198,515 | B2 * | 12/2021 | Demizu | H02J 7/007182 |
| 11,447,035 | B1 * | 9/2022 | Hull | H02J 7/0029 |
| 12,415,438 | B2 * | 9/2025 | Bishai | B60L 58/12 |
| 2015/0353192 | A1 * | 12/2015 | Morrison | B64D 43/00 |
| | | | | 244/17.23 |
| 2017/0001511 | A1 * | 1/2017 | Kulkarni | B60L 50/40 |
| 2017/0057650 | A1 * | 3/2017 | Walter-Robinson | |
| | | | | B64D 27/357 |
| 2018/0321325 | A1 * | 11/2018 | Fortier | H01M 10/48 |
| 2019/0241274 | A1 * | 8/2019 | Hunkel | H02J 7/345 |
| 2020/0094982 | A1 | 3/2020 | Saunders et al. | |
| 2020/0339010 | A1 * | 10/2020 | Villanueva | B64F 1/36 |
| 2021/0091423 | A1 * | 3/2021 | Becker | B60L 58/22 |
| 2021/0339881 | A1 * | 11/2021 | Bevirt | B64D 27/24 |
| 2021/0394916 | A1 * | 12/2021 | Baig | H02J 9/061 |
| 2021/0394933 | A1 | 12/2021 | Kwon et al. | |
| 2022/0009625 | A1 * | 1/2022 | Bower | H02J 1/08 |
| 2022/0169398 | A1 * | 6/2022 | Ouellet | H02J 7/1446 |
| 2022/0234747 | A1 * | 7/2022 | Bower | B64D 27/31 |
| 2022/0350347 | A1 | 11/2022 | Hagerott et al. | |
| 2022/0397067 | A1 * | 12/2022 | Greenberg | B64D 33/00 |
| 2022/0402621 | A1 * | 12/2022 | McLean | B64D 27/355 |
| 2023/0249563 | A1 * | 8/2023 | Demont | B60L 15/04 |
| | | | | 307/9.1 |
| 2023/0347787 | A1 * | 11/2023 | Lohe | B60L 50/66 |
| 2023/0391463 | A1 * | 12/2023 | Bartsch | B64C 29/0033 |
| 2024/0069527 | A1 * | 2/2024 | Long | B64D 13/006 |
| 2024/0199220 | A1 * | 6/2024 | Silina | B64U 50/19 |
| 2025/0216919 | A1 * | 7/2025 | King | G06F 1/28 |

* cited by examiner

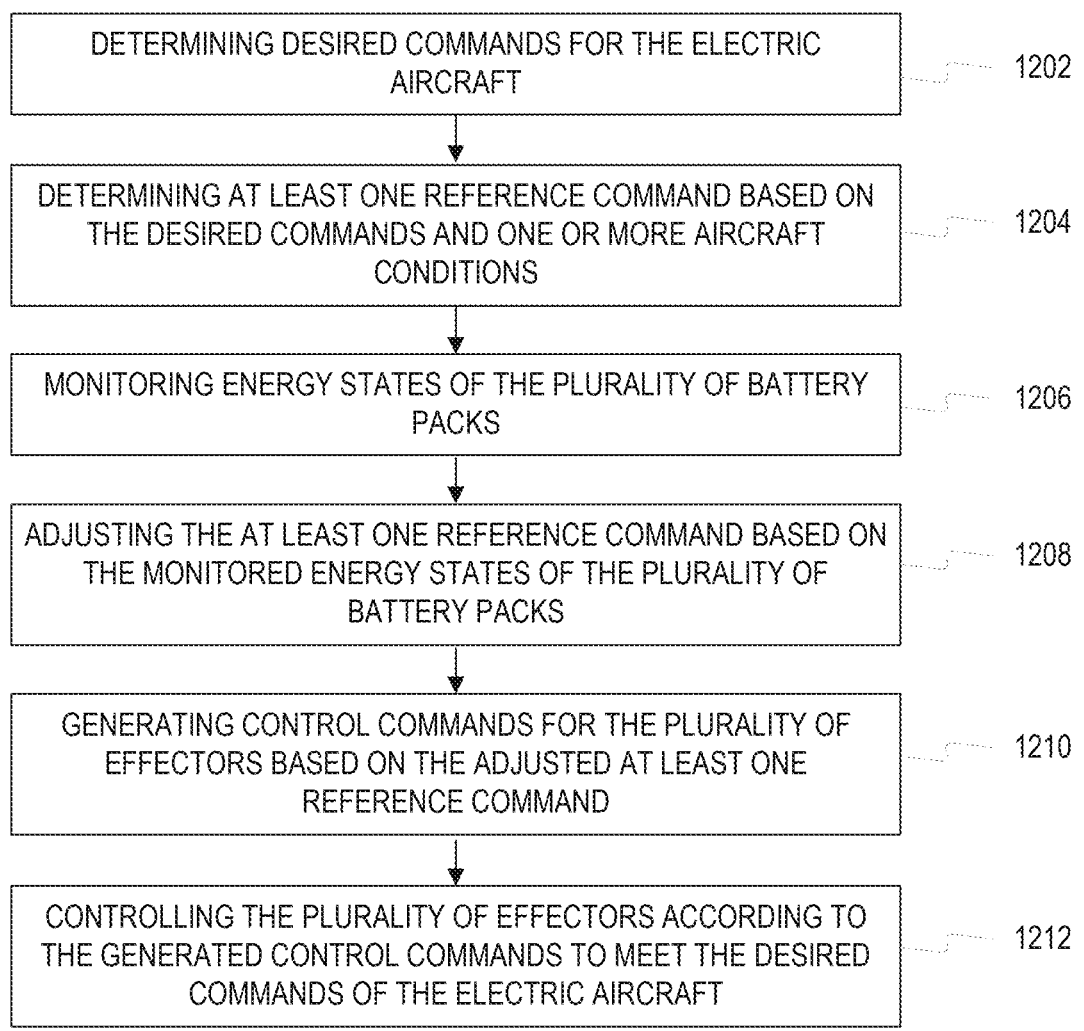

1200

DETERMINING DESIRED COMMANDS FOR THE ELECTRIC AIRCRAFT — 1202

DETERMINING AT LEAST ONE REFERENCE COMMAND BASED ON THE DESIRED COMMANDS AND ONE OR MORE AIRCRAFT CONDITIONS — 1204

MONITORING ENERGY STATES OF THE PLURALITY OF BATTERY PACKS — 1206

ADJUSTING THE AT LEAST ONE REFERENCE COMMAND BASED ON THE MONITORED ENERGY STATES OF THE PLURALITY OF BATTERY PACKS — 1208

GENERATING CONTROL COMMANDS FOR THE PLURALITY OF EFFECTORS BASED ON THE ADJUSTED AT LEAST ONE REFERENCE COMMAND — 1210

CONTROLLING THE PLURALITY OF EFFECTORS ACCORDING TO THE GENERATED CONTROL COMMANDS TO MEET THE DESIRED COMMANDS OF THE ELECTRIC AIRCRAFT — 1212

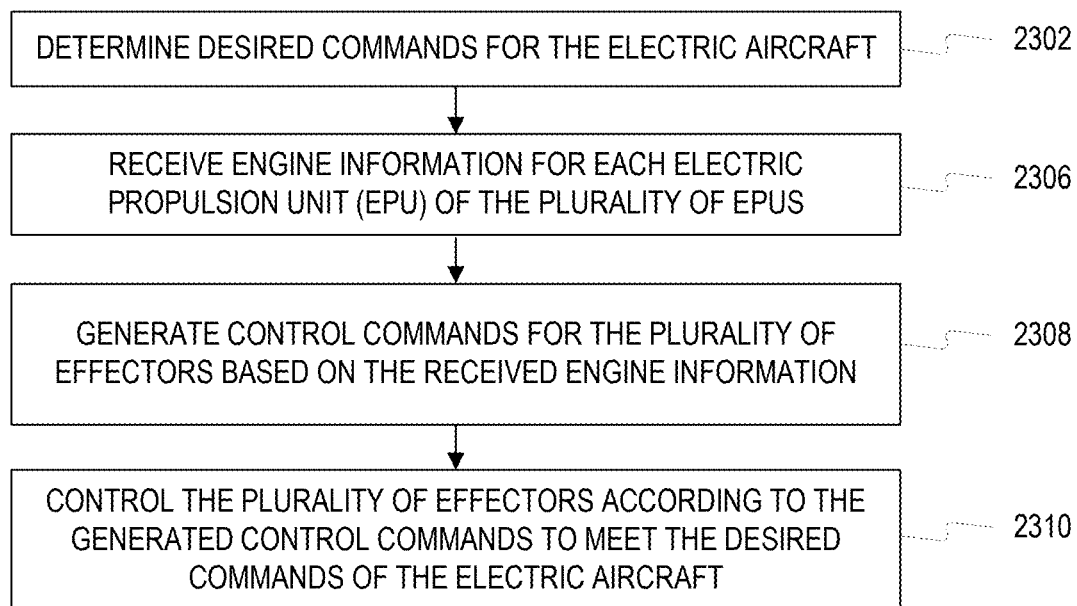

DETERMINE DESIRED COMMANDS FOR THE ELECTRIC AIRCRAFT — 2302

RECEIVE ENGINE INFORMATION FOR EACH ELECTRIC PROPULSION UNIT (EPU) OF THE PLURALITY OF EPUS — 2306

GENERATE CONTROL COMMANDS FOR THE PLURALITY OF EFFECTORS BASED ON THE RECEIVED ENGINE INFORMATION — 2308

CONTROL THE PLURALITY OF EFFECTORS ACCORDING TO THE GENERATED CONTROL COMMANDS TO MEET THE DESIRED COMMANDS OF THE ELECTRIC AIRCRAFT — 2310

FIG. 23

ALL ELECTRIC ENGINES HAVE THE SAME REFERENCE VALUES (E.G., $\tau_{REF}$ )
HV BUS #2 HAS HIGHER ENERGY THAN THE OTHERS, WHILE EE 8 IS HOTTER THAN THE REST ENERGY OPTIMIZATION IS PERFORMED FOR ALL ELECTRIC ENGINES EXCEPT EE 8, WHICH HAS THERMAL MANAGEMENT FACTORS APPLIED

SYSTEMS AND METHODS FOR AIRCRAFT ENERGY OPTIMIZATION

CROSS-REFERENCE TO RELATED APPLICATIONS

This disclosure claims priority to and is a continuation of International Application No. PCT/US2024/036864, titled "SYSTEMS AND METHOD FOR FLIGHT CONTROL OF AIRCRAFT," filed Jul. 5, 2024, which claims priority to U.S. Provisional Application No. 63/512,784, titled "SYSTEMS AND METHOD FOR FLIGHT CONTROL OF EVTOL AIRCRAFT," filed Jul. 10, 2023, the contents of which are incorporated herein in their entirety for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electrical or hybrid-electric propulsion systems (hereinafter referred to as electric propulsion units or "EPUs"). Vertical take-off and landing (VTOL) aircraft are aircraft that can take-off and land vertically and hover, providing the ability to carry travelers directly to their destination. Helicopters are VTOL aircraft that generate lift entirely through their rotors. Some VTOL aircraft have wings and propulsion systems that enable the wings to provide the lift required during forward flight. Some winged VTOL aircraft use separate propulsion systems for vertical thrust for use during take-off and landing and forward thrust for use during cruising. Other winged VTOL aircraft use tiltable propulsion systems that tilt between vertical thrust and forward thrust positions. Electric VTOL aircraft use electric propulsion units to provide thrust for vertical flight and forward flight. Many electric VTOL aircraft include moveable electric propulsion units in which the thrust vector of the propulsion unit can be changed, such as from an upward direction for vertical lift to a forward direction for forward flight. Many electric VTOL aircraft are over-actuated in that there are more actuator degrees of freedom than there are movement degrees of freedom. Control allocation is the problem of distributing control effort among multiple actuators in an over-actuated system, such as to optimize energy and manage temperatures of different aircraft components. Electric VTOL aircraft often include more propulsion units and other actuators than traditional aircraft and the prolusion units and other actuators strongly affect multiple control axes. Thus, electric VTOL aircraft can pose a greater control allocation problem than traditional aircraft.

SUMMARY

The present disclosure relates generally to flight control of electric aircraft and other powered aerial vehicles. More particularly, and without limitation, the present disclosure relates to innovations in tilt-rotor aircraft that use electrical propulsion systems. For example, certain aspects of the present disclosure relate to energy optimization and/or thermal management for an aircraft.

One aspect of the present disclosure comprises a method comprising determining one or more desired commands for the aircraft, determining at least one reference command based on the one or more desired commands and one or more aircraft conditions, monitoring energy states of a plurality of battery packs of the electric aircraft, wherein at least a first battery pack of the plurality of battery packs is electrically isolated from at least a second battery pack of the plurality of battery packs, adjusting the at least one reference command based on the monitored energy states of the plurality of battery packs, generating control commands for a plurality of effectors of the electric aircraft based on the adjusted at least one reference command, and controlling the plurality of effectors according to the generated control commands to meet the one or more desired commands of the electric aircraft.

Another aspect of the present disclosure comprises a system, including at least one processor configured to: determine at least one reference command based on the one or more desired commands and one or more aircraft conditions, monitor energy states of a plurality of battery packs of the electric aircraft, wherein at least a first battery pack of the plurality of battery packs is electrically isolated from at least a second battery pack of the plurality of battery packs, adjust the at least one reference command based on the monitored energy states of the plurality of battery packs, generate control commands for a plurality of effectors of the electric aircraft based on the adjusted at least one reference command, and control the plurality of effectors according to the generated control commands to meet the one or more desired commands of the electric aircraft.

Another aspect of the present disclosure comprises a non-transitory computer-readable medium storing one or more instructions that, when executed by at least one processor, cause the at least one processor to perform operations comprising: determining one or more desired commands for an electric aircraft, determining at least one reference command based on the one or more desired commands and one or more aircraft conditions, monitoring energy states of a plurality of battery packs of the electric aircraft, wherein at least a first battery pack of the plurality of battery packs is electrically isolated from at least a second battery pack of the plurality of battery packs, adjusting the at least one reference command based on the monitored energy states of the plurality of battery packs, generating control commands for a plurality of effectors of the electric aircraft based on the adjusted at least one reference command, and controlling the plurality of effectors according to the generated control commands to meet the one or more desired commands of the electric aircraft.

Another aspect of the present disclosure comprises a method comprising determining one or more desired commands for an electric aircraft, receiving engine information for at least one EPU of a plurality of EPUs of the electric aircraft, wherein the engine information includes at least one temperature associated with the at least one EPU, generating control commands for a plurality of effectors of the electric aircraft based on the received engine information, and controlling the plurality of effectors according to the generated control commands to meet the one or more desired commands of the electric aircraft.

Another aspect of the present disclosure comprises a system, including at least one processor configured to: determine one or more desired commands for an electric aircraft, receive engine information for at least one EPU of a plurality of EPUs of the electric aircraft, wherein the engine information includes at least one temperature associated with the at least one EPU, generate control commands for a plurality of effectors of the electric aircraft based on the received engine information, and control the plurality of effectors according to the generated control commands to meet the one or more desired commands of the electric aircraft.

Another aspect of the present disclosure comprises a non-transitory computer-readable medium storing one or more instructions that, when executed by at least one processor, cause the at least one processor to perform operations comprising: determining one or more desired commands for an electric aircraft, receiving engine information for at least one EPU of a plurality of EPUs of the electric aircraft, wherein the engine information includes at least one temperature associated with the at least one EPU, generating control commands for a plurality of effectors of the electric aircraft based on the received engine information, and controlling the plurality of effectors according to the generated control commands to meet the one or more desired commands of the electric aircraft.

Another aspect of the present disclosure comprises an engine of an aircraft, including at least one processor configured to determine one or more temperatures associated with one or more components of the engine, and estimate a time remaining for the electric engine at current power settings based on the determined one or more temperatures, wherein the estimated time remaining corresponds to a prediction of when the engine will reach one or more predetermined limits.

Another aspect of the present disclosure comprises a method comprising determining one or more desired commands for an electric aircraft, receiving engine information for at least one EPU, receiving battery information for at least one battery pack, generating control commands for a plurality of effectors of the electric aircraft based on the received engine information and battery information, and controlling the plurality of effectors according to the generated control commands to meet the one or more desired commands of the electric aircraft.

BRIEF DESCRIPTION OF THE DRAWINGS

FIG. 12 shows an exemplary method for energy optimization, according to some embodiments.

FIG. 23 shows an exemplary method for engine temperature management, according to some embodiments.

DETAILED DESCRIPTION

Figure 1:
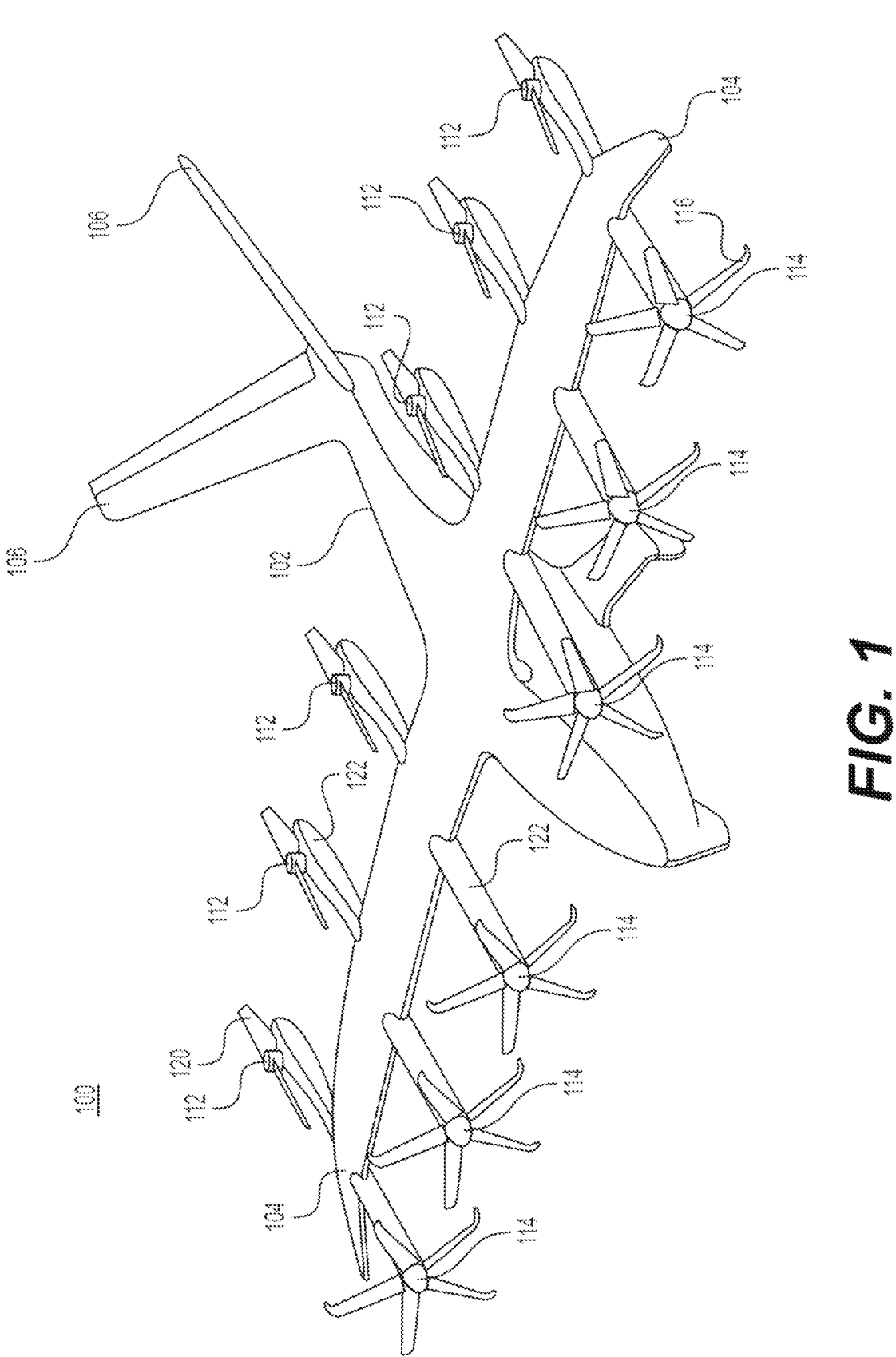
FIG. 1 shows an exemplary VTOL aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller, an actuator, an engine or motor, a propulsion unit, fuselage, an effector) configured to enable the aircraft to fly. The aircraft may include any configuration that includes at least one propeller. In some embodiments, the aircraft is driven (e.g., provided with thrust) by one or more electric propulsion systems (hereinafter referred to as electric propulsion units or "EPUs"), which may include at least one engine, at least one rotor, at least one propeller, or any combination thereof. The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to control the aircraft components in a manner that optimizes aircraft resources to improve aircraft performance (e.g., increase safety, energy efficiency, ride comfort, payload capacity, or structural integrity).

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage (HV) electrical power to a plurality of engines of the distributed propulsion system, which may include components to convert the high voltage electrical power into mechanical shaft power to rotate a propeller.

Embodiments may include an electric engine (e.g., motor) connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft using at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase). In some embodiments, a phase of flight (e.g., hover, cruise, forward flight, takeoff, landing, transition to or from forward flight) may be defined by a combination flight conditions (e.g., a combination of flight conditions within particular ranges), which may include one or more of an airspeed, altitude, pitch angle (e.g., of the aircraft), tilt angle (e.g., of one or more propellers), roll angle, rotation speed (e.g., of a propeller), torque value, pilot command, sensor measurement (e.g., accelerometer measurement), or any other value indicating a current (e.g., experienced) or requested (e.g., commanded) state of at least part of the aircraft.

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed above, embodiments of the aircraft may include many movable structural flight elements that allow pilots to safely control the aircraft. Flight control surfaces (e.g., flaperons, flaps, ailerons, elevators, rudders, etc.) are critical to controlling the positioning of the aircraft. Changes to the orientation of these surfaces changes the airflow and pressure distribution around the aircraft, allowing the pilot to control the movement of the aircraft in three axes of rotation. Similarly, rotation and orientation control of propellers may provide lift support (e.g., lift required for vertical take-off, landing, and hovering) and may provide the forward thrust required to move the aircraft through the air. The movement of each of these flight elements is critical to the safety and stability of the aircraft.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
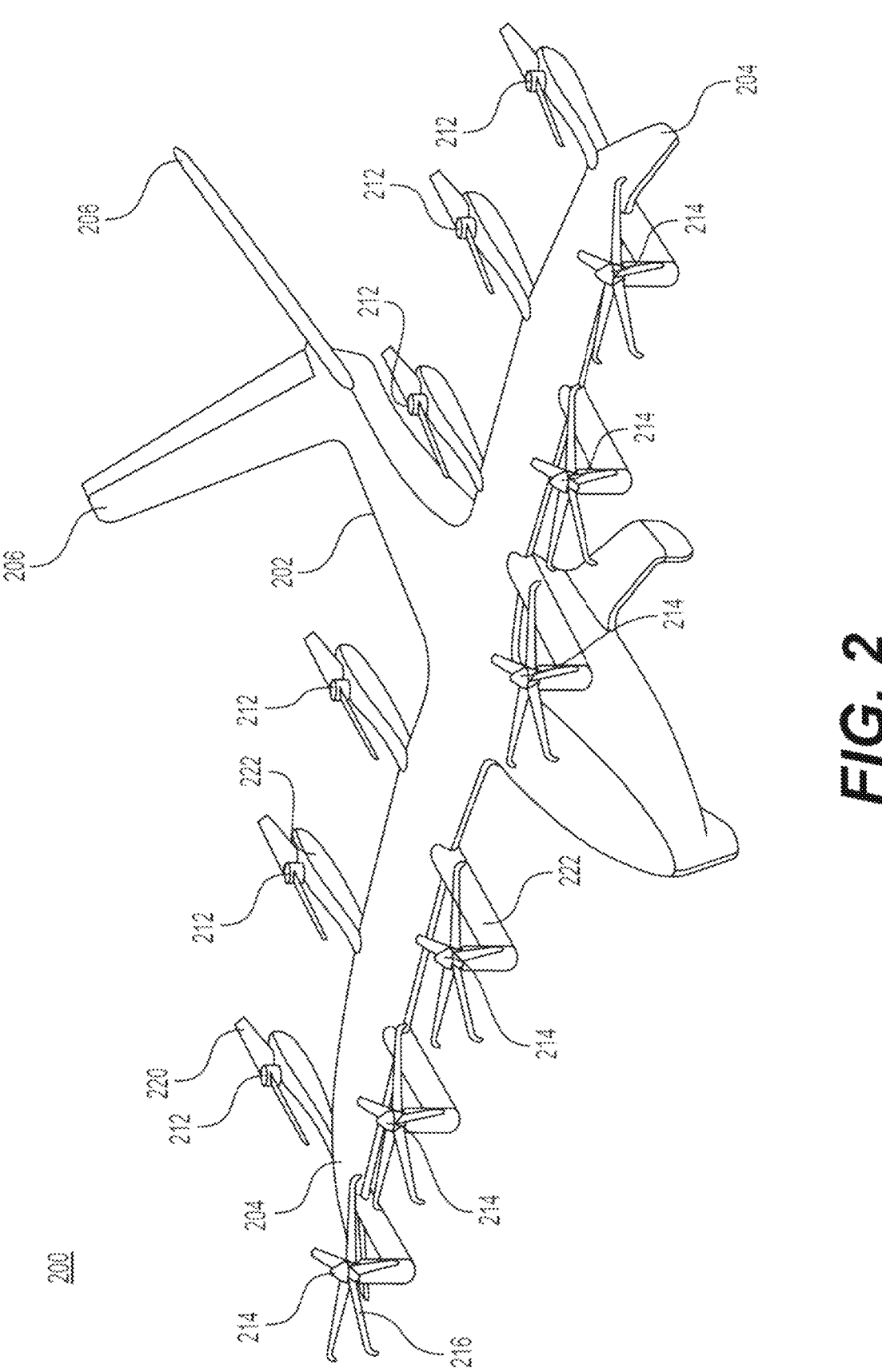
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps, ailerons, and/or flaperons (e.g., configured to perform functions of both flaps and ailerons). According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

Figures 9A, 9B, 9C, 9D, 9E:
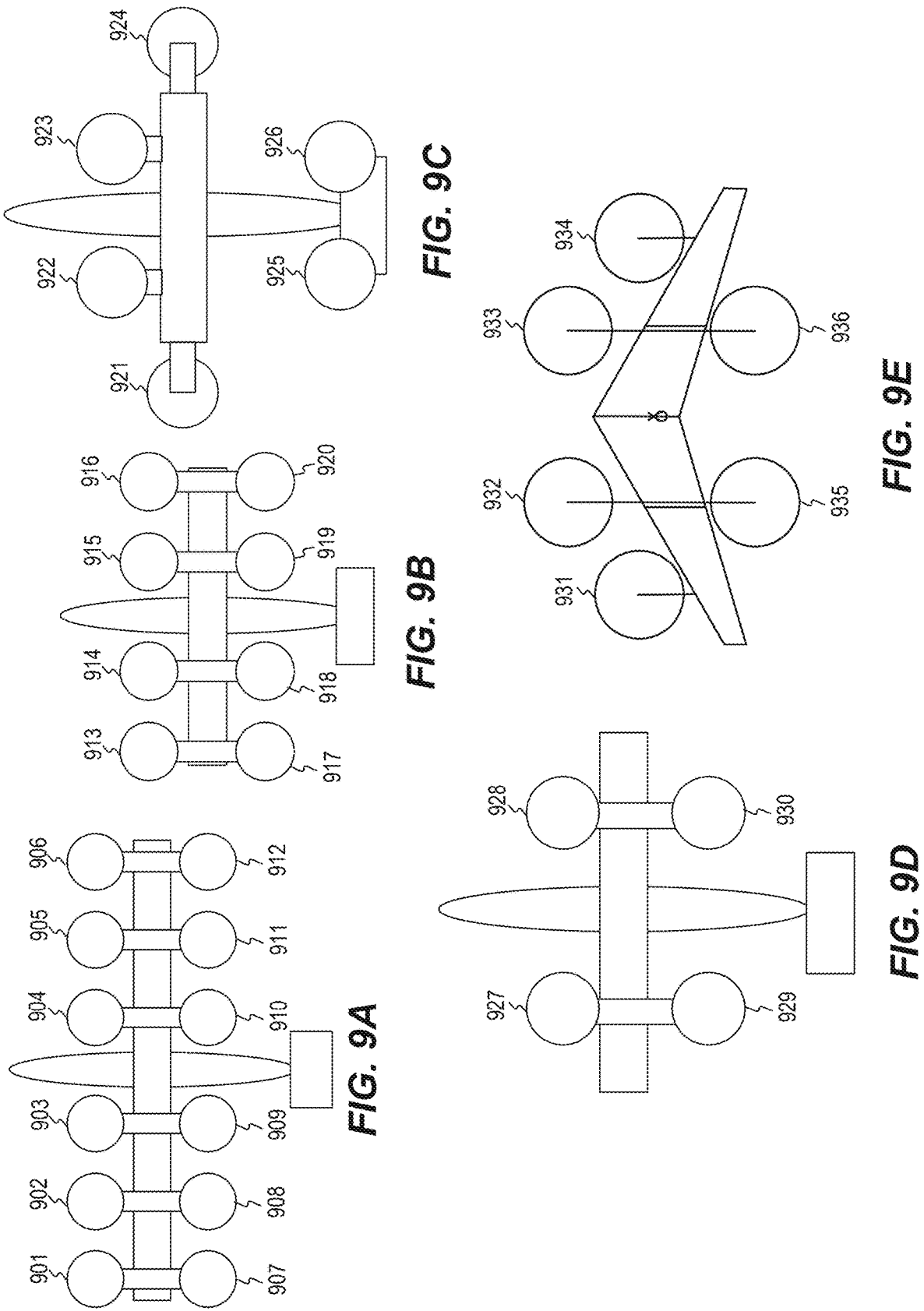
FIGS. 9A, 9B, 9C, 9D, and 9E illustrate exemplary top plan views of VTOL aircraft, consistent with disclosed embodiments.

In some embodiments, one or more lift propellers 112, 212 and/or tilt propellers 114, 214 may be canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figure 3:
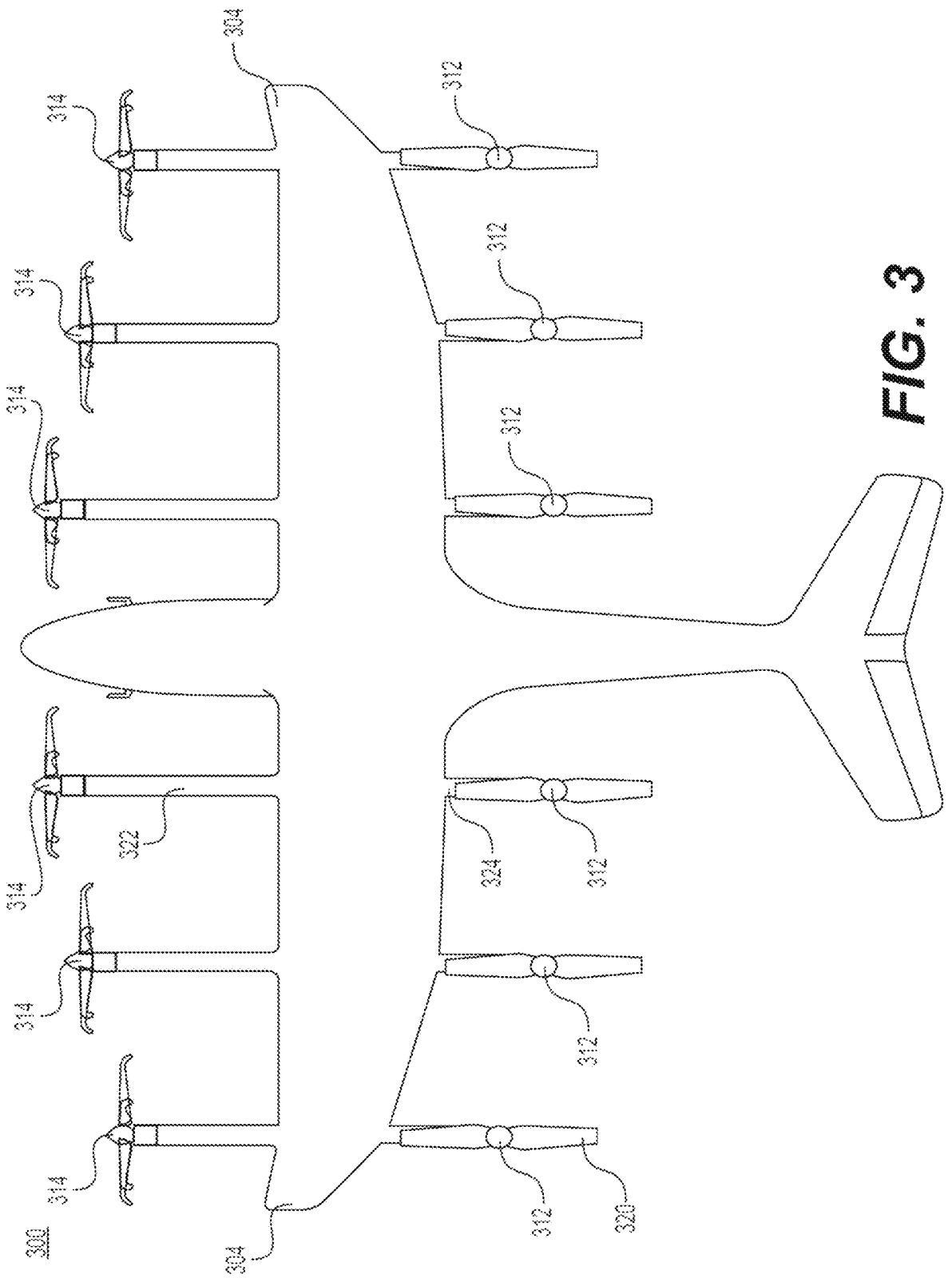
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, forward electric propulsion systems may be mounted to wings 304 by booms 322. In some embodiments, aft electric propulsion systems may be mounted to wings 304 by booms 324. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

Figure 4:
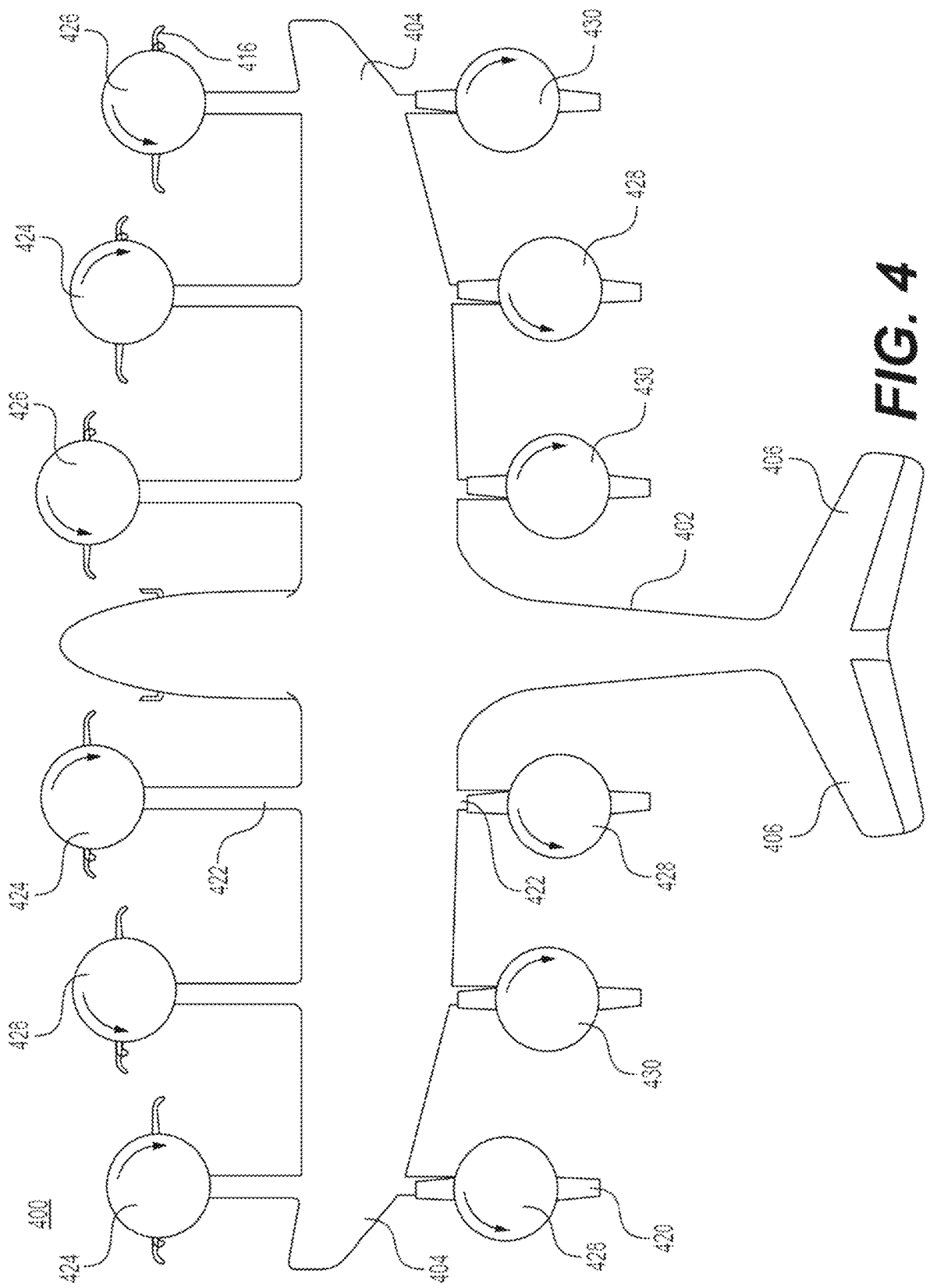
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of clockwise (CW) type 424 and the remaining three forward electric propulsion systems being of CCW type 426. In some embodiments, three aft electric propulsion systems may be of counter-clockwise (CCW) type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, aircraft 400 may include a fuselage 402, wing(s) 404 mounted to the fuselage 402, and one or more rear stabilizers 406 mounted to the rear of the fuselage 402. In some embodiments, each forward electric propulsion system may include propeller blades 416. In some embodiments, each aft electric propulsion system may include propeller blades 420. In some embodiments, electric propulsion systems may be mounted to wing(s) 404 by booms 422. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
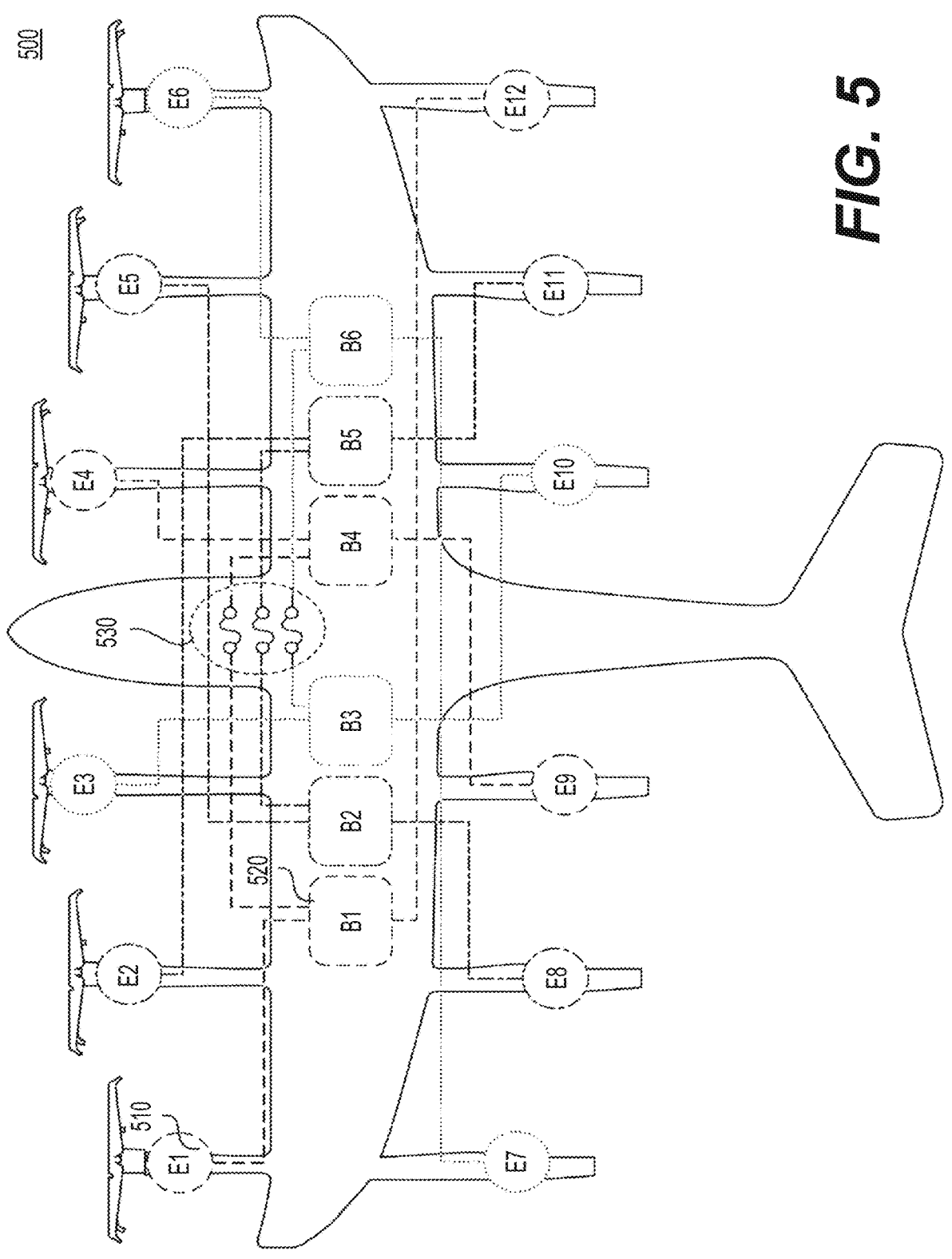
FIG. 5 shows exemplary power connections in a VTOL aircraft, consistent with disclosed embodiments.

FIG. 5 illustrates an example eVTOL aircraft, consistent with embodiments of the present disclosure. In some embodiments, the distributed electrical propulsion system of the eVTOL aircraft 500 may include a high voltage power supply (HVPS) system to supply the High Voltage (HV) electric power. The HVPS system may be configured to supply power on the aircraft 500 and configured to distribute the stored electrical energy to other systems on the aircraft 500 (e.g., via high voltage channels, via high voltage buses), including the electrical propulsion system (EPS) for converting electrical power into mechanical rotational shaft power to generate thrust. As shown in FIG. 5, the HVPS system of the aircraft 500 may include six battery packs 520 (which are numbered B1-B6 from left to right) installed within the battery bays in the wing of the aircraft 500. In some embodiments, six battery packs 520 may have the identical design, to simplify the design, manufacturing, and logistics. The battery packs 520 may power one or more electric engines 510 (which are numbered E1 to E12).

In some embodiments, a single battery pack 520 may be electrically connected to, and power, multiple electric engines 510. For example, in some embodiments, a battery pack 520 may power an electric engine 510 on either side of a longitudinal axis. In some embodiments a battery pack 520 may power an electric engine 510 on either side of a horizontal axis (e.g., along one or more wings of the aircraft). In some embodiments, as shown in FIG. 5, a battery pack 520 may power two diagonally opposing electric engines 510. For example, battery pack B1 may power electric engines E1 and E12. Battery pack B2 may power electric engines E5 and E8. Battery pack B3 may power electric engines E3 and E10. Battery pack B4 may power electric engines E4 and E9. Battery pack B5 may power electric engines E2 and E11. Battery pack B6 may power electric engines E6 and E7. Therefore, upon a loss of a battery pack 520, the impact to roll or pitch moments can be reduced because the loss of lift is optimized. In some embodiments, battery packs 520 may power different arrangements of electric engines 510 to reduce roll, pitch, or yaw moments that may be caused by a loss of the battery pack 520. For example, in some embodiments, battery packs 520 may be connected to electric engines 510 in any manner that improves (e.g., optimizes) lift and/or thrust across the longitudinal and horizontal axis of the aircraft.

Further, the HVPS system may include at least one cross-link 530 (e.g., high voltage bus) possessing a fuse allowing for pairing of two or more battery packs 520. Through the cross-link, power for the electric engines 510 can be shared among the paired battery packs 520. Therefore, multiple battery packs 520 can simultaneously power multiple electric engines 510. This arrangement provides for redundancy and avoids a single point of failure because each paired battery 520 may act as a backup for the other(s). Upon failure of a battery pack 520, one or more connected battery packs 520 may continue powering the failed battery pack's connected electric engines 510.

In some embodiments, as shown in FIG. 5, a pair of battery packs 520 may include two battery packs 520. In some embodiments, a pair of two battery backs 520 may power a total of four electric engines 510. For example, battery pack B1, providing power to electric engines E1 and E12, may be cross-linked (e.g., connected via high voltage bus) to battery pack B4, providing power to electric engines E4 and E9. Battery pack B2, providing power to electric engines E5 and E8, may be cross-linked to battery pack B5, providing power to electric engines E2 and E11. Battery pack B3, providing power to electric engines E3 and E10, may be cross-linked to battery pack B6, providing power to electric engines E6 and E7.

A cross-link (e.g., high voltage bus) may connect two high voltage channels, wherein a high voltage channel may feed one or more electric engines. In some embodiments, a cross-link may be connected to at least one (e.g., each) battery pack's high voltage channel before the channel splits to power multiple electric engines (e.g., two electric engines).

In some embodiments, more than two battery packs 520 may be cross-linked together. For example, in some embodiments, three battery packs 520 may be cross-linked. Therefore, in some embodiments, three battery packs 520 may power six electric engines 510. In some embodiments, four battery packs 520 may be cross-linked. Therefore, in some embodiments, four battery packs 520 may power eight electric engines 510. In some embodiments, a different arrangement of battery packs 520 and cross-links may be chosen to best optimize aircraft power needs, system redundancy, and fault tolerance.

In some embodiments, each battery pack may contain an HV distribution unit and a Battery Management System housed within a High Voltage Junction Box (HVJB). The battery management system may include one or more processors, microprocessor, and/or controllers. The BMS may be configured to monitor voltages, temperatures, currents, and isolation resistances. The BMS may be configured to protect against fault conditions (e.g., using a fuse). As further detailed below, the BMS may communicate with various systems within and outside the HVJB. The BMS may include a Battery Management Unit (BMU) which may receive voltage, current, resistance, and temperature sensing signals from a cell stack assembly and/or the HV distribution unit.

The BMU may monitor output current for each connected load. The BMU may continuously monitor the state of the battery even when it is not installed in the aircraft 100. By monitoring the battery pack, the BMU may protect against conditions that adversely affect safety or performance, such as overvoltage, undervoltage, overtemperature, under-temperature, loss of electrical isolation, short circuit, overcurrent, etc. In addition, the BMU performs computation of the state of charge (SOC), state of health (SOH), failure condition (e.g. short circuit or overcurrent), state of power (SOP), state of energy (SOE) and state of temperature (SOT) of the battery pack. In some embodiments, the BMU may be configured to perform computation of usable energy (e.g., available energy) based on one or more of the SOC, SOH, SOP, SOE, or SOT. For example, the BMU may perform computation of usable energy for each battery pack, consistent with disclosed embodiments. The BMU also controls and monitors bus pre-charging, provides fuse and contactor commands, and communicates with various systems within and outside the HVJB. Further, the BMU may communicate with aircraft switches and the flight control system and change operations based on received commands.

In some embodiments, the BMU may detect a failure event and send command signals to blow a fuse. For example, the BMU may receive information regarding a condition of the connected loads (e.g. a voltage, current, or temperature) at a point in the HVPS system. Based on the received information, the BMU may determine a failure condition (e.g. because the value is outside a predetermined range) and send a command to blow an associated fuse. Therefore, the fault condition can be disconnected from the rest of the HVPS circuitry, protecting the remaining devices and wiring.

In some embodiments, battery packs may be in communication with each other, e.g. through BMS. The battery packs may use information regarding the state of one or more paired battery packs in a battery pack unit to help determine whether an overcurrent condition has occurred. For example, a battery pack may determine an expected operation range (e.g. voltage, current etc.) based on the state of the battery pack and the communicated state of battery packs within the battery pack unit.

Figure 6:
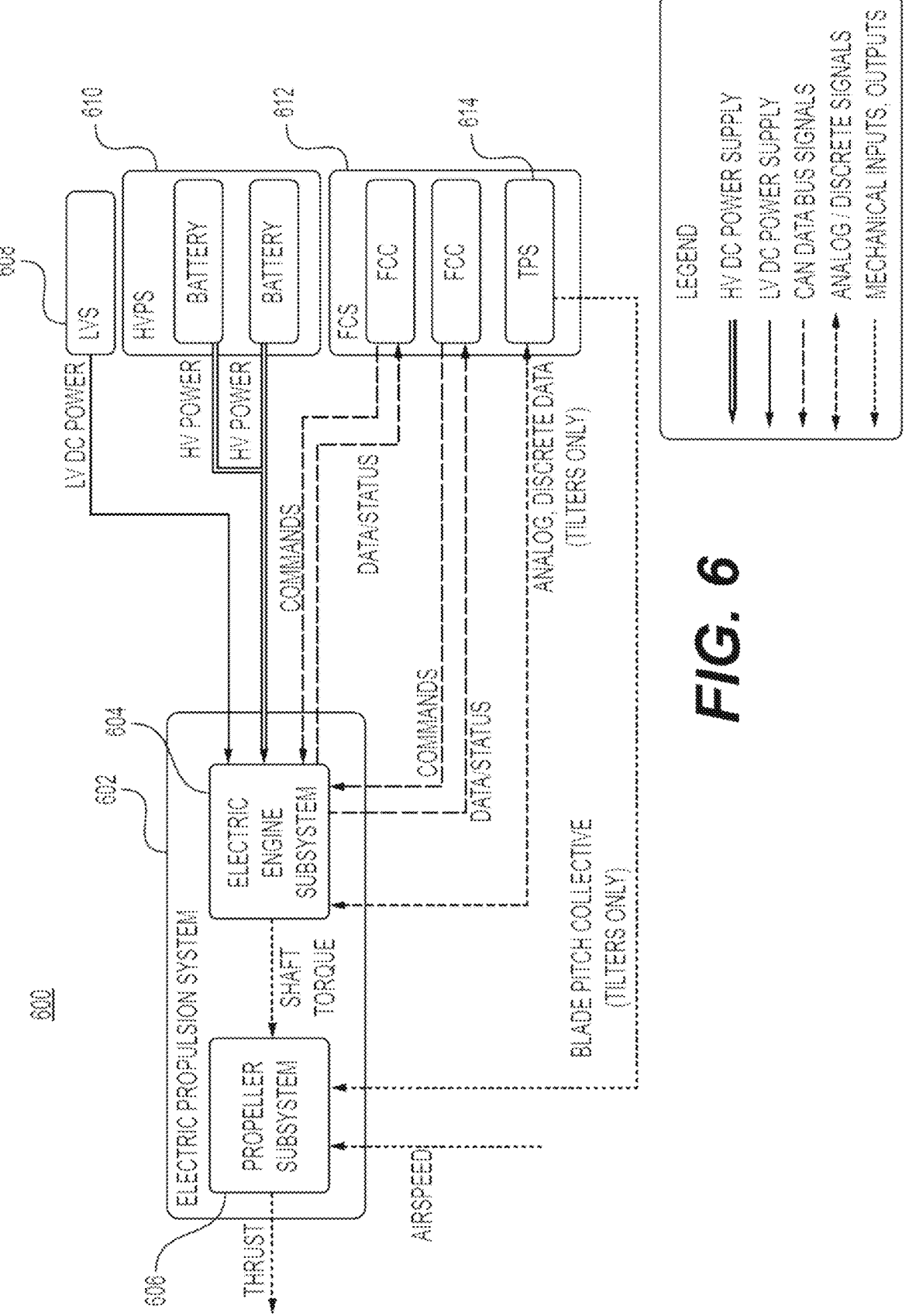
FIG. 6 is a schematic block diagram of an exemplary architecture and design of electric propulsion power and control system consistent with disclosed embodiments.

FIG. 6 is a schematic block diagram of an exemplary architecture and design of electric propulsion power and control system 600 consistent with disclosed embodiments. Electric propulsion power and control system 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is lower in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer (FCC) capable of using Controller Area Network ("CAN") data bus signals to send commands to the electric engine subsystem 604 and receive status and data from the electric engine subsystem 604. An FCC may include a device configured to perform one or more operations (e.g., computational operations) for an aircraft, such as at least one processor and a memory component, which may store instructions executable by the at least one processor to perform the operations, consistent with disclosed embodiments. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system (TPS) 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
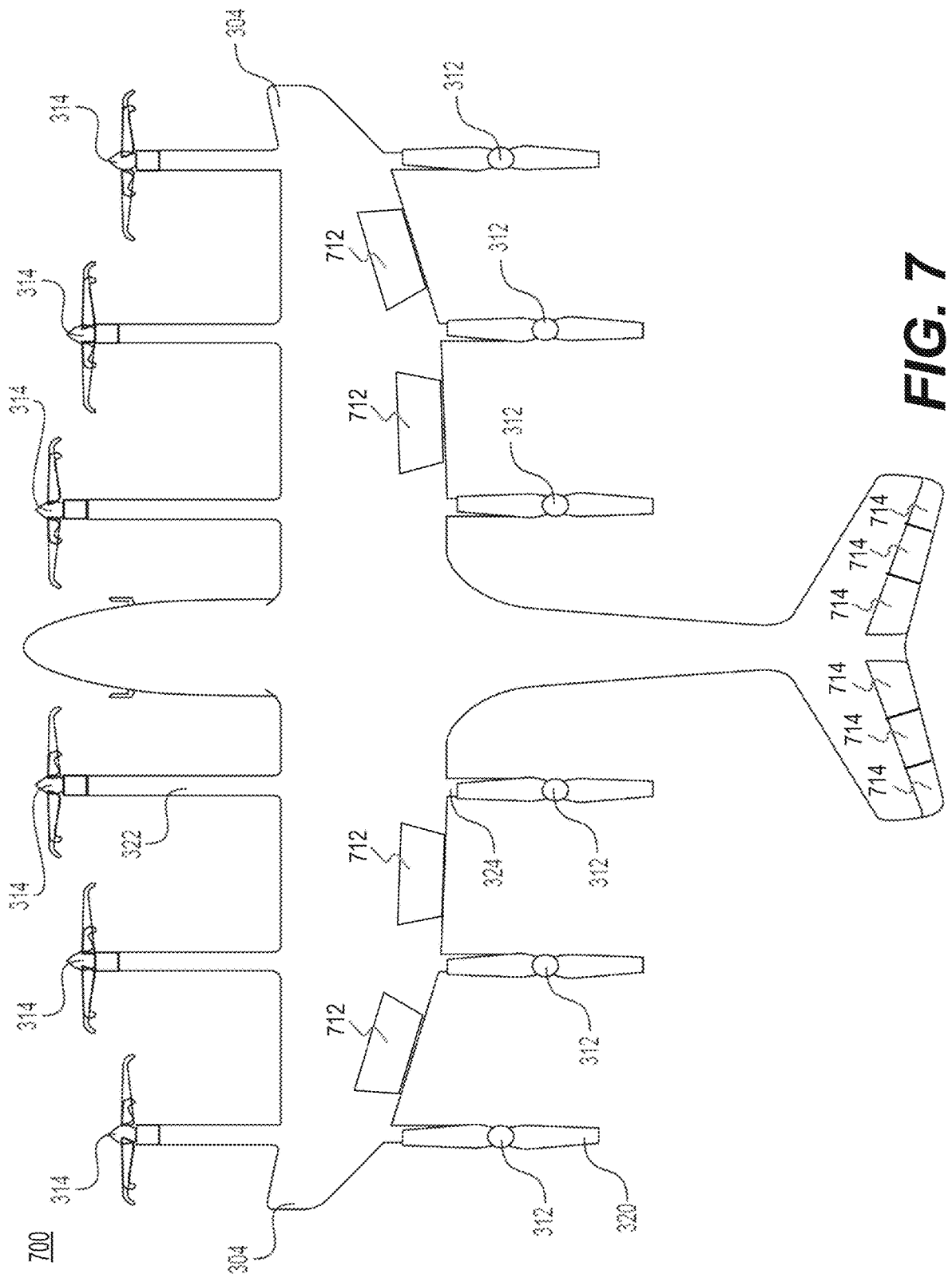
FIG. 7 shows an exemplary top plan view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plan view of an exemplary VTOL aircraft, consistent with embodiments of the present disclosure. Aircraft 700 shown in the figure may be a top plan view of the aircraft 100, 200 shown in FIGS. 1 and 2, respectively, in addition to the aircraft components described above with reference to FIG. 3. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions of one or more rudders and/or one or more elevators. Additionally or alternatively, control surfaces may include separate rudders and elevators. In aircraft 700, the actuators may include, in addition to the electric propulsion systems discussed earlier, control surface actuators (CSAs) associated with flaperons 712 and ruddervators 714, as discussed further below with reference to FIG. 8.

Figure 8:
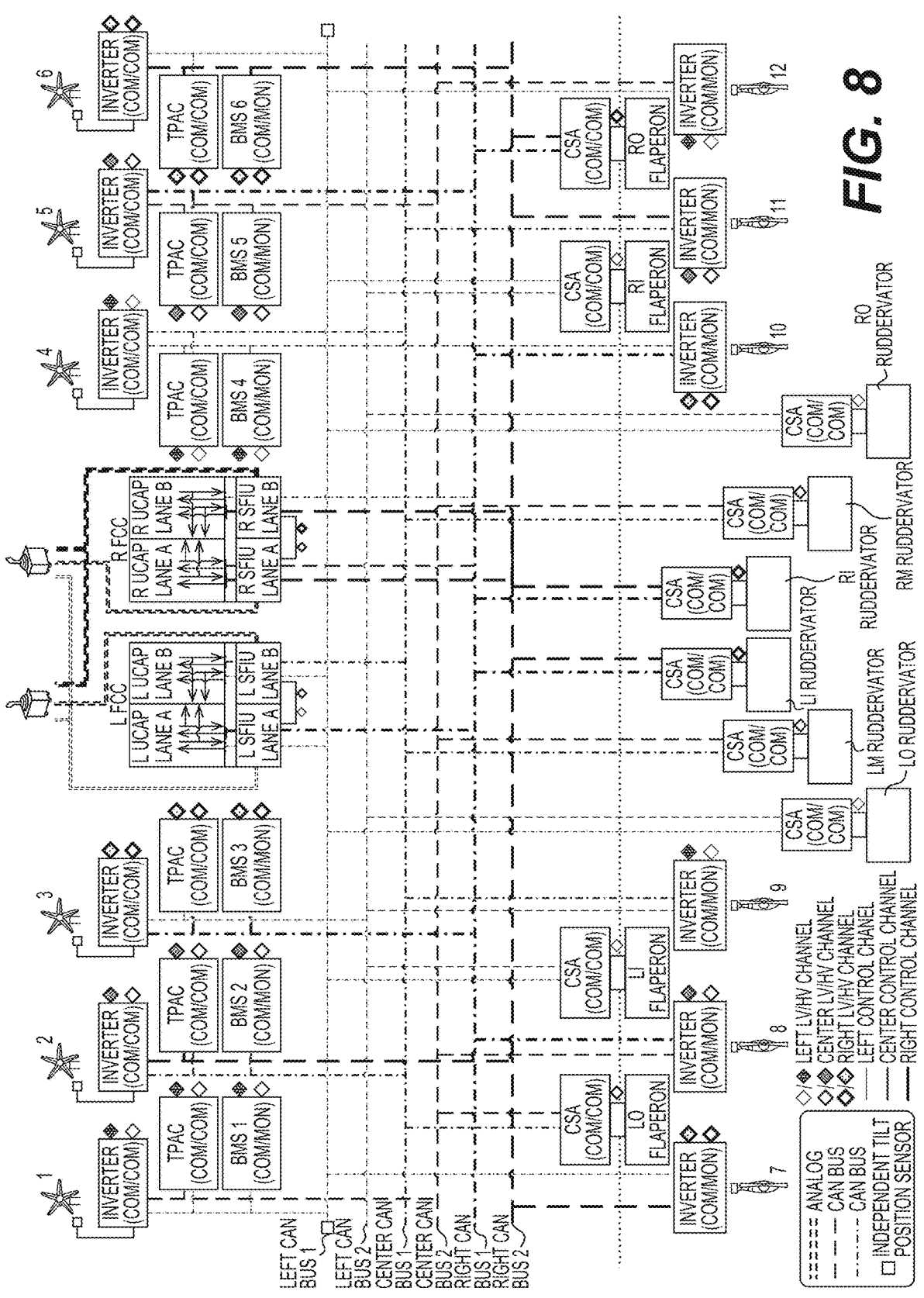
FIG. 8 is a schematic illustration of a flight control signaling architecture for controlling the control surfaces and associated actuators, consistent with disclosed embodiments.

FIG. 8 is a schematic illustration of a flight control signaling architecture 800 for controlling the control surfaces and associated actuators, consistent with disclosed embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)—Left FCC, Lane A (L FCC-A) 801, Left FCC, Lane B (L FCC-B) 802, Right FCC, Lane A (R FCC-A) 803, and Right FCC, Lane A (R FCC-B) 804, although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing process required to control the control surfaces and actuators may be performed on a single computing thread by a single flight control computer.

The FCCs may provide control signals to the control surface actuators, including the EPU inverters 806, TPACs 808, BMSs 809, flaperon CSAs 810, and ruddervator CSAs 811, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

FIGS. 9A-9E are illustrations of a top plan view of exemplary VTOL aircrafts, consistent with embodiments of the present disclosure. There may be a number of design considerations (cost, weight, size, performance capability etc.) that may influence the number and/or combination of tilt and lift propellers in an VTOL aircraft. As further described below, the number and orientation of aircraft components (e.g., effectors or actuators) may affect how energy is used as well as the temperature of the various aircraft components. Therefore, the flight control system may adjust aircraft components in certain ways (e.g., those discussed in disclosed embodiments) to control the aircraft in a manner that optimizes energy usage and keeps various aircraft components at an optimal temperature.

FIG. 9A illustrates an arrangement of electric propulsion systems 900, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems 901, 902, 903, 904, 905, 906 and six aft electric propulsion systems 907, 908, 909, 910, 911, 912. In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion systems 940, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems 913, 914, 915, 916 and four aft electric propulsion systems 917, 918, 919, 920. In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion systems 950, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, 924 coplanar in a first plane and a second set of two electric propulsion systems 925, 926 coplanar in a second plane. In some embodiments, the first set of electric propulsion systems 921-924 may be operatively connected to tilt propellers and second set of electric propulsion systems 925, 926 may be operatively connected to lift propellers. In other embodiments, the first set of electric propulsion systems 921-924 and the second set of aft electric propulsion systems 925, 926 may all be operatively connected to tilt propellers.

FIG. 9D illustrates an alternate arrangement of electric propulsion systems 960, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, 930. In some embodiments, all of the electric propulsion systems may be operatively connected to tilt propellers.

FIG. 9E illustrates an alternate arrangement of electric propulsion systems 970, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 931, 932, 933, 934 operatively connected to tilt propellers and the two aft electric propulsion systems 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counterclockwise (CCW) rotation.

Figure 10:
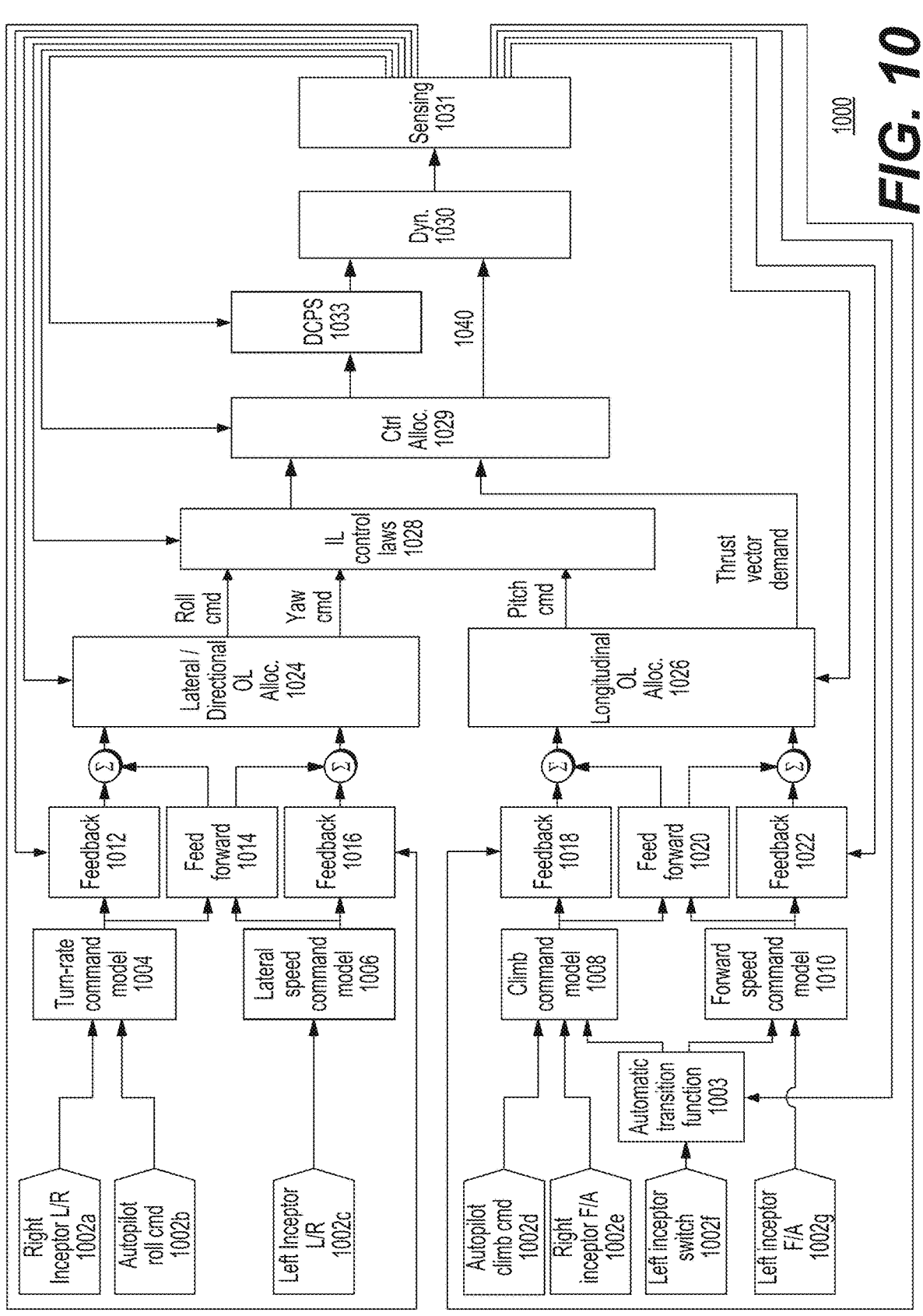
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one a microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many conventional functions of the control system are not shown in FIG. 10 for ease of description. System 1000 further includes one or more storage mediums storing model(s), function(s), table(s), and/or any information for executing the disclosed processes. As further described below, any or each box indicating a command model 1004, 1006, 1008, 1010, feedback 1012, 1016, 1018, 1022, feed forward 1014, 1020, outer loop allocation 1024, 1026, inner loop control laws 1028, control allocation 1029, and DCPS 1033 may represent or include module(s), script(s), function(s), application(s), and/or program(s) that are executed by processor(s) and/or microprocessor(s) of system 1000. It is appreciated that the complexity and inter-connectedness of the functional block diagram of FIG. 10 would be impossible, or at least impractical, to effectively implement by a human user, especially when considering that these functionalities are implemented (e.g., in real time) while the aircraft is flying (including taking off or landing). Unless specified otherwise herein, "desired" with respect to a command for an aircraft, aircraft parameter, or other aircraft characteristic may refer to a characteristic that is input (e.g., by a pilot input device, system module, etc.), requested, and/or otherwise present as part of a process for controlling computing-related operations of the aircraft.

In some embodiments, control system 1000 may be configured based on one or more flight control laws. Flight control law may comprise a set of algorithms, models, and/or rules configured to govern a behavior of an aircraft (e.g., control or influence one or more effectors of the aircraft) in response to one or more pilot inputs and external factors. In some embodiments, flight control laws may be configured to achieve at least one of desired flight characteristics, stability, or performance. For example, flight control laws may be configured to ensure stability and controllability of an aircraft by controlling how the aircraft responds to at least one of one or more pilot inputs, vehicle dynamics (e.g., disturbances, such as turbulence, gusts, etc.), or changes in flight conditions (e.g., altitude, airspeed, angle of attack, torque of one or more propellers).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving left/right 1002*a* and/or forward/aft 1002*e*), left inceptor(s) (e.g., moving left/right 1002*c* and/or forward/aft 1002*g*), and/or left inceptor switch 1002*f*. In some embodiments, a pilot input device may include an interface with an autopilot system (e.g., display screen(s), switch(es), button(s), lever(s), and/or other interface(s)). Optionally, system 1000 may further detect inputs from an autopilot system, such as autopilot roll command 1002*b*, autopilot climb command 1002*d*, and/or other command(s) to control the aircraft.

In some embodiments, the one or more inputs may include at least one of a position and/or rate of a right inceptor and/or a left inceptor, signals received (e.g., response type change commands, trim inputs, reference inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 1002a may comprise a lateral position and/or rate of a right inceptor (e.g., an inceptor positioned to the right of another inceptor and/or an inceptor positioned on the right side of a pilot area), auto-pilot roll cmd 1002b may comprise a roll signal received in autopilot mode, left inceptor L/R 1002c may comprise a lateral position and/or rate of a left inceptor (e.g., an inceptor positioned to the left of another inceptor and/or an inceptor positioned on the left side of a pilot area), autopilot climb cmd 1002d may comprise a climb signal received in auto-pilot mode, right inceptor F/A 1002e may comprise a longitudinal position and/or rate of the right inceptor, left inceptor switch 1002f may comprise a signal from a switch for enabling or disabling automatic transition function 1003, and left inceptor F/A 1002g may comprise a longitudinal position and/or rate of the left inceptor.

At least one (e.g., each) input may include data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 1029 considers optimizing battery pack energy states. Aerodynamic parameters may be parameters derived from aerodynamic and acoustic modeling and can be based on the actuator Jacobian matrices (e.g., describing how changes in actuators (e.g., in response to actuator/effector commands) affect overall motion of the aircraft) and actuator states. At least one (e.g., each) input received from an inceptor may indicate a corresponding adjustment to an aircraft's heading or power output.

Command models 1004, 1006, 1008, 1010 may be configured to determine a shape (e.g., aggressiveness, slew rate, damping, overshoot, etc.) of an ideal aircraft response. For example, at least one (e.g., each) command model of command models 1004, 1006, 1008, 1010 may be configured to receive and interpret at least one of inputs 1002a, 1002b, 1002c, 1002d, 1002e, 1002f, 1002g and, in response, compute a corresponding change to an aircraft's orientation, heading, and propulsion, or a combination thereof using an integrator (not pictured). In some embodiments, right inceptor L/R 1002a and autopilot roll cmd 1002b may be fed into turn-rate command model 1004, left inceptor L/R 1002c may be fed into lateral speed command model 1006, autopilot climb cmd 1002d and right inceptor F/A 1002e may be fed into climb command model 1008, and left inceptor F/A 1002g may be fed into forward speed command model 1010. In some embodiments, an output from automatic transition function 1003 may be fed into at least one of climb command model 1008 or forward speed command model 1010. For example, based on receiving an enable signal from left inceptor switch 1002f, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (e.g., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

At least one (e.g., each) of feed forward 1014 and 1020 may receive as input one or more desired changes (e.g., desired position, speed and/or acceleration) from corresponding command models 1004, 1006, 1008, 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for at least one (e.g., each) desired change, a corresponding force to accomplish the desired change. In some embodiments, feed forward 1014, 1020 may be configured to determine the corresponding force using simplified models of aircraft dynamics. For example, based on a known (e.g., a stored value of) or determined mass of the aircraft, feed forward 1014, 1020 may be configured to determine a force to cause the aircraft to follow a desired acceleration command. In some embodiments, feed forward 1014, 1020 may be configured to use a model predicting an amount of drag on the vehicle produced as a function of speed in order to determine a force required to follow a desired speed command signal.

At least one (e.g., each) of feedback 1012, 1016, 1018, 1022 may receive as input the one or more desired changes (e.g., desired position, speed and/or acceleration) from command models 1004, 1006, 1008, 1010 as well as data received from vehicle sensing 1031 indicative of vehicle dynamics 1030. For example, sensed vehicle dynamics 1030 may comprise a representation of the physics and/or natural dynamics of the aircraft, and Vehicle Dynamics Sensing 1031 sensor measurements may capture how the aircraft moves in response to pilot inputs, propulsion system outputs or ambient conditions. Additionally or alternatively, data received from vehicle sensing 1031 may include error signals generated, by one or more processors, based on exogenous disturbances (e.g., gust causing speed disturbance). In some embodiments, feedback 1012, 1016, 1018, 1022 may be configured to generate feedback forces (e.g., at an actuator) based on the received error signals. For example, feedback 1012, 1016, 1018, 1022 may generate feedback forces with the intent of counteracting the effect(s) of external disturbances. Additionally or alternatively, feedback 1012, 1016, 1018 and 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors (e.g., included in vehicle sensing 1031) may generate an error signal which may be looped into feedback 1012, 1016, 1018 or 1022 to determine an additional force needed to correct the error.

In some embodiments, feedback 1012, 1016, 1018, 1022 may be disabled. For example, in response to losing position and/or ground speed feedback due to disruption of global position system (GPS) communication, system 1000 may be configured to operate without feedback 1012, 1016, 1018, 1022 until GPS communication is reconnected.

In some embodiments, feedback 1012, 1016, 1018, 1022 may receive as input a plurality of measurements as well as a trust value for at least one (e.g., each) measurement indicating whether the measurement is valid. For example, one or more processors of system 1000 may assign a Boolean (true/false) value for at least one (e.g., each) measurement used in system 1000 to indicate that the measurement is trustworthy (e.g., yes) or that the measurement may be invalid (e.g., no). Based on one or more processors identifying a measurement as invalid, feedback 1012, 1016, 1018, 1022 may omit that measurement for further processing. For example, in response to one or more processors identifying a heading measurement as invalid, feedback 1012, 1016, 1018, 1022 may omit subsequent heading measurements in determining feedback force(s).

In some embodiments, feedback 1012, 1016, 1018, 1022 may determine one or more feedback forces based on actuator state information received from one or more sensors (e.g., included in vehicle sensing 1031). For example, in response to actuator state information indicating that there is a failure of an actuator, one or more processors of system 1000 may update one or more processes of system 1000 and determine an alternative command to achieve the desired change. For example, one or more processors of system 1000 may adjust one or more model(s), function(s), algorithm(s), table(s), input(s), parameter(s), threshold(s), and/or constraint(s) based on (e.g., in response to) a change in status (e.g., failure) of an actuator (or other aircraft component, such as an engine or battery, for other examples). Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018, 1022 and feed forward 1014, 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

At least one (e.g., each) of lateral/directional outer loop allocation 1024 and longitudinal outer loop allocation 1026 may be configured to receive as input one or more desired forces and data received from vehicle sensing 1031 (e.g., airspeed, vehicle orientation, vehicle load factor, measured acceleration, vehicle mass and inertia, indications of working/failed actuators, air density, altitude, aircraft mode, whether the aircraft is in the air or on the ground, etc.). Based on the inputs, outer loop allocations 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (e.g., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (e.g., pitch angle) or a thrust vector demand. A thrust vector demand may include longitudinal thrust (e.g., mix of nacelle tilt and front propeller thrust) and vertical thrust (e.g., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, Longitudinal Outer Loop Allocation 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed vehicle dynamics (e.g., from vehicle sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command(s). For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces, such as flaperons 712 and ruddervators 714 shown in FIG. 7), including flaperon(s), ruddervator(s), aileron(s), spoiler(s), rudder(s), and/or elevator(s). Vehicle dynamics 1030 represents the control of different flight elements (e.g., electric propulsion system(s) and/or control surfaces) and the corresponding effect on the flight elements and aircraft dynamics.

While the embodiment shown in FIG. 10 includes both Inner loop control laws 1028 and Outer loop allocation 1024, 1026, in some embodiments the flight control system may not include Outer loop allocation 1024, 1026. Therefore, a pilot inceptor input may create roll, yaw, pitch, and/or thrust commands. For example, a right inceptor may control roll and pitch and a left inceptor and/or pedal(s) may control yaw and thrust.

Control allocation 1029 may accept as inputs one or more of force or moment commands, data received from the one or more aircraft sensors, envelope protection limits, scheduling parameter, and optimizer parameters. Control allocation 1029 may be configured to determine, based on the inputs, actuator commands (e.g., thrust(s), torque(s), and/or propeller speeds for electric propulsion units) by minimizing an objective function (e.g., solving an optimization problem, such as continually) that includes one or more primary objectives, such as meeting (e.g., responding to, satisfying, addressing, providing output based upon) commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. Envelope protection limits as used herein may include one or more boundaries that the aircraft should operate within to ensure safe and stable flight. In some embodiments, envelope protection limits may be defined by one or more of speed, altitude, angle of attack, or load factor. For example, envelope protection limits may include one or more bending moments and/or one or more load constraints. In some embodiments, control allocation 1029 may use envelope protection limits to automatically adjust one or more control surfaces or control settings. Doing so may prevent the aircraft from undesirable scenarios such as stalling or structural strain or failure. In normal operation, the minimum command limit for a given actuator may include the maximum of: the minimum hardware based limit and the minimum flight envelope limit; and the maximum command limit for a given actuator may includes the minimum of: the maximum hardware based limit and the maximum flight envelope limit. In the case of an actuator failure, the command limits for the failed actuator correspond to the failure mode.

In some embodiments, the aircraft may include a plurality of battery packs that are electrically isolated from one another to provide power to different portions of the plurality of electric propulsion units. In some embodiments, control allocation 1029 may include a battery pack energy optimization function. In some embodiments, energy optimization may be achieved by minimizing usage of electric propulsion units that are connected to battery packs that have lower charge relative to other battery packs. According to various embodiments, minimizing usage of electric propulsion units connected to lower charge battery packs can be achieved by reducing the preferred states of the electric propulsion units in the control allocation optimization objective function (e.g., optimization problem) and/or increasing the penalty for deviations from preferred states.

Additionally or alternatively, the energy optimization function may be configured to modify one or more reference commands (e.g., attractor command, ideal actuator command, ideal effector command, ideal combination of commands that cause the airplane to perform a particular maneuver in an optimal (e.g., energy efficient, safe) manner). A reference command may correspond to an ideal position of an actuator for achieving one or more desired commands (e.g., optimal commands to achieve desired movement). In some embodiments, control allocation 1029 may be configured to determine effector (or actuator) commands based on one or more modified reference commands. For example, at least one (e.g., each) effector may be associated with a reference command, and control allocation 1029 may generate an effector command for the at least one effector such that a deviation between the modified effector reference command and generated effector command is as small as possible. In some embodiments, control allocation 1029 may modify the one or more reference commands prior to solving the optimization problem.

As used herein, the term "effector" means any component configured to produce an effect or outcome, such as an actuator, control surface, propulsion unit, battery, propeller, engine, or any other aircraft component.

As used herein, the term "battery pack" means any combination of electrically connected batteries (i.e., battery cells) and can include a plurality of batteries arranged in series, parallel, or a combination of series and parallel.

In some embodiments, control allocation 1029 may include an engine thermal management function to manage (e.g., optimize) one or more temperatures associated with one or more engines. In some embodiments, engine thermal management may include minimizing usage of electric propulsion units that have higher temperatures relative to other electric propulsion units. Detailed descriptions related to engine thermal management are provided in FIGS. 20 and 21 descriptions below In some embodiments, control allocation 1029 may perform both energy optimization and engine thermal management. In some embodiments, control allocation 1029 may prioritize engine thermal management over energy optimization. In some embodiments, control allocation 1029 may prioritize energy optimization over engine thermal management.

Control allocation 1029 sends commands to one or more flight elements to control the aircraft. The flight elements will move in accordance with the controlled command. Various sensing systems and associated sensors as part of Vehicle Dynamic Sensing 1031 may detect the movement of the flight elements and/or the dynamics of the aircraft and provide the information to Feedback 1012, 1016, 1018, 1022, Outer Loop allocation 1024, 1026, Inner Loop Control laws 1028, and Control Allocation 1029 to be incorporated into flight control.

As described above, vehicle sensing 1031 may include one or more sensors to detect vehicle dynamics. For example, vehicle sensing 1031 may capture how the aircraft moves in response to pilot inputs, propulsion system outputs or ambient conditions. Additionally or alternatively, vehicle sensing 1031 may detect an error in the aircraft's response based on exogenous disturbances (e.g., gust causing speed disturbance). Further, vehicle sensing 1031 may include one or more sensors to detect propeller speed, such as a magnetic sensor (e.g., Hall effect or inductive sensor) or optical sensors (e.g., a tachometer) to detect the rotor speed of the aircraft engine (and thereby the speed of the propeller). Vehicle sensing 1031 may include one or more sensors to detect nacelle tilt angle (e.g., a propeller rotation axis angle between a lift configuration (e.g., FIG. 2) and forward thrust configuration (e.g., FIG. 1)), such as a magnetic sensor (e.g., Hall effect or inductive sensor). Vehicle sensing 1031 may include one or more sensors configured to detect an engine torque and/or thrust, such as one or more current sensors or voltage sensors, strain gauges, load cells, and/or propeller vibration sensors (e.g., accelerometers).

Vehicle sensing 1031 may include one or more sensors configured to detect vehicle dynamics, such as acceleration and/or pitch orientation sensors (e.g., accelerometer(s), 3-axis accelerometer(s), gyroscope(s), 3-axis gyroscope(s), and/or tilt-position sensors to determine angles of engines) and airspeed sensors (e.g., pitot tube sensors). Vehicle sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components. In some embodiments, vehicle sensing 1031 may include an inertial navigation systems (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

DCPS 1033 may receive as inputs from control allocation 1029 and vehicle sensing 1031. For example, DCPS 1033 may receive at least one or more torque commands, one or more limits (e.g., envelope protection limits, engine torque rate limits, HV channel/HV bus protection torque limits, etc.), or measured vehicle dynamics (e.g., measured revolutions-per-minute (RPM), measured voltage, etc.). DCPS 1033 may be configured to modify, based on the inputs, the one or more torque commands to dynamically generate one or more modified torque commands (e.g., dynamically varied torque commands). System 1000 may be configured to send the one or more dynamically modified torque commands to one or more engines of the aircraft. The disclosed embodiments may improve engine response to enhance aircraft stability and safety.

Figure 11:
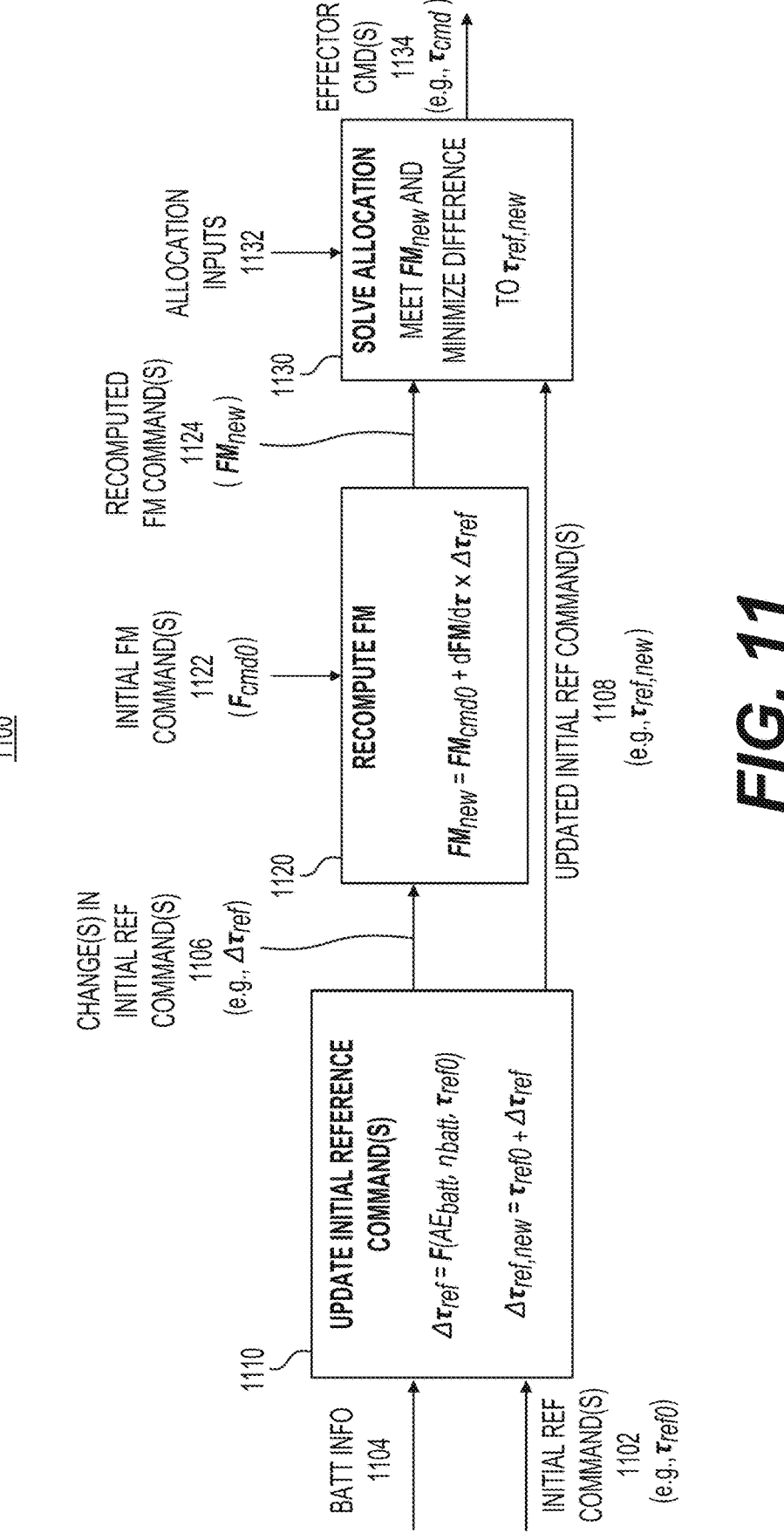
FIG. 11 illustrates a functional block diagram of an exemplary energy optimizing method, according to some embodiments.

FIG. 11 depicts a block diagram of an exemplary flight control system 1100 including an energy optimizing function, according to various embodiments. It is appreciated that the steps of the exemplary method depicted in FIG. 11 would be impossible, or at least impractical, to effectively implement by a human user, especially when considering that these functionalities are implemented frequently (e.g., constantly, continually), while the aircraft is flying (including taking off or landing), and/or dynamically based on (e.g., in response to) received signals (e.g., aircraft sensors, pilot input devices). In general, it may be understood that any/all steps of the exemplary method of FIG. 11 may be performed or executed by at least one processor (e.g., FCS, system 1000), such as according to one or more instructions stored on a computer-readable medium (e.g., non-transitory computer-readable medium). In some embodiments, the flight control system may include an energy optimizing function configured to update one or more initial reference commands (e.g., reference torques, reference torque commands, reference speeds, reference speed commands, reference power, reference power commands, reference current, and/or reference current commands). In some embodiments, the flight control system may be configured to recompute forces and/or moments based on the one or more updated initial reference commands and compute allocation (e.g., as described with respect to control allocation of FIG. 10) to meet (e.g., respond to, satisfy, address, be based upon) the recomputed forces and/or moments and to minimize a difference from the one or more updated initial reference commands. It is further appreciated that while FIG. 11 depicts an example of energy optimization associated with torque, FIG. 11 may alternatively or additionally be associated with any parameters related to aircraft effectors, such as speed, power and/or current.

At 1110, the energy optimizing function may update one or more initial reference commands 1102 (e.g., reference torque command(s), $\tau_{ref0}$). In some embodiments, the energy optimizing function may update the one or more initial reference commands 1102 based on battery information

1104 (e.g., from BMS, such as available energy (e.g., usable energy)), a remaining discharge time (e.g., of one or more battery packs, of one or more cross-links, of one or more independent high voltage buses, of one or more high voltage channels), a state of energy (SOE), a state of charge (SOC), a state of power (SOP), a state of health (SOH), a failure condition (e.g., short circuit or overcurrent, whether the battery is active/functional), or a state of temperature (SOT) of at least one (e.g., each) battery packs). For example, if one or more first rotors (e.g., engines, motors, EPUs) are connected to a first battery pack with low available energy (e.g., relative to the other battery packs, relative to an average available energy of all available (e.g., active, functional) battery packs), the energy optimizing function may update one or more first initial reference commands of one or more initial reference commands 1102 associated with the one or more first rotors to be in a first range prior to executing an allocation function (e.g., solving an allocation problem as described with respect to control allocation 1029 of FIG. 10,). Additionally or alternatively, if one or more second rotors are connected to a second battery pack with high available energy (e.g., relative to the other battery packs, relative to an average available energy of all available (e.g., active, functional) battery packs), the energy optimizing function may update one or more second initial reference commands of one or more initial reference commands 1102 associated with the one or more second rotors to be in a second range that is higher than the first range prior to executing the allocation function. In some embodiments, the energy optimizing function may update one or more initial reference commands 1102 based on a difference in state between at least two battery packs (e.g., between each battery pack) of a plurality of battery packs based on battery information 1104 received from one or more battery management systems associated with the plurality battery packs. In some embodiments, the energy optimizing function may be configured to calculate one or more updated initial reference torque commands as follows:

$$\Delta \tau_{ref} = F(AE_{batt}, \eta_{batt} \tau_{ref0})$$

$$\Delta \tau_{ref,new} = \tau_{ref0} + \Delta \tau_{ref}$$

where:

| | |
|---|---|
| $\tau_{ref0}$ | initial reference torque command(s) (e.g., determined by flight control system by using control law, based on aircraft conditions) |
| $AE_{batt}$ | battery available energy (e.g., per battery pack, or for at least one battery pack) |
| $\eta_{batt}$ | connections between aircraft components (e.g., between engines/rotors and HV channels/buses, between battery packs and engines/rotors, between battery packs) |
| $\Delta \tau_{ref}$ | change(s) in reference torque command(s) from initial reference torque command(s) |
| $\Delta \tau_{ref,\,new}$ | updated reference torque command(s) |

Usable energy (e.g., available energy), as discussed herein, may be determined by at least one BMS or flight control system based on battery information (e.g., measured information), such as remaining discharge time (e.g., of one or more battery packs, of one or more cross-links, of one or more independent high voltage buses, of one or more high voltage channels), a state of energy (SOE), a state of charge (SOC), a state of power (SOP), a state of health (SOH), a failure condition (e.g., short circuit or overcurrent, whether the battery is active/functional), or a state of temperature (SOT) of at least one (e.g., each) battery packs.

In some embodiments, the energy optimizing function may determine one or more initial reference commands 1102. Additionally or alternatively, the energy optimizing function may receive one or more initial reference commands 1102 from flight control law (e.g., as discussed with respect to system 1000). For example, the flight control system may use flight control law to determine one or more initial reference commands 1102. In some embodiments, the flight control system may include a lookup model configured to determine one or more of reference command(s) (e.g., initial reference torque commands, initial reference power commands, initial reference speed commands, initial reference current commands), reference effector positions, reference forces, reference moments, and/or one or more Jacobians (e.g., Jacobian matrices) based on one or more lookup tables. For example, the lookup model may refer to one or more lookup tables including scheduling parameters and use one or more current aircraft conditions (e.g., vehicle dynamics (e.g., of FIG. 10), ambient conditions, flight conditions (e.g., altitude, airspeed, acceleration, angle of attack, torque of one or more propellers, tilt angle and/or orientation of one or more propellers, whether powered lift is active, acceleration, load factor driving flaperon schedule, control surface positions/movements, phase of flight, speed of one or more propellers, and/or engine torque of one or more engines), a status and/or health of at least one (e.g., each) aircraft component (e.g., temperature, time, energy, and/or availability of battery packs, propulsion units, engines, high voltage buses and/or channels, etc.)) to determine the reference values and Jacobians. Scheduling parameters may include one or more of EPU scheduling (e.g., coordination of rotor/propeller speeds and orientations during different phases of flight), battery management (e.g., changing power draw from different battery packs to ensure optimal performance and longevity), control surface movements (e.g., coordinating movement of flaperons, elevators, rudders, or any other control surfaces during different phases of flight), power distribution (e.g., ensuring that critical systems receive priority power during any high-demand situations), timing of inputs to manage aircraft's attitude, altitude, and/or trajectory, thermal management (e.g., to schedule activation of cooling systems to manage temperature of critical components), data processing (e.g., timing of data collection), emergency response protocols (e.g., scheduling of activation of emergency procedures in response to certain triggers or conditions), autonomous system scheduling, or any scheduling to describe how different components of the aircraft are managed or coordinated for various aircraft conditions to ensure optimal performance, safety, and efficiency.

In some embodiments, the energy optimizing function may be configured to clip one or more initial reference commands. For example, the energy optimizing function may automatically clip one or more initial reference commands based on at least one of one or more envelope protection limits or status information (e.g., active, inactive, health, energy level, available) associated with one or more aircraft component (e.g., engine, battery, bus, channel). In some embodiments, the energy optimizing function may clip the initial rotor reference torque to be within an envelope protection range (e.g., below a maximum envelope protection limit, above a minimum envelope protection limit). In some embodiments, the energy optimizing function may receive one or more clipped initial reference commands (e.g., clipped by the flight control system using flight control law).

At 1120, the flight control system may recompute (e.g., adjust) one or more force or moment (FM) commands. For example, the flight control system may recompute one or more force or moment commands based on one or more initial force or moment commands 1122 (e.g., input of control allocation 1029 of FIG. 10, $F_{cmd0}$) and based on one or more outputs of 1110 (e.g., one or more changes (e.g., deltas) in initial reference command(s) 1106, difference between updated reference command(s) and initial reference command(s), $\Delta\tau_{ref}$). In some embodiments, the flight control system may recompute one or more force or moment commands as follows:

$$FM_{new} = FM_{cmd0} + dFM/d\tau \times \Delta\tau_{ref}$$

where:

| | |
|---|---|
| $FM_{cmd0}$ | initial force and/or moment command(s) (e.g., determined flight control system by using control law) |
| $dFM/d\tau$ | change(s) in forces and/or moment influenced by change(s) in torque |
| $\Delta\tau_{ref}$ | change(s) in reference torque command(s) from initial reference torque command(s) |
| $FM_{new}$ | recomputed force and/or moment command(s) |

At 1130, the flight control system may perform control allocation (e.g., solve allocation, steps performed by control allocation 1029 of FIG. 10) based on allocation inputs 1132, updated initial reference command(s) 1108, and recomputed force/moment commands 1124. In some embodiments, as a result of (e.g., based on) performing step 1130, the flight control system may output one or more effector commands 1134 (e.g., output of control allocation 1029 of FIG. 10, $\tau_{cmd}$, etc.). For example, based on received allocation inputs 1132 (e.g., outputs of inner loop control laws 1028, outputs of outer loop allocation 1026, and/or inputs to control allocation 1029 of FIG. 10, data received from one or more aircraft sensors, envelope protection limits, scheduling parameters, and/or optimizer parameters), the flight control system (e.g., control allocation 1029 of FIG. 10) may solve allocation such that the recomputed force and/or moment commands 1124 are satisfied (e.g., fully, within a threshold margin) and a difference between updated initial reference command(s) 1108 and one or more output effector commands 1134 is minimized.

In some embodiments, the energy optimizing function may be considered a secondary objective relative to at least one other objective or function (e.g., implemented by a flight control computer and/or by system 1000). For example, energy optimizing may have a lower priority than engine thermal management, which may be implemented by an engine thermal management function, discussed below. In some embodiments, an electric engine time scale may be shorter than a battery energy optimizing time scale. For example, an FCC or other device implementing different functions disclosed herein may optimize electric engine temperature parameters over an amount of time that is short than an amount of time over which it optimizes battery energy parameters. In some embodiments, when the energy optimizing function and engine thermal management function apply adjustments to reference values in a same direction, the larger of the two adjustments may be applied. In some embodiments, when the energy optimizing function and engine thermal management function produce outputs that oppose one another, the flight control system may associate a reference value associated with the engine thermal management function with greater weight (e.g., may only consider the reference value associated with the thermal management function) than a reference value associated with the energy optimizing function. In some embodiments, the flight control system may be configured to dynamically prioritize (e.g., balance) energy optimization or engine thermal management based on a current phase of flight, temperature of one or more aircraft components (e.g., engines, batteries), and/or remaining energy.

In some embodiments, the flight control system may include a battery thermal management function which may be configured similarly to the engine thermal management function. For example, the battery thermal management function may be configured to normalize temperatures across different battery components that may have different time constants and temperature limits using a time-based metric for temperature.

FIG. 12 is a flow diagram illustrating an exemplary method 1200 for energy optimization for a particular machine (e.g., an aircraft), according to some embodiments of the present disclosure, thereby improving the technology of aircraft (e.g., aircraft safety, energy efficiency, range capability, payload capacity, structural integrity). The steps of method 1200 may be performable by, for example, system 1000 of FIG. 10 executing on or otherwise using the components of any aircraft associated with any of FIGS. 1-8, 9A-9E, 10, 11, 13A-13D, 14-25, or any flight control computer (e.g., a computer-implemented method) or flight control system. For example, a flight control computer of the aircraft may be configured to perform one or more steps of method 1200.

The steps of method 1200 may be activated or adjusted as needed based on aircraft flight conditions, maneuvers, or operational requirements. It is appreciated that the illustrated method 1200 can be altered to modify the order of steps and to include additional steps. It is also appreciated that the complexity of method 1200 would be impossible, or at the very least grossly impractical, to effectively implement by a human user, especially when considering that these functionalities are implemented (e.g., in real time) while the aircraft is flying (including taking off or landing), while energy used by the aircraft and battery conditions are constantly changing. Moreover, energy optimization (e.g., using method 1200) improves the safety and range capabilities of the aircraft (e.g., how much energy is available for powering the aircraft) as well as lifespan of different components (e.g., batteries), without requiring any direct involvement of a user (e.g., pilot). In some embodiments, the aircraft of system 1000 may comprise an electric aircraft including a plurality of effectors including a plurality of electric propulsion units (EPUs) and a plurality of battery packs that power the plurality of electric propulsion units.

In step 1202, system 1000 may determine one or more desired commands for the electric aircraft. For examples, the one or more desired commands may comprise at least one of one or more force or moment commands (e.g., input of control allocation 1029 of FIG. 10), a desired position and/or turn-rate command (e.g., output of turn-rate command model 1004 of FIG. 10), a desired position and/or lateral speed command (e.g., output of lateral speed command model 1006 of FIG. 10), one or more of a desired altitude, vertical speed, or vertical acceleration command (e.g., output of climb command model 1008 of FIG. 10), one or more of a desired position, longitudinal speed, or longitudinal acceleration command (e.g., output of forward speed command model 1010 of FIG. 10), an alternative command to achieve a desired change (e.g., based on feedback as discussed in FIG. 10), one or more total desired forces (e.g., calculated based on outputs of feedback 1012, 1012, 1016, 1018, 1022 and feed forward 1014, 1020 of FIG. 10), one or more moment commands (e.g., determined by inner loop control laws 1028 of FIG. 10), linear commands, angular acceleration commands, pitch command, roll command, yaw command, or any command associated with a desired motion (e.g., desired by a pilot of the aircraft, desired by the flight control system, desired by an autopilot system) of the aircraft in the form of one or more signals (e.g., pilot input from pilot input device, input from an autopilot system, signal generated by the flight control system or computer).

In step 1204, system 1000 may determine at least one reference command (e.g., initial reference command) based on the one or more desired commands and one or more aircraft conditions. A reference command may comprise an attractor (e.g., ideal flight conditions, desired state, ideal actuator/effector positions/speed/torque/current/power) to achieve the one or more desired commands. For example, system 1000 may be configured to constantly monitor the aircraft's conditions or state (e.g., using feedback control systems), and may generate or adjust control commands (e.g., to adjust force/moment commands, to adjust aircraft components such as actuators, effectors, propulsion units, control surfaces, etc.) to correct any deviations from the reference commands. In some embodiments, system 1000 may determine the at least one reference command based on one or more aircraft conditions. Aircraft conditions may include one or more of vehicle dynamics (e.g., of FIG. 10), ambient conditions, flight conditions (e.g., altitude, airspeed, angle of attack, torque of one or more propellers, tilt angle of one or more propellers, whether powered lift is active, acceleration, load factor driving flaperon schedule, phase of flight, speed of one or more propellers, engine torque of one or more engines), and/or a status and/or health of at least one (e.g., each) aircraft component (e.g., availability of batteries, propulsion units, high voltage buses and/or channels, etc.). In some embodiments, determining the at least one reference command may comprise using a plurality of predetermined lookup tables to determine at least one initial (e.g., predetermined, stored) reference command based on current aircraft conditions. In some embodiments, system 1000 may determine at least one reference command for at least one (e.g., each) actuator, effector, or both. In some embodiments, system 1000 may determine at least one reference command for at least one (e.g., each) force, moment, or both. In some embodiments, the at least one reference command may comprise at least one of a position command, trim command, torque command, a power command, a current command, or a speed command.

In step 1206, system 1000 may monitor energy states of the plurality of battery packs. An energy state may be represented by and/or include one or more battery parameters (e.g., related to energy expended, energy remaining, available energy, usable energy, and/or energy to be expended) indicating measurements, predictions, and/or capabilities of a battery pack. In some embodiments, system 1000 may receive battery parameters associated with at least one (e.g., each) battery packs from one or more BMSs associated with the plurality of battery packs. Battery parameters may include one or more of a usable energy, a remaining discharge time (e.g., of one or more batteries, of one or more cross-links, of one or more independent high voltage buses, of one or more high voltage channels), a state of energy (SOE), a state of charge (SOC), a state of power (SOP), a state of health (SOH), a failure condition (e.g., short circuit or overcurrent, whether the battery is active/functional/dysfunctional/failed), or a state of temperature (SOT) of at least one (e.g., each) battery pack. In some embodiments, system 1000 may calculate at least one of the usable energy or remaining discharge time based on other battery information. In some embodiments, battery information may include a difference in power draw between engines (e.g., of the EPUs) of the plurality of EPUs. In some embodiments, system 1000 may be communicatively coupled (e.g., physical connection, such as a bus and/or channel system, or via a digital communication interface) with one or more battery management systems ("BMSs") of the aircraft. In some embodiments, the aircraft may include a single BMS configured to manage all battery packs on the aircraft. In some embodiments, at least one (e.g., each) battery pack may include its own BMS.

In some embodiments, system 1000 may also monitor a state of at least one (e.g., each) propulsion unit of the plurality of electric propulsion units. For example, system 1000 may receive, from at least one (e.g., each) EPU (e.g., via a digital communication interface, via inverter of the EPU) of the plurality of EPUs, EPU information (e.g., EPU state, engine state, and/or propeller state) associated with the EPU. EPU information may include one or more of at least one temperature of one or more components (e.g., engine, propeller) of at least one (e.g., each) EPU, one or more times associated with the at least one temperature of one or more components of at least one (e.g., each) EPU (e.g., time remaining for engine at current torque rating, such as continuous torque limit (e.g., 2204 of FIG. 22), engine takeoff torque limit (e.g., 2205 of FIG. 22), engine emergency torque limit (e.g., 2206 of FIG. 22), engine overheat torque limit (e.g., 2207 of FIG. 22), projected endurance at max takeoff torque (e.g., 2208 of FIG. 22) or projected endurance at max emergency torque (e.g., 2209 of FIG. 22)), or a failure condition (e.g., whether the EPU and/or components of the EPU are active and responding to commands). In some embodiments, monitoring energy states of the plurality of battery packs may include predicting energy information (e.g., capacity, capabilities) of the battery packs for one or more times (e.g., point(s) in time) in the future, as discussed further below. In some embodiments, system 1000 may use predicted energy information to influence aircraft operations to extend flight range of the aircraft and/or cause multiple battery packs to become drained (or near drained, such as drained to below a particular threshold) at or near (e.g., within a tolerance range of) a same time.

In step 1208, system 1000 may adjust the at least one reference command (e.g., initial reference command) based on the monitored energy states of the plurality of battery packs. In some embodiments, adjusting the at least one reference command may include clipping the at least one reference command using one or more command limits (e.g., envelope protection limits, minimum and/or maximum limits associated with effectors/actuators and at least one command parameter (e.g., position, speed, torque, power, current), based on dynamic aircraft conditions and/or predetermined maximum/minimum structural limits) such that the clipped reference command is within (e.g., below, over) command limits.

In some embodiments, adjusting the at least one reference command may include computing one or more estimated reference commands for at least one (e.g., each) high voltage bus/channel of a plurality of high voltage buses/channels. In some embodiments, the one or more estimated reference commands may comprise at least one of one or more power reference commands, one or more position reference commands, one or more trim reference commands, one or more torque reference commands, one or more speed reference commands, or one or more current reference commands. In some embodiments, computing the one or more estimated reference commands may be based on one or more aircraft component connections (e.g., high voltage architecture connections between one or more engines to one or more high voltage channels and/or buses, connections between battery packs, connections between one or more engines to one or more battery packs). For example, system 1000 may use a connection matrix including connection information associated with a high voltage architecture of the aircraft to compute the one or more estimated reference commands for at least one (e.g., each) high voltage bus/channel. In some embodiments, the connection matrix may map at least one (e.g., each) engine to an HV bus/channel. In some embodiments, the connection matrix may describe connections between aircraft components (e.g., between engines/rotors and HV channels/buses, between battery packs and engines/rotors, between battery packs). In some embodiments, the connection matrix may be stored in flight control law. In some embodiments, system 1000 may dynamically update the connection matrix based on dynamic updates to connections (e.g., based on identifying failure of one or more components connected to the high voltage architecture, based on failed connections).

In some embodiments, adjusting the at least one reference command may include determining one or more ratios (e.g., energy ratio, power ratio, torque ratio, speed ratio, current ratio) for at least one (e.g., each) high voltage channel or high voltage bus. For example, the ratio may comprise a normalized ratio representing a difference in estimated reference commands (e.g., total power command, total position command, total trim command, total torque command, total speed command, and/or total current command) between different buses/channels. In some embodiments, system 1000 may determine the ratio per high voltage bus/channel based on an average of a total command (e.g., total power command, total current command, total position command, total trim command, total torque command, and/or total speed command) of the high voltage buses/channels. For example, system 1000 may determine a power ratio per high voltage bus as follows:

$$P_{bus,i} = M_{EE-bus}\tau_{ref}^{1.5}$$

$$R_P = \frac{P_{bus,i}}{\text{mean } (P_{bus,i})}$$

where:

| $P_{bus,\,i}$ | estimated reference power command associated with bus i |
|---|---|
| $M_{EE-bus}$ | connection matrix |
| $\tau_{ref}$ | initial/clipped reference command |
| mean($P_{bus,\,i}$) | average of estimated reference power commands associated with high voltage buses |
| $R_P$ | power ratio |

In some embodiments, adjusting the at least one reference command may include determining an energy ratio for at least one (e.g., each) high voltage bus/channel. For example, determining the energy ratio may include determining a total available energy associated with at least one (e.g., each) high voltage bus/channel. Additionally or alternatively, system 1000 may normalize the total available energy based on an average of energy available on at least one (e.g., each) bus/channel. In some embodiments, system 1000 may determine an energy ratio per high voltage bus as follows:

$$R_E = \frac{E_{bus,i}}{\text{mean } (E_{bus,i})}$$

where:

| $E_{bus,\,i}$ | estimated reference energy command associated with bus i |
|---|---|
| mean($E_{bus,\,i}$) | average of estimated reference energy commands associated with high voltage buses |
| $R_E$ | energy ratio |

In some embodiments, adjusting the at least one reference command may include updating the one or more reference commands to optimize a remaining discharge time across all high voltage buses/channels. For example, system 1000 may adjust the at least one reference command (e.g., initial reference command, clipped reference command) based on the determined one or more ratios (e.g., power ratio, energy ratio, current ratio, torque ratio, speed ratio) and the connection matrix. In some embodiments, system 1000 may adjust the at least one reference command based on a relationship between at least two ratios. For example, system 1000 may adjust the at least one reference command based on a relationship (e.g., ratio) between one or more determined power ratios and one or more determined energy ratios. In some embodiments, system 1000 may determine (e.g., optimize) a remaining discharge time for at least one (e.g., each) high voltage bus/channel based on one or more of the at least one reference command, the determined one or more ratios, or the connection matrix. For example, system 1000 may update the one or more reference commands to balance (e.g., equalize to within a threshold) a remaining discharge time across all buses/channels as follows:

$$\tau_{ref,balanced} = \left[ M_{EE-bus}\left(\frac{R_E}{R_P}\right)^{2/3} \right] \tau_{ref}$$

where:

| $\tau_{ref,\,balanced}$ | adjusted reference command |
|---|---|
| $M_{EE-bus}$ | connection matrix |
| $\tau_{ref}$ | initial/clipped reference |
| $R_E$ | energy ratio |
| $R_P$ | power ratio |

In some embodiments, determining (e.g., optimizing) a remaining discharge time may comprise adjusting the at least one reference command such that a remaining discharge time for at least one (e.g., each) high voltage bus/channel is the same. Additionally or alternatively, determining (e.g., optimizing) a remaining discharge time may comprise adjusting the at least one reference command such that a remaining discharge time for at least one (e.g., each) high voltage bus/channel is within a predetermined range.

In some embodiments, system 1000 may adjust a first reference command associated with a first engine and a second reference command associated with a second engine when monitored energy states indicate that the first engine has a lower power draw than the second engine. For example, system 1000 may increase a torque or power command associated with the first reference command relative to a torque or power command associated with the second reference command.

In some embodiments, system 1000 may adjust the at least one reference command further based on the monitored state of at least one (e.g., each) propulsion unit of the plurality of electric propulsion units. For example, based on the received EPU information, system 1000 may adjust the at least one reference command to adjust (e.g., generate, update) one or more control commands (e.g., power command, position command, trim command, torque command, speed command, current command) transmitted to one or more EPUs (or components thereof, such as propeller or engine).

In some embodiments, system 1000 may adjust the at least one reference command further based on a prediction of power usage (e.g., power demanded or used by one or more components of the aircraft). For example, system 1000 may use simulation data (e.g., stored) or historical data to perform a prediction of power usage based on one or more aircraft conditions. In some embodiments, simulation and/or historical data may indicate a power usage of at least one (e.g., each) engine associated with different aircraft conditions. In some embodiments, simulation data or historical data may include one or more of flight test data, weather data, route data, expected discharge data, range data, or battery health data.

In some embodiments, system 1000 may clip the adjusted at least one reference command. For example, system 1000 may clip the adjusted at least one reference command using one or more command limits (e.g., envelope protection limits, minimum and/or maximum limits associated with effectors/actuators and command parameter (e.g., position, speed, torque, power, current) based on dynamic aircraft conditions and/or predetermined maximum/minimum structural limits) such that the clipped adjusted at least one reference command is within (e.g., below, over) command limits). In some embodiments, the adjusted at least one reference command of steps 1210 and 1212 may refer to the clipped adjusted at least one reference command.

In step 1210, system 1000 may generate control commands for the plurality of effectors based on the adjusted at least one reference command. In some embodiments, generating control commands for the plurality of effectors may include computing a difference in forces and moments based on the adjusted at least one reference command. In some embodiments, generating control commands may include recomputing forces or moments (e.g., as described in FIG. 11) based on the adjusted at least one reference command. For example, system 1000 may recompute forces and/or moments by determining a change in forces and/or moments as follows:

$$\Delta FM = dFM/d\tau(\tau_{ref,out} - \tau_{ref,in})$$

where:

| $\Delta FM$ | force/moment delta(s) |
|---|---|
| $dFM/d\tau$ | change(s) in forces and/or moment influenced by change(s) in torque |
| $\tau_{ref,\ in}$ | initial reference command (e.g., prior to initial clipping) |
| $\tau_{ref,\ out}$ | adjusted reference command (e.g., output of step 1208) |

In some embodiments, generating control commands for the plurality of effectors may include computing actuator limits based on the adjusted at least one reference command. In some embodiments, generating control commands for the plurality of effectors may include generating a plurality of control commands and selecting one or more control commands closest to the at least one reference command.

In some embodiments, system 1000 may generate control commands for the plurality of effectors further based on one or more temperatures associated with one or more aircraft components (e.g., engines, battery packs). For example, system 1000 may generate control commands for the plurality of effectors further based on one or more temperatures associated with one or more engines, such that the one or more temperatures stay within one or more predetermined ranges (e.g., continuous range, takeoff/landing range, emergency range). For example, system 1000 may generate control commands that adjust a weight or other parameter that reduces a torque commanded for one or more engines. In some embodiments, system 1000 may generate control commands for the plurality of effectors such that one or more temperatures associated with one or more aircraft components do not exceed a predetermined temperature (e.g., operating limit, instant-failure limit, warning limit).

In some embodiments, system 1000 may generate control commands for the plurality of effectors based on a priority associated with energy optimization and temperature management. For example, system 1000 may determine a first time remaining associated with available energy on the aircraft and a second time remaining associated with reaching a temperature limit. Based on the first time remaining being greater than the second time remaining, system 1000 may prioritize temperature management over energy optimization. Additionally or alternatively, based on the second time remaining being greater than the first time remaining system 1000 may prioritize energy optimization over temperature management.

In step 1212, system 1000 may control the plurality of effectors according to the generated control commands to meet (e.g., respond to, satisfy, address, be based upon) the desired commands of the electric aircraft. For example, system 1000 may send at least one (e.g., each) generated control command to its respective effector, causing the effector to move in accordance with the controlled command.

In some embodiments, method 1200 may result in optimized energy usage such that an amount of energy available on the aircraft for usage is maximized. In some embodiments, method 1200 may result in all battery packs running out of energy at the same time. In effect, method 1200 may result in maximizing available range of flight and may also increase safety by avoiding dangerous situations where one or more batteries run out of energy before the other batteries and are no longer able to power their respective EPUs.

Figure 13A:
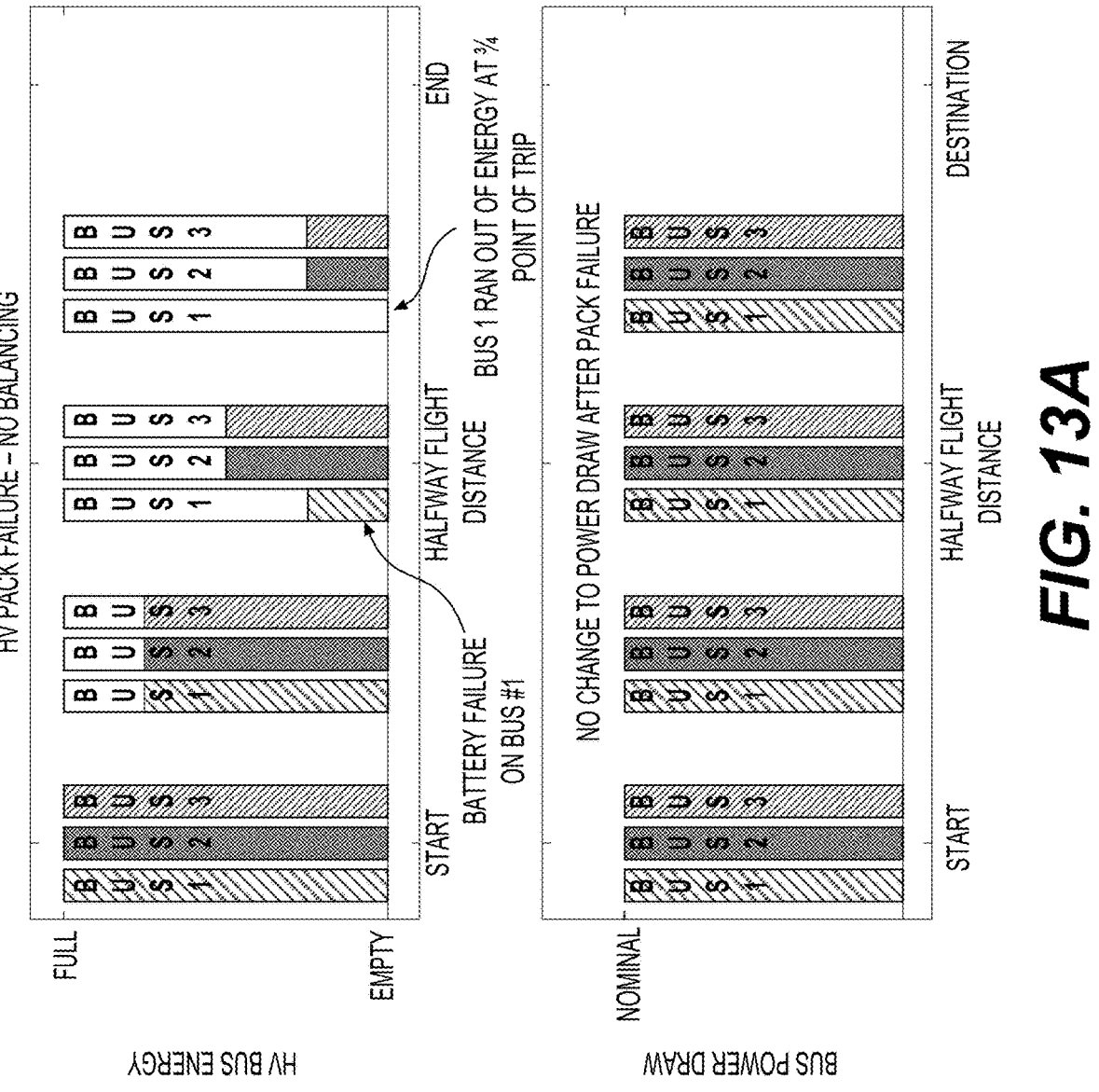
FIGS. 13A, 13B, 13C, and 13D show exemplary battery pack failure scenarios, according to some embodiments.
Figure 13B:
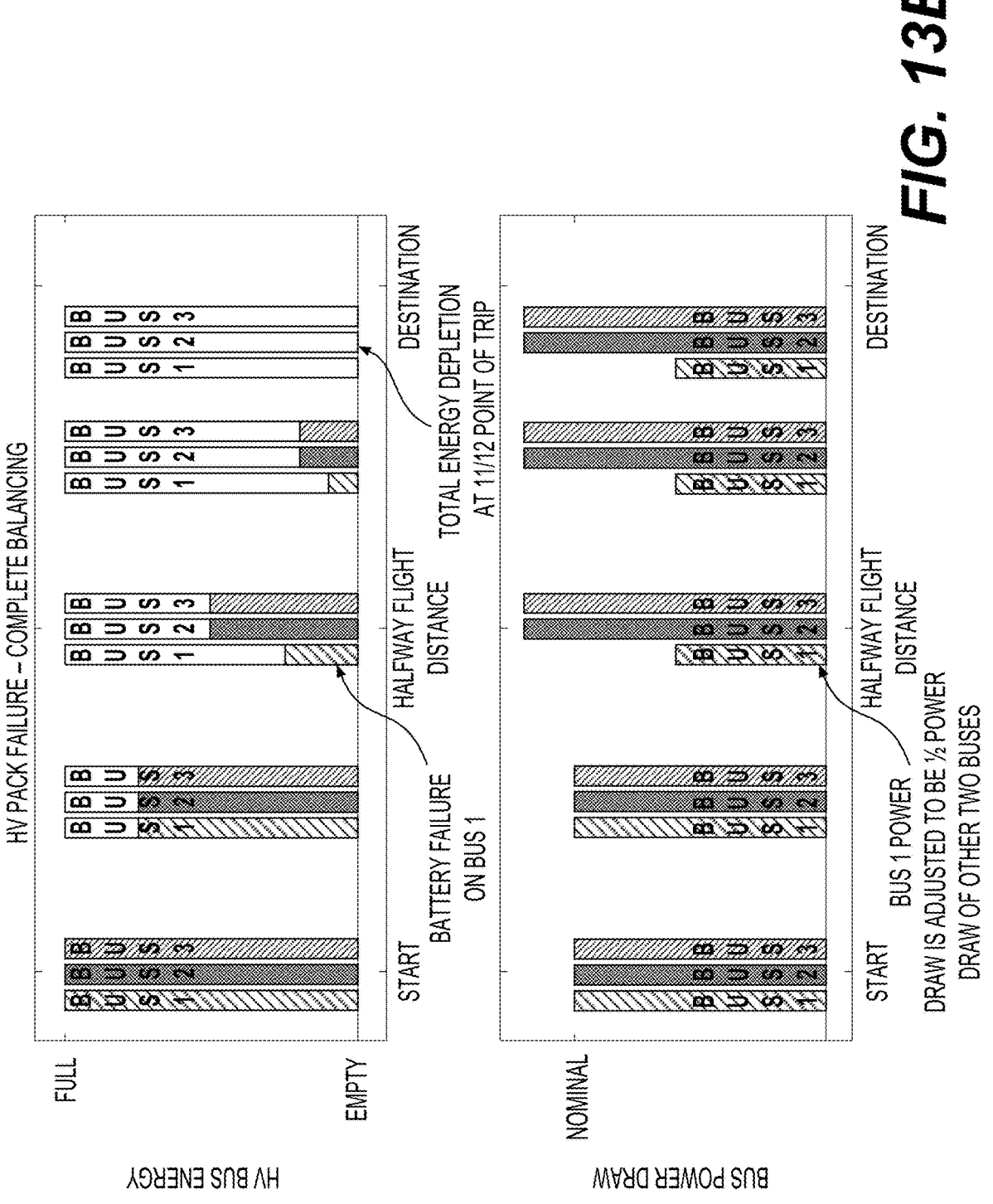

FIG. 13A illustrates an exemplary battery pack failure scenario without energy optimizing and FIG. 13B illustrates an exemplary battery pack failure scenario with energy optimizing (e.g., using system 1100 and/or method 1200), according to some embodiments. Both figures illustrate, in this exemplary scenario, bus energy and power draw for 3 buses (each connected to 2 batteries) of the aircraft at varying points of a flight or trip (e.g., start, halfway flight distance, end) where, at the halfway point, a battery pack connected to bus 1 fails. As shown in FIG. 13A, because there is no energy optimizing, the same amount of power is drawn from each bus (e.g., of bus 1, bus 2, bus 3) even after there is a battery failure on bus 1, resulting in bus 1 running out of energy at around ¾th distance of the total trip. On the contrary, energy optimizing is shown in FIG. 13B, wherein after the battery pack connected to bus 1 fails, an energy optimizing function adjusts the amount of power drawn from each bus to account for the battery pack failure. Doing so allows the aircraft to reach around $^{11}\!/_{12}$ distance of the mission and depletion of all battery packs at the same time. By implementing energy optimizing, such as by using the techniques described with respect to FIG. 11 or 12, the aircraft may be capable of extending its range of flight by distributing energy or power drawn from battery packs.

Figure 13C:
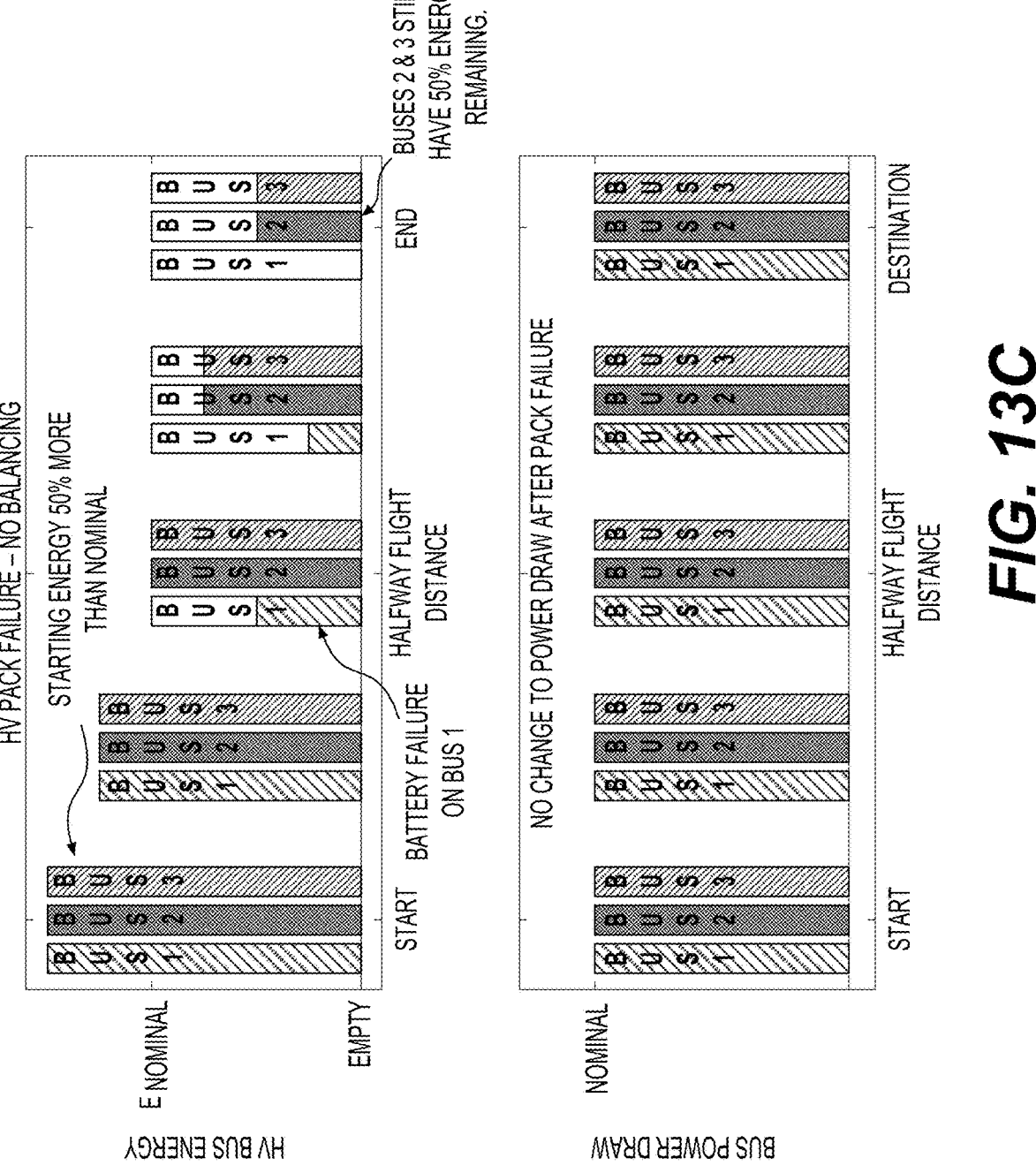
Figure 13D:
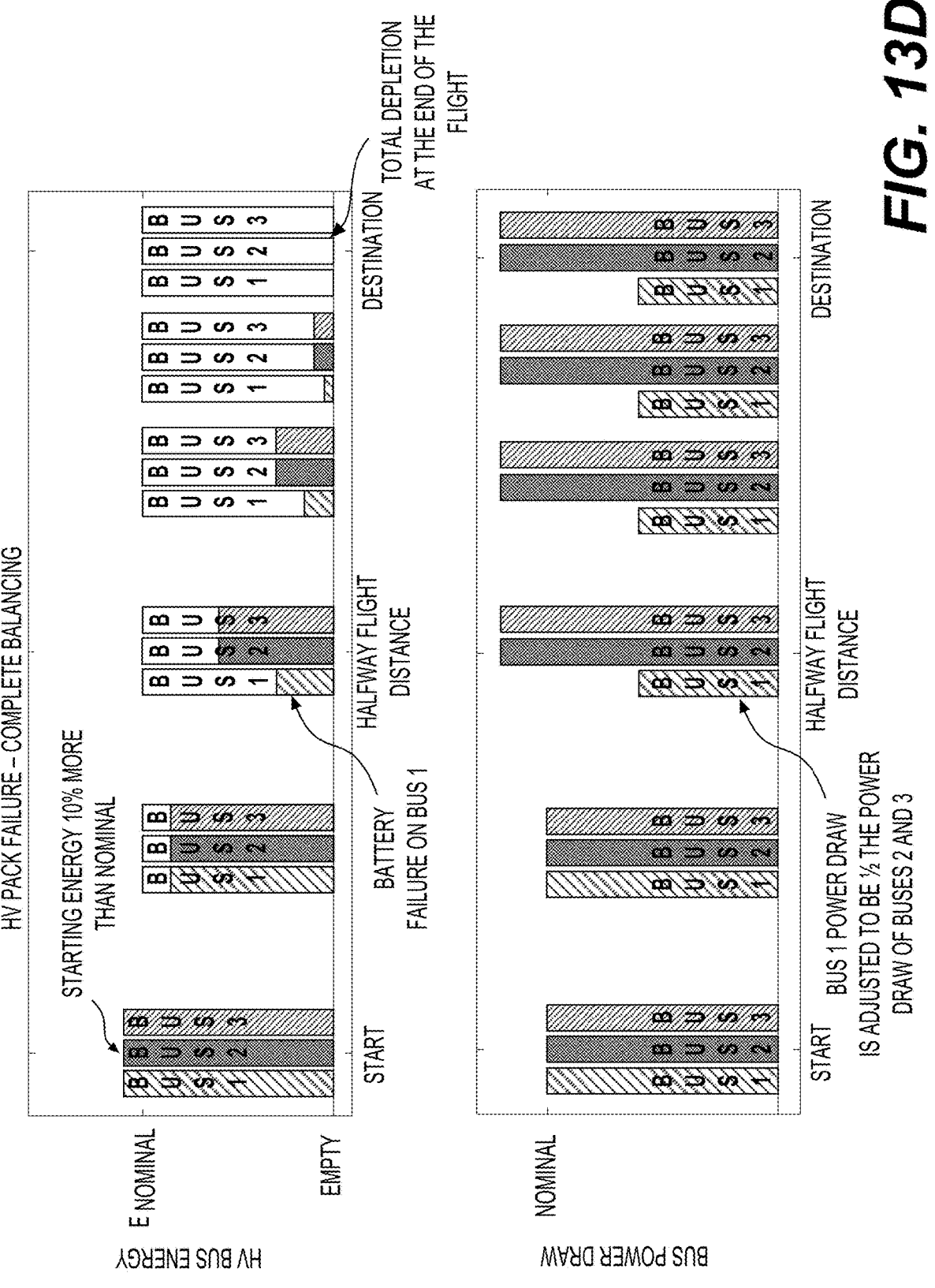

FIG. 13C illustrates an exemplary battery pack failure scenario without energy optimizing and FIG. 13D illustrates an exemplary battery pack failure scenario with energy optimizing (e.g., using system 1100 and/or method 1200), according to some embodiments. Both figures illustrate, in this exemplary scenario, bus energy and power draw for 3 buses (each connected to 2 batteries) of the aircraft at varying flight distances where, at the halfway point, a battery pack connected to one of the buses fails. As shown in FIG. 13C, which does not implement energy optimizing and starts with 50% buffer energy (e.g., 50% of nominal energy) in addition to the nominal energy, the same amount of power is drawn from each bus even after there is a battery failure on bus 1, resulting in one of the buses being depleted and 2 of the buses still with 50% energy remaining at the end of the mission. On the contrary, FIG. 13D implements energy optimizing and starts with 10% buffer energy in addition to the nominal energy, and the amount of power drawn from each bus is adjusted to account for the battery pack failure. Doing so allows the aircraft to reach the end of the trip with total depletion of energy from all 3 buses using less buffer energy than without energy optimizing. By implementing energy optimizing, such as by using the techniques described with respect to FIG. 11 or 12, less buffer energy may be required to complete a mission.

In some embodiments, the energy optimizing function may be configured to receive battery information (e.g., state of charge, state of energy, state of power, state of health, state of temperature, usable energy, etc.) for at least one (e.g., each) battery from a battery management system (BMS) of the flight control system. State of charge (SOC) may refer to an available battery pack capacity relative to the battery pack's rated capacity. For example, the state of charge may be based on an open circuit voltage (OCV) of the battery pack, where the OCV is the resting voltage of the battery pack (e.g., based on a battery pack without current flow for a set period of time). State of energy (SOE) may be a measure of remaining discharge energy for a battery. State of power (SOP) may be a maximum power capability that a battery can deliver over a period of time. State of health (SOH) may refer to an overall condition of a battery compared to its ideal conditions (e.g., amount of degradation). State of Temperature (SOT) may refer to a current temperature of the battery. Based on the received battery information for at least one (e.g., each) battery as well as the high voltage architecture of the flight control system, the energy optimizing function may set or adjust a reference point (e.g., reference command) for the flight control system to perform control allocation.

FIGS. 14-18 illustrate exemplary scenarios implementing the energy optimizing function (e.g., all or part of system 1100 and/or method 1200), according to some embodiments. In each scenario, HV bus 1 is associated with batteries 1 and 4 connected to HV channels 1 and 4 (not pictured), respectively, and engines 1, 4, 9 and 12. For example, battery 1 is connected to engines 1 and 12 via HV channel 1, and battery 4 is connected to engines 4 and 9 via HV channel 4. HV bus 2 is associated with batteries 2 and 5 connected to HV channels 2 and 5 (not pictured), respectively, and engines 2, 5, 8 and 11. For example, battery 2 is connected to engines 2 and 11 via HV channel 2, and battery 5 is connected to engines 5 and 8 via HV channel 5. HV bus 3 is associated with batteries 3 and 6 connected to HV channels 3 and 6 (not pictured), respectively, and engines 3, 6, 7, and 10. For example, battery 3 is connected to engines 3 and 10 via HV channel 3, and battery 6 is connected to engines 6 and 7 via HV channel 6.

"Battery Index" (e.g., Battery Index 1402, 1502, 1602, 1702, 1802 of FIGS. 14-18) may show an available energy associated with each battery pack (e.g., batt1, batt2, batt3, batt4, batt5, batt6). "HV Bus Energy Index" (e.g., HV Bus Energy Index 1404, 1504, 1604, 1704, 1804 of FIGS. 14-18) may show an available energy associated with each HV bus (e.g., bus1, bus2, bus3) and/or HV channel (e.g., ch1, ch4 of FIG. 18). "Engine Index" (e.g., Engine Index 1406, 1506, 1606, 1706, 1806 of FIGS. 14-18) may show an initial reference power command (e.g., "Input Ref") and an adjusted reference power command ("e.g., "Output Ref") associated with each engine (e.g., EE1-EE12). "HV Bus Power Index" (e.g., HV Bus Power Index 1408, 1508, 1608, 1708, 1808 of FIGS. 14-18) may show an initial reference command (e.g., "Input Ref") and an adjusted reference command (e.g., "Output Ref") for power draw associated with each HV bus (e.g., bus1, bus2, bus3) and/or HV channel (e.g., ch1, ch4 of FIG. 18).

Figure 14:
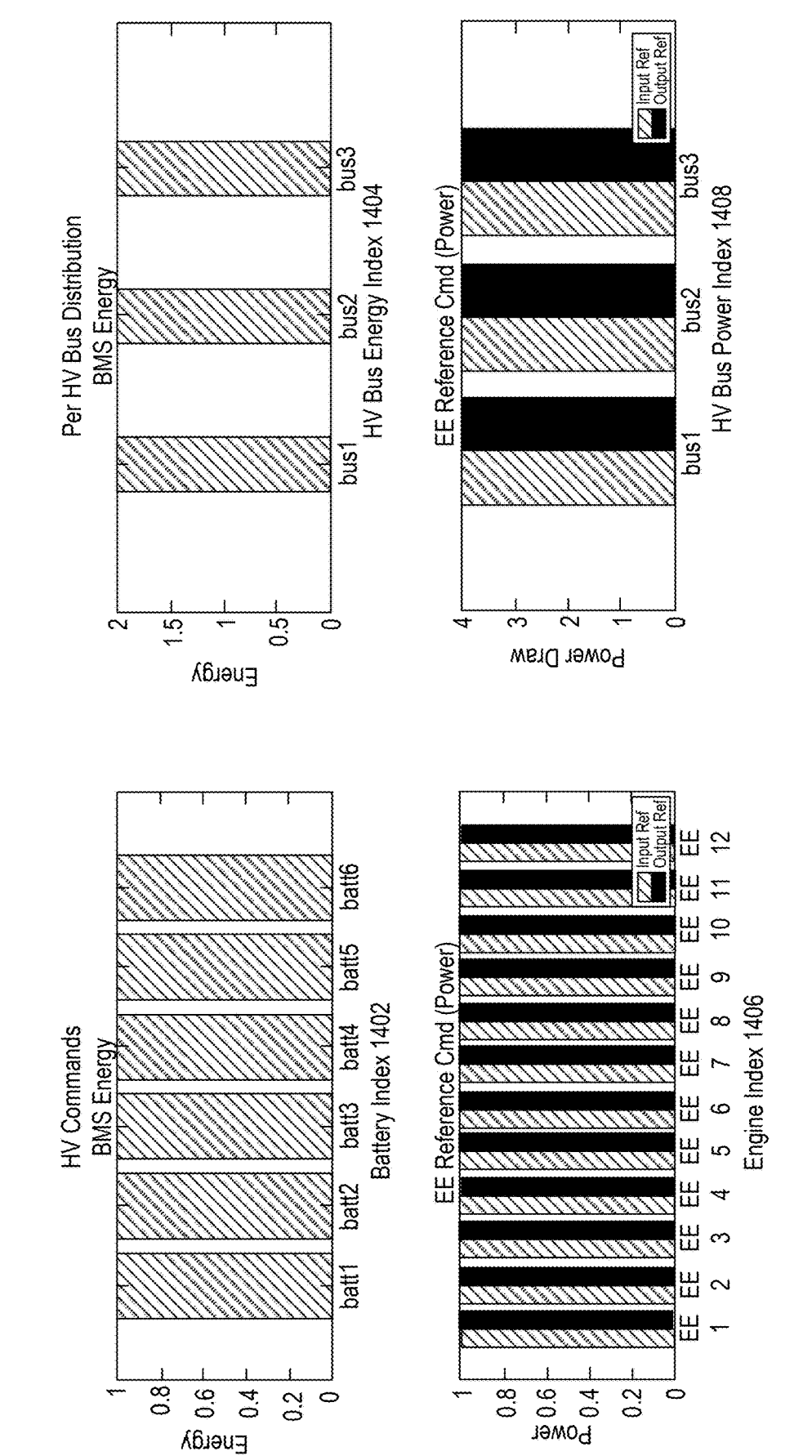
FIGS. 14, 15, 16, 17, and 18 show exemplary scenarios for energy optimization, according to some embodiments.

FIG. 14 illustrates a nominal scenario 1400 where each battery pack of batteries 1-6 has an equivalent available energy (e.g., indicated by Battery Index 1402) and all HV channels/buses have an equivalent available energy (indicated by HV Bus Energy Index 1404). In scenario 1400, initial reference commands (e.g., "Input Ref") input into the energy optimizing function may be the same as reference commands (e.g., "Output Ref") output/adjusted by the energy optimizing function, as shown in Engine Index 1406 and HV Bus Power Index 1408.

Figure 15:
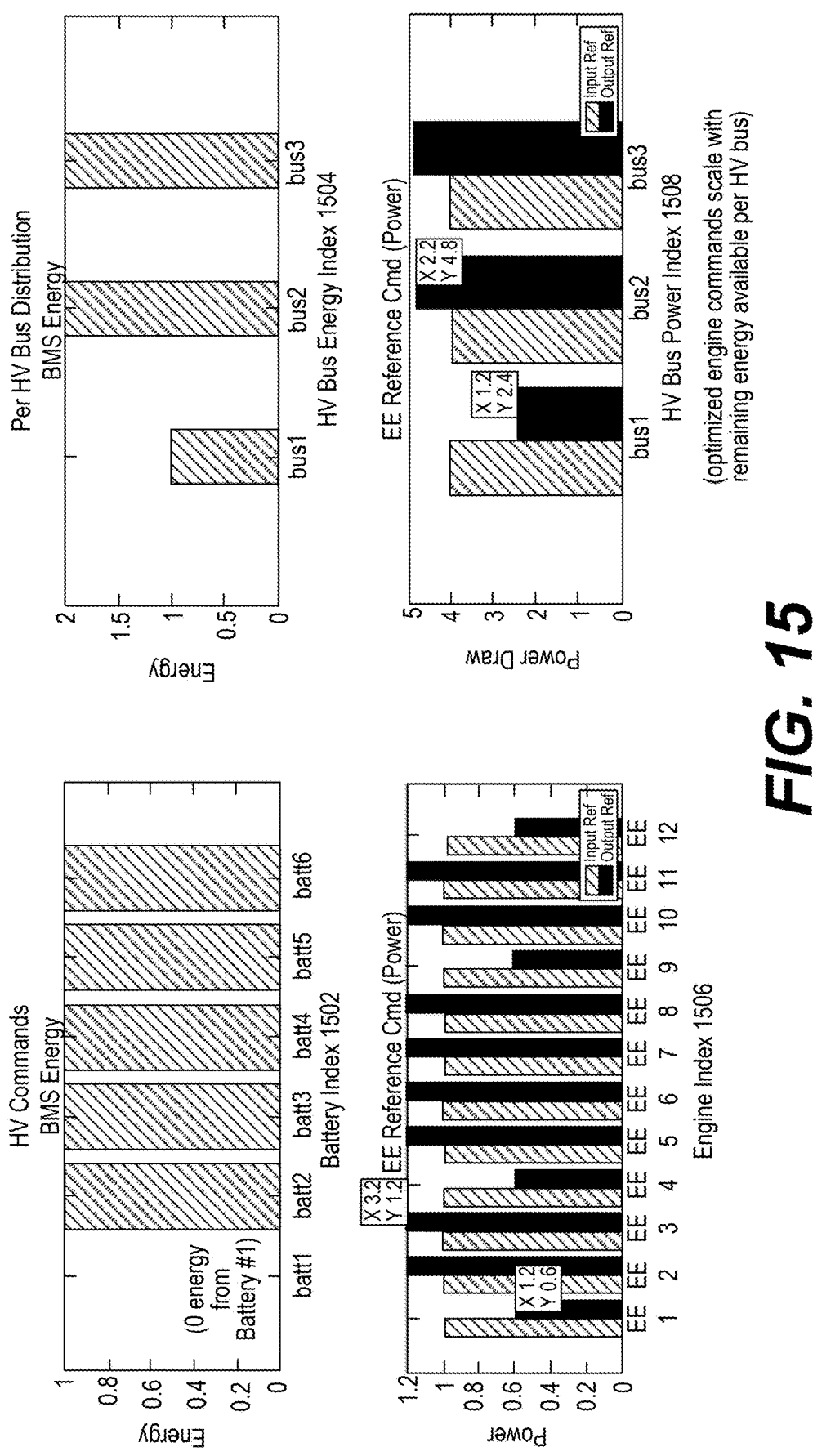

FIG. 15 illustrates a battery failure scenario 1500 where battery batt1 has failed and all other batteries (e.g., batt2-batt6) have an equivalent available energy (indicated by Battery Index 1502). HV bus bus1 associated with failed batt1 has about half the available energy of each of HV buses bus2 and bus3 (indicated by HV Bus Energy Index 1504). As shown in Engine Index 1506, energy optimizing function adjusts reference commands (e.g., "Output Ref") associated with engines EE1, EE4, EE9 and EE12 (which are only powered by battery batt2 via HV bus bus1) to be lower (e.g., "Output Ref" is about 0.6), and adjusts reference commands associated with engines EE2, EE3, EE5-EE8, EE10 and EE11 to be higher (e.g., "Output Ref" is about 1.2). As shown in HV Bus Power Index 1508, the energy optimizing function may adjust a reference command associated with HV bus bus1 connected to failed battery pack batt1 (e.g., "Output Ref" is 2.4) to be lower, and increase each reference command associated with HV buses bus2 and bus3 (e.g., "Output Ref" for both bus 2 and bus 3 is 4.8) to be higher in order to reduce power draw from bus bus1 and increase power draw from buses bus2 and bus3. Doing so may prevent HV bus bus1 from running out of energy before HV buses bus2 and bus3.

Figure 16:
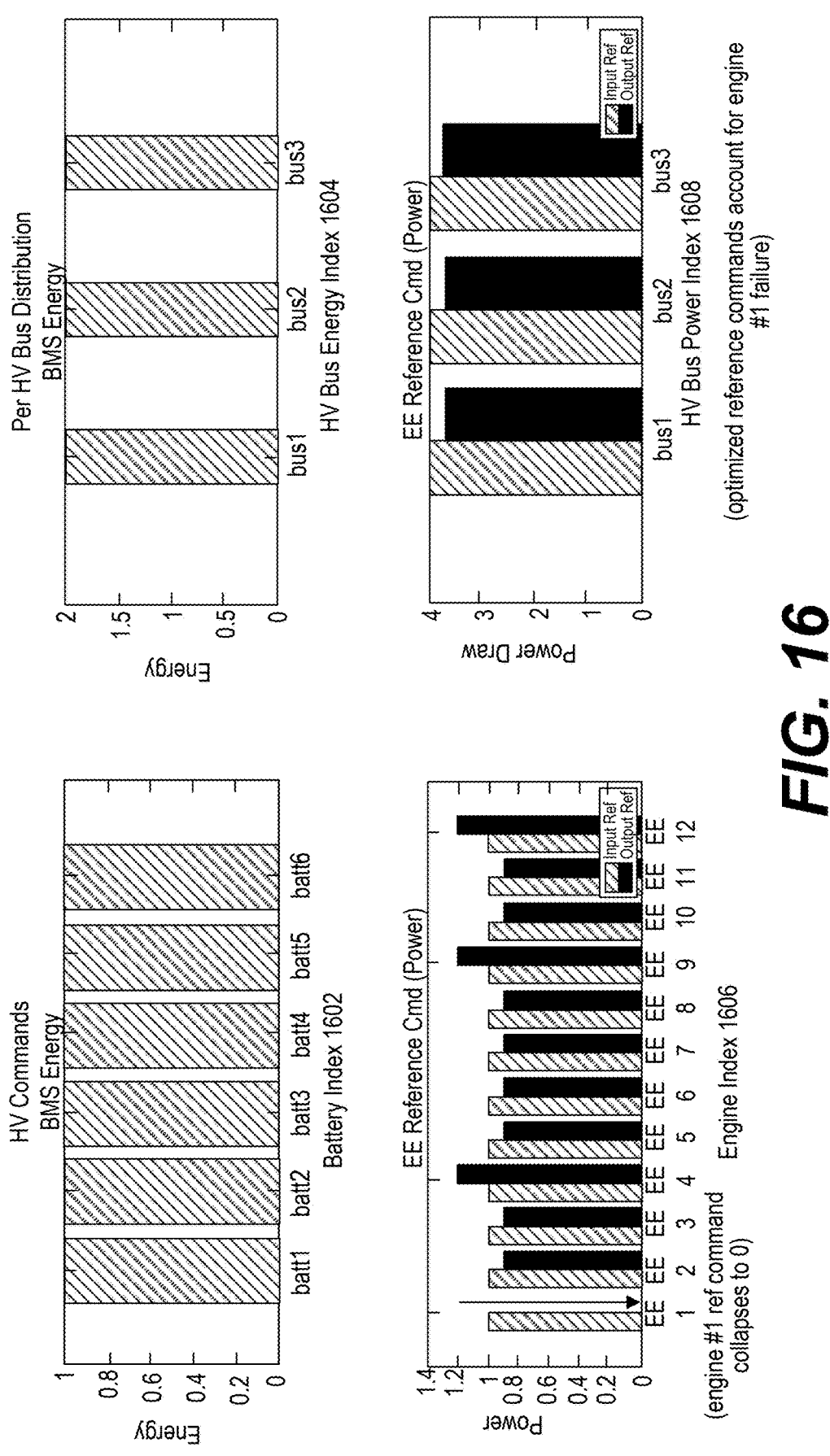

FIG. 16 illustrates an engine failure scenario 1600 where engine EE1 has failed. Each battery pack of batteries batt1-batt6 has an equivalent available energy (indicated by Battery Index 1602) and all HV buses bus1-bus3 have an equivalent available energy (indicated by HV Bus Energy Index 1604). As shown in Engine Index 1606, an output reference power command (e.g., "Output Ref") associated with engine EE1 collapses to 0, and the energy optimizing function adjusts reference power commands associated with engines EE4, EE9 and EE12 to be higher (e.g., "Output Ref" associated with 4, 9 and 12) to increase a torque/speed/usage associated with engines EE4, EE9 and EE12. Energy optimizing function adjusts reference power commands associated with engines EE2, EE3, EE5-EE8, EE10 and EE11 to be lower (e.g., "Output Ref" associated with 2, 3, 5-8, 10 and 11) to decrease a torque/speed/usage associated with engines EE2, EE3, EE5-EE8, EE10 and EE11. As shown in HV Bus Power Index 1608, energy optimizing function may adjust reference commands such that output reference commands associated with each bus are about the same (e.g., "Output Ref" for buses 1-3) even though HV bus bus1 connected to failed engine EE1 is only used to power engine EE12. As shown in scenario 1600, in response to engine failure, energy optimizing function may adjust reference commands associated with engines such that a remaining energy or remaining discharge time of each HV bus is about the same (e.g., such that a difference is within a threshold).

Figure 17:
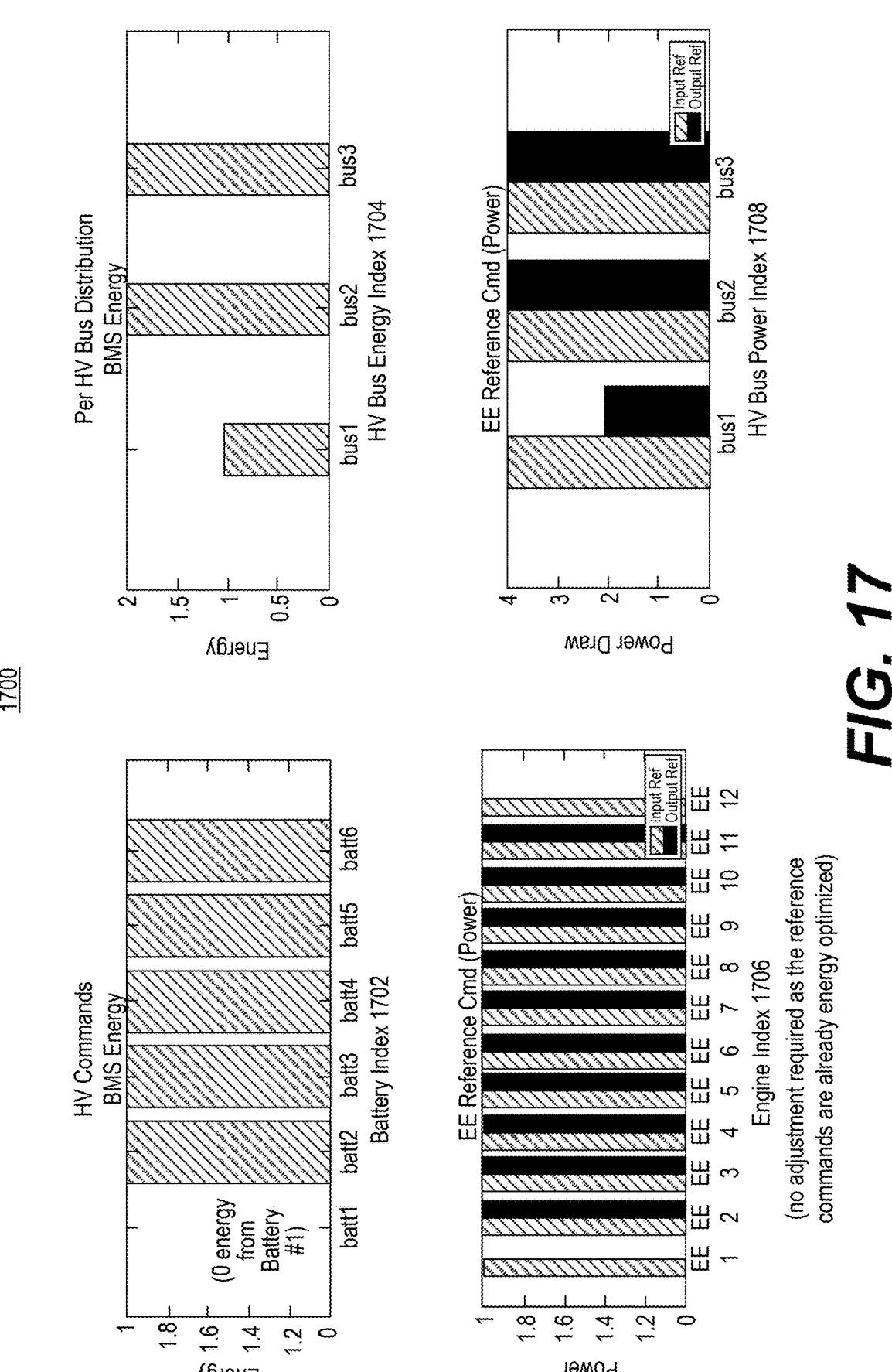

FIG. 17 illustrates an HV channel failure scenario 1700 where HV channel 1 of bus b1 has failed. Due to HV channel 1 failure, battery batt1 available energy may drop to 0 (indicated by Battery Index 1702) and HV bus but1 may only have half the available energy of each of buses bus2 or bus3 (indicated by HV Bus Energy Index 1704). As shown in Engine Index 1706, the energy optimizing function may not need to adjust the engine reference commands because HV channel 1 failure causes reference commands associated with engines EE1 and EE12 to collapse to 0, which may cause reference commands associated with bus bus1 to be automatically reduced (as shown in HV Bus Power Index 1708). As shown in scenario 1700, an effect of losing a battery may be reduced (e.g., balanced out) by an effect of losing two engines.

Figure 18:
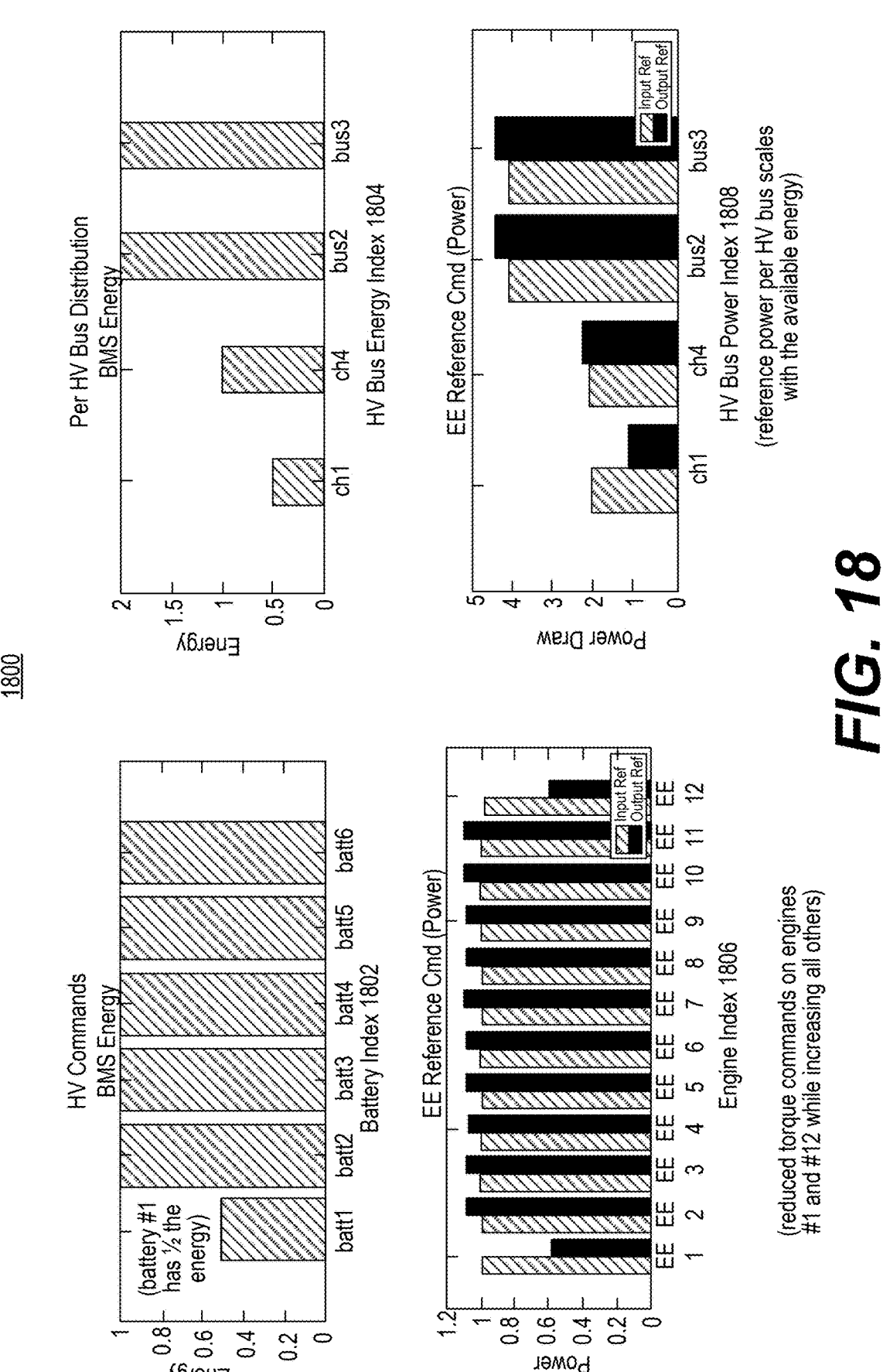

FIG. 18 illustrates a cross-link failure scenario 1800 where a cross-link (e.g., HV bus but1) connecting battery packs batt1 and batt4 has failed. Due to the cross-link failure, battery batt1 with only half available energy (indicated by Battery Index 1802) may result in HV channel 1 ch1 (of the failed cross-link) only having a quarter of the available energy of each of buses bus2 or bus3. In addition, due to the cross-link failure, battery batt4 with a same available energy as batteries batt2, batt3, batt5 and batt6 (indicated by Battery Index 1802) may result in HV channel 4 ch4 (of the failed cross-link) only having half the available energy of each of buses bus2 or bus3 (indicated by HV Bus Index 1804). As shown in Engine Index 1806, energy optimizing function may adjust reference commands by using estimated remaining discharge time per bus/channel. For example, energy optimizing function adjusts reference commands associated with engines EE1 and EE12 (which are only powered by battery batt1 via HV channel ch1) to be lower (e.g., "Output Ref" is about 0.6) to decrease a torque/speed/usage associated with engines EE1 and EE12, and adjusts reference commands associated with engines EE2-EE11 to be higher (e.g., "Output Ref" is about 1.2) to increase a torque/speed/usage associated with engines EE2-EE11. As shown in HV Channel Index 1808, the energy optimizing function may reduce a reference command associated with HV channel ch1 (of the failed cross-link) connected to battery batt1 and may increase each reference command associated with HV channel ch4 and HV buses bus2 and bus3 in order to prevent HV channel ch1 from running out of energy before channel ch4 and buses bus2 and bus3.

In some embodiments, a flight control system may include one or more engine thermal management functions. Engine thermal imbalance may have several causes, such as non-uniform propeller commands, differences in heat dissipation, differences in battery and/or engine health, and battery or engine failures. An electric engine may have thermal operating limits and the engine thermal management function may be configured to prevent the engine from experiencing any unacceptable operating characteristics (e.g., operating beyond a risk threshold) and from exceeding operating limits, including in failure conditions.

In some embodiments, at least one (e.g., each) electric engine (e.g., at least one processor associated with (e.g., part of and/or connected to) each engine) may be configured to estimate a time remaining for the engine at current power settings (e.g., as part of system 1100 and/or method 1200). In some embodiments, the at least one electric engine may include an engine time estimator (e.g., using an inverter or processor of the electric engine) configured to determine a temperature of one or more engine components. For example, various engine sensors may collect temperature data associated with one or more engine components, such as a control board, DC-link capacitor, rapid discharge, motor control unit (MCU), power module junction, stator winding, oil, or rotor magnet of the EPU. In some embodiments, the engine time estimator may normalize the temperatures in terms of time. In some embodiments, the engine time estimator may normalize temperatures determined for (e.g., calculated, measured, or received from) different components (e.g., rotor magnet, oil, control board, DC-link capacitor, motor control unit (MCU), rapid discharge, power module junction, stator winding, etc.) that have different time constants and temperature limits using a time-based metric for temperature. For example, different components of an electric engine may have different temperature limits (e.g., min and max temperature limits). In some embodiments, the engine time estimator may estimate time remaining based on a component with a lowest estimated time remaining. For example, the engine time estimator may communicate the lowest estimated time remaining to the FCS as the estimated time remaining for the engine at current power settings.

Figure 19:
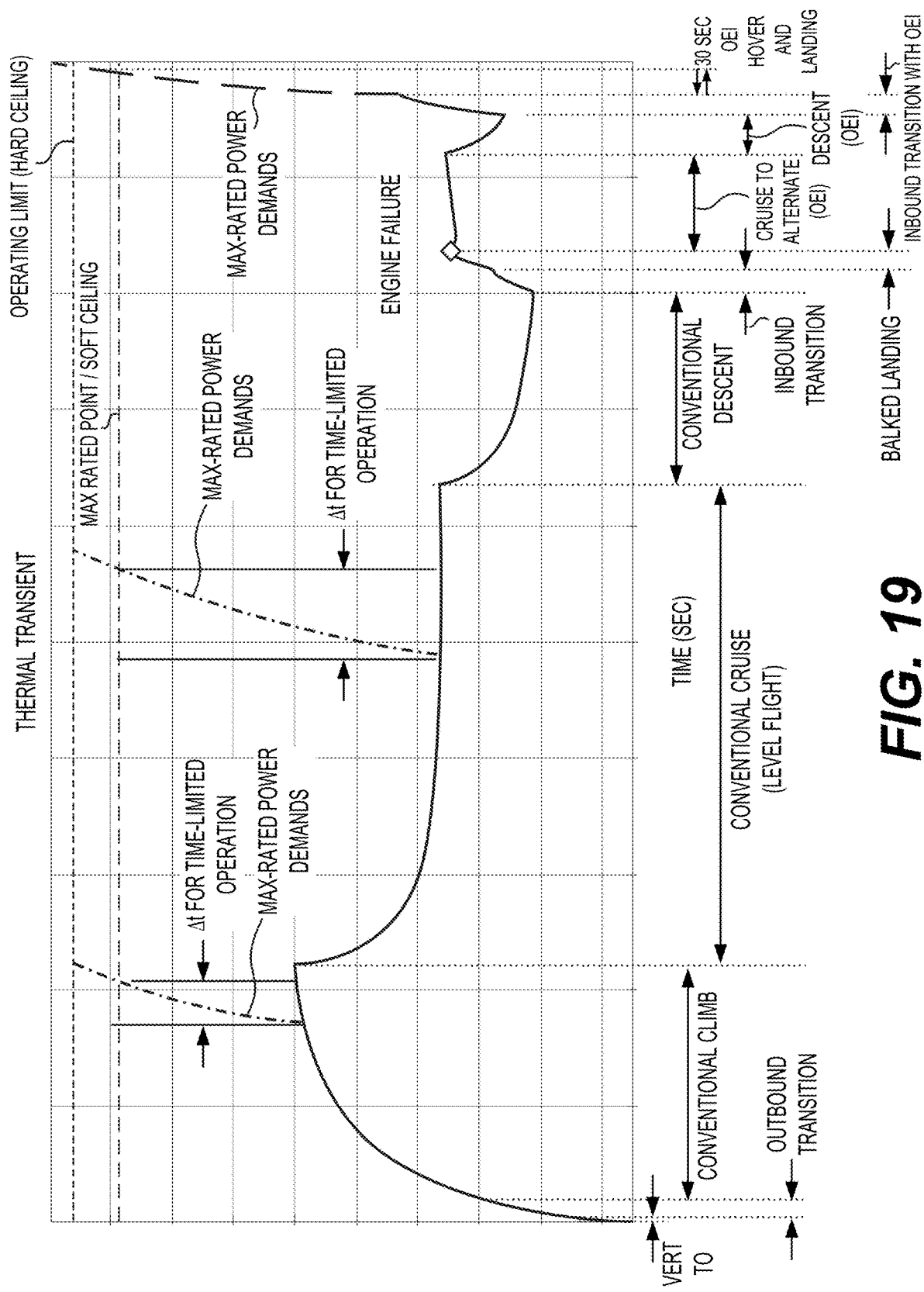
FIG. 19 shows an exemplary temperature versus time plot, according to some embodiments.

FIG. 19 illustrates an exemplary temperature versus time plot for a component for estimating time remaining (e.g., determined and/or used as part of system 1100 and/or method 1200), according to various embodiments. The engine time estimator may generate a plot for one or more components to summarize temperatures for different components with different temperature limits into a time-based metric allowing for visualization and/or data structure (e.g., usable by an engine thermal management function) of a minimum time to overheat for the engine. In some embodiments, the engine time estimator may take into consideration all components of the engine. In some embodiments, the engine time estimator may take into consideration a subset of components. In some embodiments, each phase of flight may have a different power output.

Figure 20:
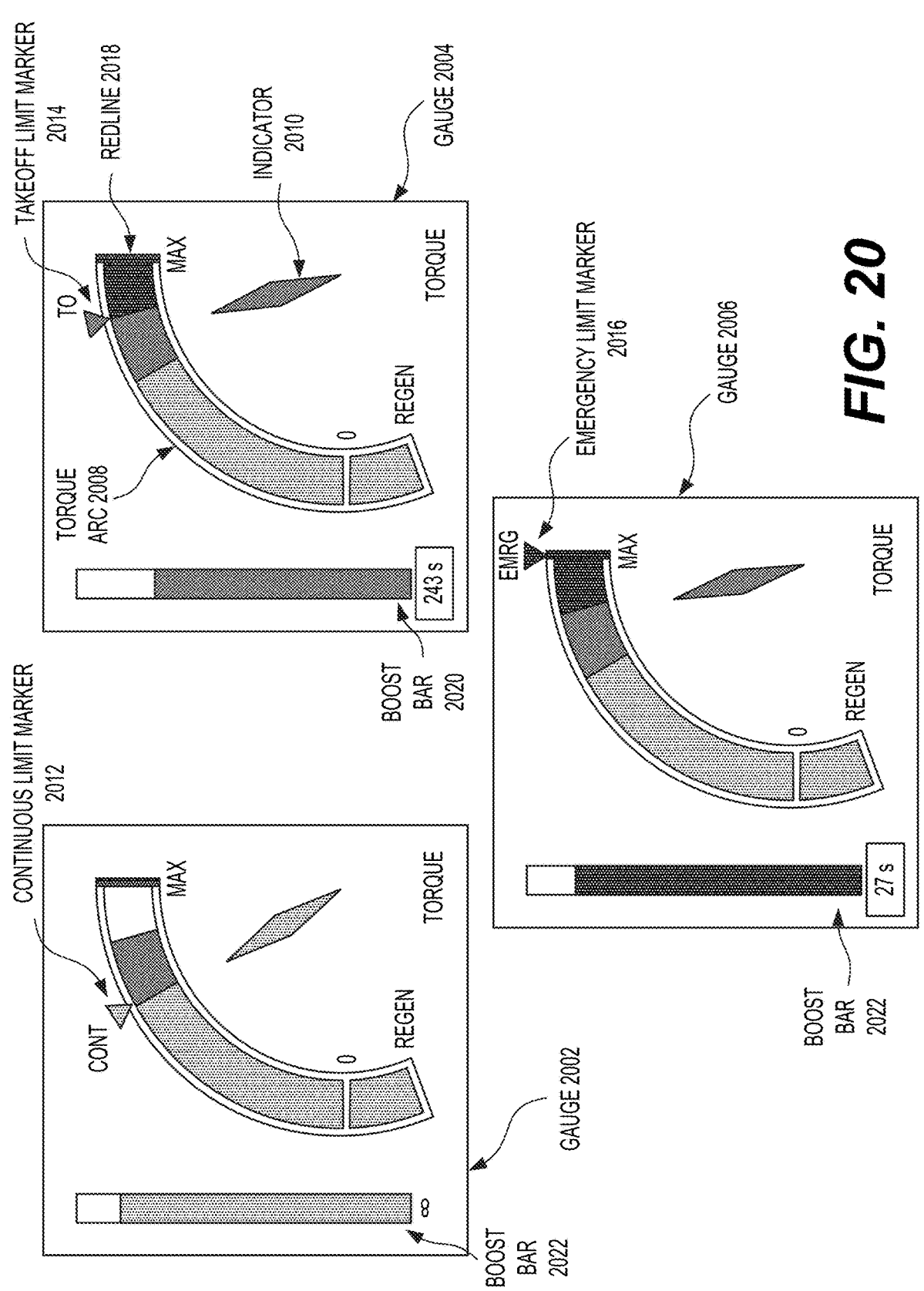
FIG. 20 shows exemplary gauges related to engine temperature, according to some embodiments.

FIG. 20 illustrates exemplary gauges for displaying information related to estimated time remaining (e.g., determined and/or used as part of system 1100 and/or method 1200), according to various embodiments. In some embodiments, a gauge may display a proximity of a torque or other aircraft parameter to a defined limit. While the gauges in FIG. 20 are shown with certain layouts and combination of visual elements, it is appreciated that other variations may be used to show proximity of a current operational aircraft state to a limit and/or a remaining amount of time (e.g., safe time, time remaining until engine reaches or exceeds a limit) in an operational aircraft state. In some embodiments, information displayed in a gauge may be based on information derived according to features described with respect to one or more of FIG. 19 or 21-25. A gauge (e.g., gauges 2002, 2004, 2006) may comprise a torque arc (e.g., torque arc 2008) showing available torque from operating engines, an indicator (e.g., indicator 2010) showing torque in use, a limit marker (e.g., continuous limit marker 2012 (CONT), takeoff limit marker 2014 (TO), emergency limit marker 2016 (EMRG)) showing a currently active torque limit, a redline (e.g., redline 2018) showing maximum torque, and a boost bar (e.g., boost bar 2020) showing time remaining at max torque for the current rating. For example, gauge 2002 displays continuous limit marker 2012 to show that a currently active torque limit is a continuous limit, which is associated with an infinite time remaining as shown in boost bar 2022. Gauge 2004 displays takeoff limit marker 2014 to show that a currently active torque limit is a takeoff limit, which is associated with a time remaining under a first predetermined threshold (e.g., 243 s, under 300 s) as shown in boost bar 2020. Gauge 2006 displays emergency limit marker 2016 to show that a currently active torque limit is an emergency limit, which is associated with a time remaining under a second predetermined threshold (e.g., 27 s, under 30 s) as shown in boost bar 2024. In some embodiments, the second predetermined threshold comprises a time that is less than the first predetermined threshold.

In some embodiments, an engine time estimator may be configured to determine one or more temperature parameters. For example, the engine time estimator may be configured to gather inputs from various sources (e.g., sensors, estimation algorithm, etc.). In some embodiments, at least one of the engine time estimators or the flight control system may be configured to identify a validity of the gathered inputs. For example, at least one of the flight control system or the engine time estimators may be configured to validate one or more communication signals (e.g., check for failures, lost communication for a certain timeout window, etc.). In some embodiments, the engine time estimator may be configured to compute a consolidated temperature value based on the input validity.

In some embodiments, the engine time estimator may be configured to detect one or more temperature faults (e.g., when temperature reaches a FCS warning threshold, when temperature reaches an engine action level, a thermal failure on powerstage, a low oil level, a low oil flow, no inverter oil flow, no stator oil flow, no gearbox oil flow, HEX airflow blocked, degraded temperature sensor, loss of temperature sensing, single phase short, etc.). For example, the engine time estimator may be configured to perform a validity check for the consolidated temperature value. In some embodiments, detecting one or more temperature faults may comprise determining whether the consolidated temperature value is outside a rated range. In some embodiments, detecting one or more temperature faults may comprise determining whether the consolidated temperature value is outside a limit range. In some embodiments, detecting one or more temperature faults may comprise determining whether an engine is thermally degraded (e.g., excessive $\Delta T$ rise due to an oil leak).

In some embodiments, an engine time estimator may run a background thermal model. For example, the background thermal model may predict a temperature of at least one (e.g., each) component of the engine (e.g., rotor magnet, oil, control board, DC-link capacitor, motor control unit (MCU), rapid discharge, power module junction, stator winding, etc.). In some embodiments, the background thermal model may utilize multiple nodes to predict the temperature of at least one component of the engine. Additionally or alternatively, the background thermal model may utilize a detailed loss function to predict the temperature of at least one key component of the engine. In some embodiments, the background thermal model may be fine-tuned and/or go through multiple rounds of testing to improve accuracy of predicting temperature.

In some embodiments, an engine time estimator may run a time remaining model. For example, the time remaining model may utilize information from the background thermal model to determine a current thermal state (e.g., current temperature) of at least one engine component. In some embodiments, the time remaining model may perform a forward forecast to determine (e.g., predict) a time remaining until one or more thermal limits are reached for at least one (e.g., each) component of the engine based on the determined current thermal state of the component. In some embodiments, the time remaining model may consider external ambient conditions. In some embodiments, the time remaining model may comprise a reduced order thermal model with a simplified loss function. In some embodiments, the time remaining model may comprise an analytical fits exponential rise curve with flattening for at least one (e.g., each) engine component of interest (e.g., rotor magnet, oil, control board, DC-link capacitor, motor control unit (MCU), rapid discharge, power module junction, stator winding, etc.). In some embodiments, the time remaining model may comprise a machine learning model (e.g., neural network model and/or a model trained with engine temperature values, flight parameters, and/or energy states at one or more flight stages) trained to accept one or more current thermal states of one or more engine components of an engine as input in order to output a time remaining associated with the engine. In some embodiments, an engine time estimator may generate a machine learning model based on training (e.g., simulation, historical, data from background thermal model) data.

In some embodiments, at least one of the engine thermal management function or the flight control system may be configured to perform one or more protective actions against overheating. In some embodiments, protective actions may include one or more of communicating a warning (e.g., to the flight control system, to the engine, to a pilot of the aircraft, to a nearest landing area via GPS), performing a torque ramp down (e.g., decreasing torque demanded by at least one EPU over time and/or adjusting at least one command, etc.), or performing an emergency shutdown.

In some embodiments, at least one (e.g., each, multiple) engine may communicate its respective estimated time remaining to the flight control system.

Figure 21:
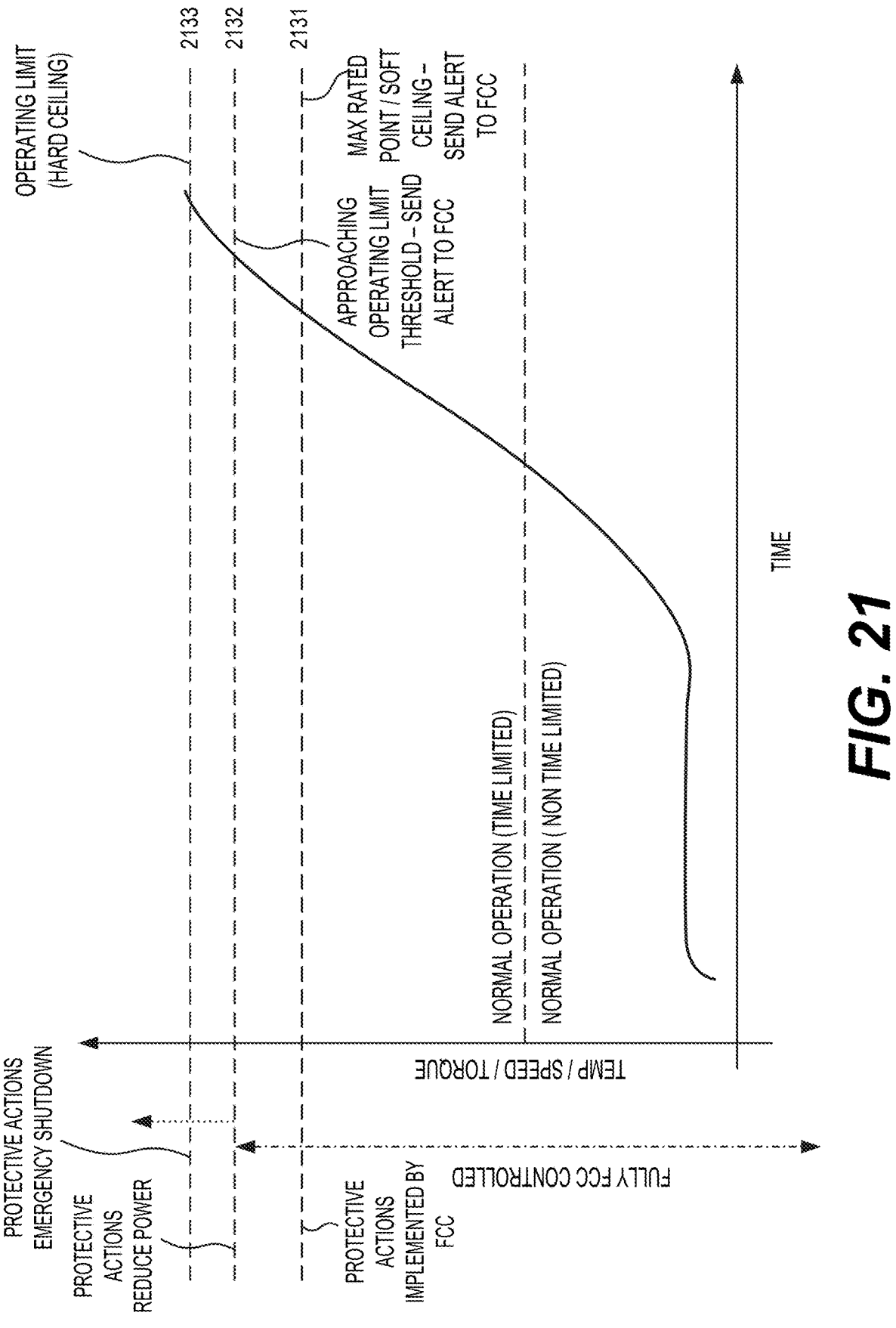
FIG. 21 shows exemplary temperature thresholds related to engine temperature, according to some embodiments.

FIG. 21 illustrates exemplary temperature thresholds (e.g., usable in system 2200, method 2300, and/or method 2400), according to various embodiments. Threshold 2131 may be a max rated point/soft ceiling, wherein when engine parameters exceed threshold 2131, the engine may send an alert to the FCC. In response to receiving the alert, the FCC may perform one or more protective actions. For example, the FCC may output an alert to the pilot, command a decrease in torque output of the engine, and/or command the engine to shut down. Exceeding threshold 2132 may indicate that an engine is approaching an operating limit, and the flight control system may automatically reduce torque output of an engine to keep the engine from overheating in response to this threshold being exceeded. Threshold 2133 may be an operating limit, and the flight control system may perform one or more emergency actions in response to this threshold being reached. For example, the flight control system may shut down the engine at issue. In some embodiments, commands received from the pilot (e.g., one or both pilot inceptors, button, switch) may be configured to exceed the operating limit threshold and/or override the one or more emergency actions performed by the flight control system.

Figure 22:
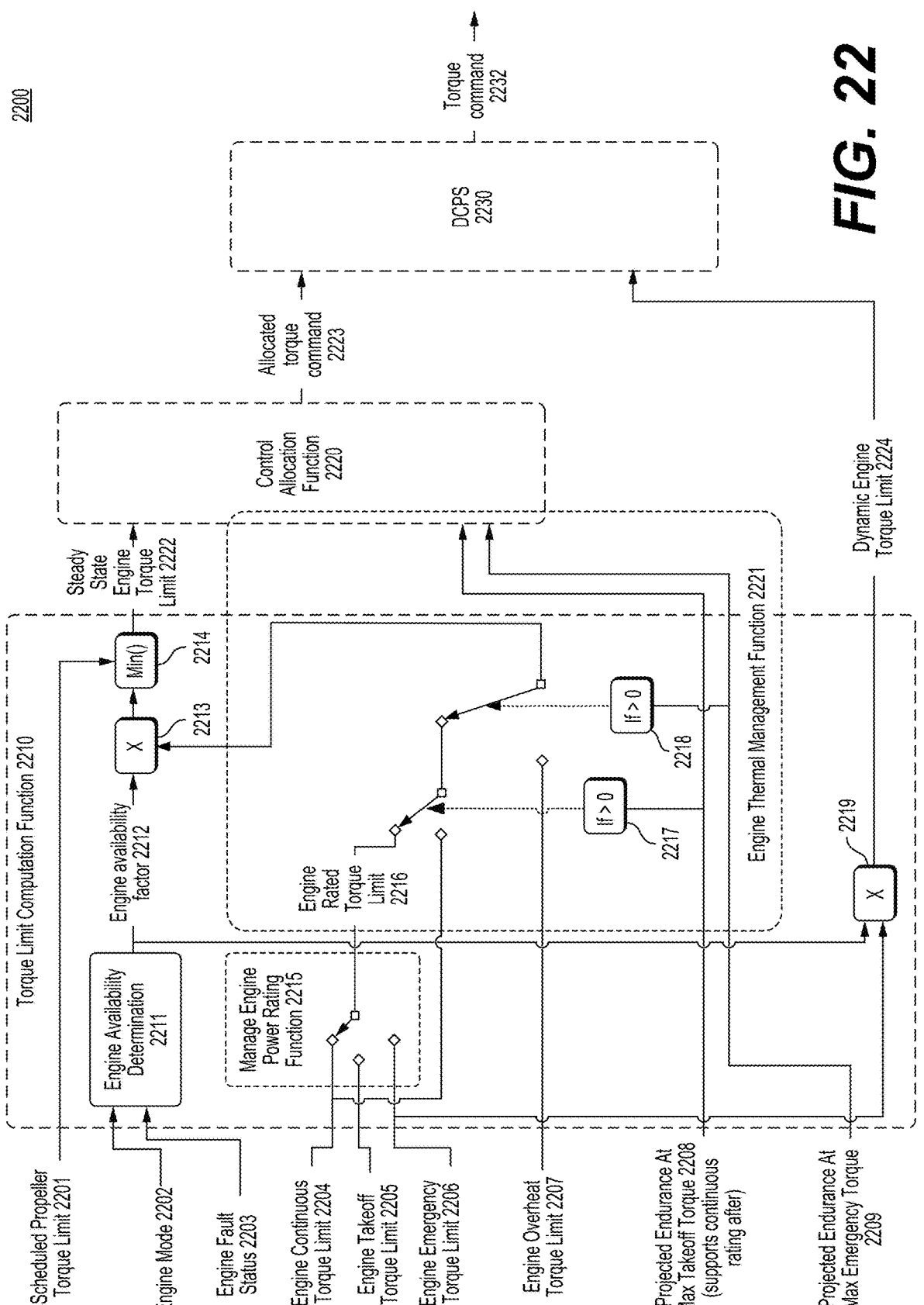
FIG. 22 illustrates a block diagram of an exemplary control system of an aircraft, according to some embodiments.

FIG. 22 is a functional block diagram of an exemplary system 2200 of a VTOL aircraft including a torque limit computation function (e.g., torque limit computation function 2226), consistent with disclosed embodiments. It is appreciated that a particular machine (e.g., an aircraft) may use an exemplary system 2200 to implement an improvement to the technical fields of aircraft safety, stability, reliability, and efficiency. For example, some embodiments may involve dynamically varying torque commands based on at least one aircraft condition, which can in turn be used by propulsion units to help make the aircraft safer, more stable, easier to fly, more reliable, and more efficient, for example, during different phases or modes of flight, consistent with disclosed embodiments. As illustrated in FIG. 22, system 2200 may include torque limit computation function 2210, control allocation function 2220 and DCPS 2230. System 2200 may be implemented by a microprocessor-based controller executing software code stored in a storage medium to implement the functions described herein. System 2200 may also be implemented in hardware, or a combination of hardware and software. System 2200 may be configured to perform a single step or sequence repeatedly until a desired or commanded outcome is achieved. It is to be understood that many of conventional functions of the control system are not shown in FIG. 22 for ease of description.

In some embodiments, torque limit computation function 2210 may be configured to receive at least one of system failures, pilot input, or engine data as input. For example, torque limit computation function 2210 may be configured to receive (e.g., from multiple engines or each engine of an aircraft) one or more of scheduled propeller torque limit 2201, engine mode 2202, engine fault status 2203, engine continuous torque limit 2204, engine takeoff torque limit 2205, engine emergency torque limit 2206, engine overheat torque limit 2207, projected endurance at max takeoff torque 2208, or projected endurance at max emergency torque 2209. In some embodiments, one or more inputs may be preset based on at least one of design specifications, structural limitations, or cooling capabilities of the aircraft. For example, one or more inputs may be associated with regulatory values.

In some embodiments, system 2200 may include engine power rating management function 2215. Engine power rating management function 2215 may be configured to select an appropriate torque rating (e.g., engine continuous torque limit 2204, engine takeoff torque limit 2205, engine emergency torque limit 2206) for at least one engine (e.g., each engine or multiple engines of the aircraft) based on phase of flight (e.g., hover, cruise/continuous, transition, takeoff/landing) and one or more operational requirements. For example, function 2215 may be configured to select, based on a determination that the aircraft is in a takeoff or landing phase of flight, engine takeoff torque limit 2205 as the torque rating. Additionally or alternatively, function 2215 may be configured to select, based on a determination that the aircraft is in a cruise phase of flight, engine continuous torque limit 2204 as the torque rating. Additionally or alternatively, function 2215 may be configured to select, based on detecting one or more system failures (e.g., engine failure, damaged aircraft components, etc.), engine emergency torque limit 2206 as the torque rating. In some embodiments, manage power rating function 2215 may comprise an automatic function configured to dynamically switch between torque ratings based on phase of flight, operational requirements and vehicle dynamics (e.g., aircraft conditions, system failures). In some embodiments, manage engine power rating function 2215 may comprise a switch configured to receive pilot input via a toggle feature.

In some embodiments, system 2200 may include engine thermal management function 2221. Engine thermal management function 2221 may be configured to manage (e.g., adjust, configure, set, and/or monitor) engine temperature to ensure that an (e.g., each, at least one) engine operates within safe parameters to prevent overheating and damage to engine components. For example, engine thermal management function 2221 may be configured to determine, based on the maximum power for at least one aircraft engine output from manage engine power rating function 2215 (e.g., for each engine or multiple aircraft engines), engine rated torque limit 2216 of the at least one engine.

Engine rated torque limit 2216 may correspond to a maximum torque that an engine may be capable of producing under normal, continuous operating conditions. In some embodiments, engine thermal management function 2221 may receive one or more of engine overheat torque limit 2207, projected endurance at max takeoff torque 2208, or projected endurance at max emergency torque 2209 from at least one (e.g., each) engine. Based on at least one of projected endurance at max takeoff torque 2208 or projected endurance at max emergency torque 2209, engine thermal management function 2221 may determine which limit (e.g., engine continuous torque limit 2204, engine takeoff torque limit 2205, engine emergency torque limit 2206, engine overheat torque limit 2207, engine rated torque limit 2216) to use for determining steady state engine torque limit 2222. For example, based on a determined amount of time remaining for takeoff torque, which may be represented by a timer for projected endurance at max takeoff torque 2208 indicating time remaining (e.g., greater than 0, the aircraft is capable of sustaining its operation at max takeoff torque) at 2217 and time remaining at 2218, engine thermal management function 2221 may use engine rated torque limit 2216 for determining steady state engine torque limit 2222. Additionally or alternatively, based on a determined amount of no time remaining for takeoff torque, which may be represented by a timer for projected endurance at max takeoff torque 2208 indicating no time remaining (e.g., not greater than 0) at 2217 and time remaining at 2218, engine thermal management function 2221 may use engine continuous torque limit 2204 for determining steady state engine torque limit 2222. Additionally or alternatively, based on no time remaining for emergency torque, which may be represented by a timer for projected endurance at max emergency torque 2209 indicating no time remaining (e.g., not greater than 0, the aircraft is not capable of sustaining its operation at max emergency torque) at 2218, engine thermal management function 2221 may use engine overheat torque limit 2207 for determining steady state engine torque limit 2222. In some embodiments, engine thermal management function 2221 may be configured such that a time buffer exists between timer 2217 and timer 2218 (e.g., such that timer 2217 and timer 2218 do not reach 0 simultaneously).

In some embodiments, engine thermal management function 2221 may be configured to return the torque limit to a normal torque rating after (e.g., based on, in response to) receiving indication of engine cool-down. For example, after setting engine overheat torque limit 2207 as the torque limit for an engine, engine thermal management function 2221 may receive indication that a temperature of the engine has lowered to below a predetermined temperature threshold. Additionally or alternatively, engine thermal management function 2221 may receive an indication that a time remaining for projected endurance at a torque rating (e.g., timer 2218) is greater than a predetermined time threshold (e.g., indicating sufficient cooling of engine). Engine thermal management function 2221 may be configured to set, based on the indication, one of torque limits 2204, 2205 or 2206 as the torque limit of the engine.

In some embodiments, torque limit computation function 2210 may be configured to determine one or more steady state engine torque limits 2222. Determining one or more steady state engine torque limits 2222 may comprise at least one of receiving, retrieving, or checking one or more scheduled propeller torque limits. In some embodiments, the one or more scheduled propeller torque limits 2201 may be determined based on at least one of one or more RPM limits and/or structural load limits. For example, structural load limits may be associated with loads imparted by one or more of an engine on a propeller hub, rotation of a propeller, propeller blade, mount between propeller and engine, mount between engine and boom, mount between boom and wing, or booms themselves. Additionally or alternatively, the one or more scheduled propeller torque limits 2201 may comprise one or more predetermined values specified for particular aircraft configurations. For example, the one or more scheduled propeller torque limits 2201 may be specified based on propeller design or structural limits of the aircraft. In some embodiments, determining one or more steady state engine torque limits 2222 may comprise determining engine availability 2211. For example, engine availability determination 2211 may comprise determining whether at least one (e.g., each) engine is currently operating and available for control based on one or more of engine mode 2202 (e.g., state of inverter internal state machine, factor of 0 at standby/listening mode, factor of 0 at stow mode, factor of 1 at closed loop torque command mode, etc.) or engine fault status 2203. In some embodiments, engine availability determination 2211 may output engine availability factor 2212, which may indicate a level of functionality associated with one or more engines (e.g., relative to expected, or full, functionality). For example, engine availability factor 2212 may comprise a value such as 0 for not operating, 1 for fully operational, and 0.5 for indication of a failure condition (e.g., losing one of two sets of windings causing generation of only about half of a normal amount of torque of an engine). In some embodiments, based on a torque limit (e.g., engine continuous torque limit 2204, engine rated torque limit 2216, engine overheat torque limit 2207) determined by engine thermal management function 2221, torque limit computation function 2210 may combine (e.g., multiply) engine availability factor 2212 with the torque limit at 2213.

At 2214, torque limit computation function 2210 may compare scheduled propeller torque limit 2201 to the output of 2213 and may output the lower limit as steady state engine torque limit 2222.

In some embodiments, torque limit computation function 2210 may be configured to determine one or more dynamic engine torque limits 2224. Determining one or more dynamic engine torque limits 2224 may comprise combining (e.g., multiplying) engine availability factor 2212 output from engine availability determination 2211 with engine emergency torque limit 2206 at 2219. In some embodiments, steady state engine torque limit 2222 for an engine may comprise a lower limit than dynamic engine torque limit 2224 for the engine.

Control allocation function 2220 may be configured to determine one or more allocated torque commands 2223. In some embodiments, one or more allocated torque commands 2223 may comprise one or more propeller torque commands. In some embodiments, control allocation function 2220 may be configured to determine one or more allocated torque commands 2223 based on at least one of steady state engine torque limit 2222, projected endurance at max takeoff torque 2208, or projected endurance at max emergency torque 2209.

DCPS 2230 may be configured to determine one or more engine torque commands 2232. In some embodiments, one or more engine torque commands 2232 may comprise one or more modified propeller torque commands. In some embodiments, DCPS 2230 may be configured to determine one or more engine torque commands 2232 based on at least one of allocated torque command 2223 or dynamic engine torque limit 2224.

FIG. 23 is a flow diagram illustrating an exemplary method 2300 for engine thermal management for a particular machine (e.g., an aircraft), according to some embodiments of the present disclosure, thereby improving the technology of aircraft (e.g., aircraft safety, thermal efficiency, range capability, payload capacity, structural integrity). The steps of method 2300 may be performable by, for example, system 1000 of FIG. 10 executing on or otherwise using the components of any aircraft of FIGS. 1-8, 9A-9E, 10-12, 13A-13D, 14-22, 24, 25, or any flight control computer (e.g., a computer-implemented method) or flight control system. For example, a flight control computer of the aircraft may be configured to perform one or more steps of method 2300.

The steps of method 2300 may be activated or adjusted as needed based on at least one aircraft flight condition, at least one maneuver, and/or at least one operational requirement. It is appreciated that the illustrated method 2300 can be altered to modify the order of steps and to include additional steps. It is also appreciated that the complexity of method 2300 would be impossible, or at the very least grossly impractical, to effectively implement by a human user, especially when considering that these functionalities are implemented (e.g., in real time) while the aircraft is flying (including taking off or landing), while energy used by the aircraft and battery and engine conditions are constantly changing. Moreover, engine thermal management (e.g., using method 2300) improves the safety and performance capabilities of the aircraft (e.g., how close the engines can get to max performance without exceeding a thermal limit) as well as lifespan of different components (e.g., batteries, engines), without requiring any direct involvement of a user (e.g., pilot). In some embodiments, the aircraft of system 1000 may comprise an electric aircraft including a plurality of effectors including a plurality of electric propulsion units (EPUs) and a plurality of battery packs that power the plurality of electric propulsion units.

In step 2302, system 1000 may determine one or more desired commands for the electric aircraft. For examples, the one or more desired commands may comprise at least one of one or more force or moment commands (e.g., input of control allocation 1029 of FIG. 10), a desired position and/or turn-rate command (e.g., output of turn-rate command model 1004 of FIG. 10), a desired position and/or lateral speed command (e.g., output of lateral speed command model 1006 of FIG. 10), one or more of a desired altitude, vertical speed, or vertical acceleration command (e.g., output of climb command model 1008 of FIG. 10), one or more of a desired position, longitudinal speed, or longitudinal acceleration command (e.g., output of forward speed command model 1010 of FIG. 10), an alternative command to achieve a desired change (e.g., based on feedback as discussed in FIG. 10), one or more total desired forces (e.g., calculated based on outputs of feedback 1012, 1012, 1016, 1018, 1022 and feed forward 1014, 1020 of FIG. 10), one or more moment commands (e.g., determined by inner loop control laws 1028 of FIG. 10), linear commands, angular acceleration commands, or any command associated with a desired motion (e.g., desired by a pilot of the aircraft, desired by the flight control system, desired by an autopilot system) of the aircraft in the form of a signal (e.g., pilot input from pilot input device, input from an autopilot system, signal generated by the flight control system or computer).

In step 2304, system 1000 may receive engine information for at least one (e.g., each) electric propulsion unit (EPU) of the plurality of EPUs. For example, system 1000 may also monitor an engine state of at least one (e.g., each) propulsion unit of the plurality of electric propulsion units. For example, system 1000 may receive, from at least one (e.g., each) EPU (e.g., via a digital communication interface, via inverter and/or processor of the EPU) of the plurality of EPUs, engine information (e.g., engine state) associated with the EPU. Engine information may include one or more of a temperature of at least one (e.g., each) engine (e.g., current temperature, predicted temperature, temperature relative to a limit), one or more limits associated with the at least one engine (e.g., temperature limits), a time associated with the temperature of at least one (e.g., each) engine (e.g., time remaining under current rating, such as continuous, takeoff, or emergency, time remaining until a limit (e.g., thermal limit) is reached), or a status (e.g., failure condition, engine(s) currently operating (e.g., active) and available for control, engine(s) currently inoperative and not available for control). In some embodiments, engine information may include one or more of an engine overheat torque limit, a projected endurance at max takeoff torque, or projected endurance at max emergency torque.

In step 2306, system 1000 may generate control commands for the plurality of effectors based on the received engine information. For example, system 1000 may generate control commands to manage (e.g., adjust, configure, set, and/or monitor) engine temperature to ensure that at least one (e.g., each) engine operates within safe parameters to prevent overheating and damage to engine components. In some embodiments, system 1000 may generate control commands that limit operations performed by at least one engine or other component of the aircraft, to reduce strain or risk to the associated component while still controlling effectors based on desired commands (e.g., having a minimized impact on a reference state, flight envelope, etc.). In some embodiments, system 1000 may determine an engine rated torque limit of at least one (e.g., each) engine. An engine rated limit may comprise a maximum torque that an engine may be capable of generating under normal (e.g., continuous) operating conditions. In some embodiments, system 1000 may determine the engine rated torque limit based on the received engine information. A detailed description of generating control commands (e.g., allocated torque command 2223 or torque command 2232) is provided in FIG. 22 description above. In some embodiments, generating control commands for the plurality of effectors may be further based on one or more aircraft conditions. For example, system 1000 may generate control commands based on current aircraft conditions.

In some embodiments, generating control commands may be further based on energy states of a plurality of battery packs. For example, system 1000 may monitor energy states of the plurality of battery packs. In some embodiments, system 1000 may be communicatively coupled (e.g., physical connection, such as bus and/or channel system, or via a digital communication interface) with one or more battery management systems ("BMSs") of the aircraft. In some embodiments, the aircraft may include a single BMS configured to manage all battery packs on the aircraft. In some embodiments, at least one (e.g., each) battery pack may include its own BMS. In some embodiments, system 1000 may receive battery information (e.g., energy state) associated with at least one (e.g., each) battery from one or more BMSs associated with the plurality of battery packs. Battery information may include one or more of a usable energy, a remaining discharge time (e.g., of at least one (e.g., each) cross-link, of at least one (e.g., each) independent high voltage bus, of at least one (e.g., each) high voltage channel), a state of energy (SOE), a state of charge (SOC), a state of power (SOP), a state of health (SOH), a failure condition (e.g., short circuit or overcurrent, whether the battery is active/functional), or a state of temperature (SOT) of at least one (e.g., each) battery pack.

In step 2308, system 1000 may control the plurality of effectors according to the generated control commands to meet (e.g., respond to, satisfy, address, be based upon) the desired commands of the electric aircraft. For example, system 1000 may send at least one (e.g., each) generated control command to its respective effector, which may move based on (e.g., in accordance with) the controlled command.

In some embodiments, method 2300 may result in optimized engine performance by maximizing a performance of at least one (e.g., each) engine while remaining under engine thermal limits. In effect, method 2300 may result in maximizing available range and may also increase safety by avoiding dangerous situations where one or more engines shut down due to thermal overload before the other engines and are no longer able to generate thrust.

Figure 24:
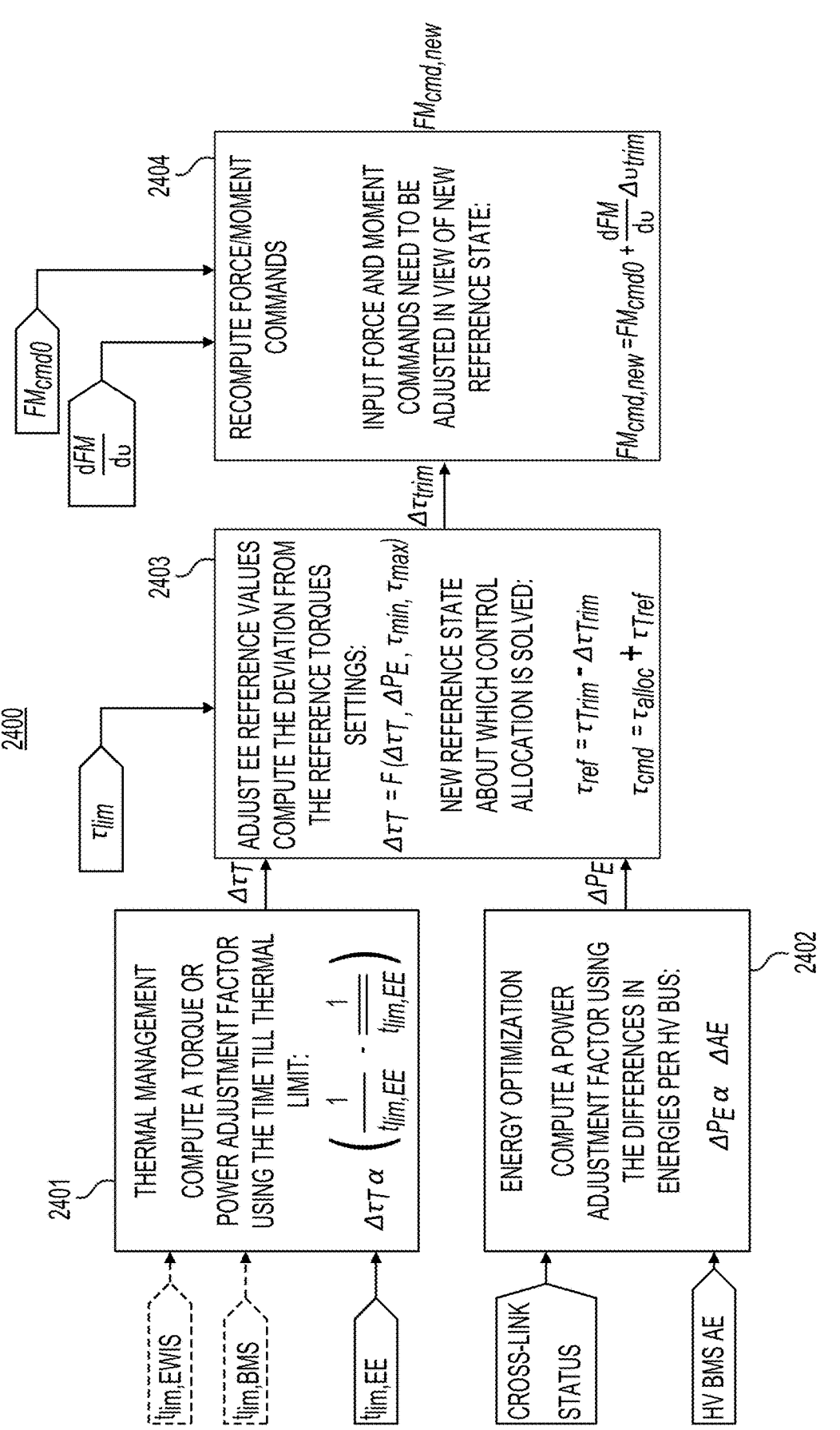
FIG. 24 illustrates a block diagram of an exemplary control system including energy optimizing and engine temperature optimizing functions, according to some embodiments.

FIG. 24 is a block diagram illustrating an exemplary method 2400 for engine thermal management and energy optimizing for a particular machine (e.g., an aircraft), according to various embodiments of the present disclosure, thereby improving the technology of the aircraft (e.g., aircraft safety, thermal efficiency, range capability, payload capacity, structural integrity). The steps of method 2400 may be performable by, for example, system 1000 of FIG. 10 executing on or otherwise using the components of any aircraft of FIGS. 1-8, 9A-9E, 10-12, 13A-13D, 14-23, 25, or any flight control computer (e.g., a computer-implemented method) or flight control system. For example, a flight control computer of the aircraft may be configured to perform one or more steps of method 2400. It is also appreciated that the complexity of method 2400 would be impossible, or at the very least grossly impractical, to effectively implement by a human user, especially when considering that these functionalities are implemented (e.g., in real time) while the aircraft is flying (including taking off or landing), while energy used by the aircraft and battery conditions are constantly changing. Moreover, energy optimization (e.g., using method 1200) improves the safety and range capabilities of the aircraft (e.g., how much energy is available for powering the aircraft) as well as lifespan of different components (e.g., batteries), without requiring any direct involvement of a user (e.g., pilot). It is further appreciated that while FIG. 24 depicts an example of energy optimization and thermal management associated with torque and power, FIG. 24 may alternatively or additionally be associated with any parameters related to aircraft effectors, such as speed and/or current. The steps of method 2400 may be activated or adjusted as needed based on aircraft flight conditions, maneuvers, or operational requirements. It is appreciated that the illustrated method 2400 can be altered to modify the order of steps and to include additional steps.

At step 2401, the thermal management function may compute at least one torque or power adjustment factor using at least one time remaining until at least one thermal limit is reached. In some embodiments, the thermal management function may be configured to receive one or more of battery information, electrical wiring interconnection system (EWIS) information, or engine information. In some embodiments, the thermal management function may receive the at least one (e.g., each) time remaining from at least one (e.g., each, multiple) engine. In some embodiments, the thermal management function may compute the at least one torque or power adjustment factor based on one or more of the received battery information, EWIS information, or engine information.

At step 2402, the energy optimizing function may compute a power adjustment factor using, for example, differences in available energies (AE) per bus. In some embodiments, the energy optimizing function may receive at least one cross-link status of a plurality of cross-link statuses. In some embodiments, the energy optimizing function may receive the differences in available energies per bus from at least one BMS.

At step 2403, the flight control system may be configured to adjust at least one electric engine reference value (e.g., reference command) based on values computed by the thermal management and energy optimizing functions. In some embodiments, the flight control system may determine a new reference state about which control allocation should be solved. In some embodiments, the flight control system may compute a deviation (e.g., difference) of a current state (e.g., configuration, effector positions, effector outputs) from the new reference state (e.g., associated with the at least one electric engine reference value, reference torque settings).

At 2404, the flight control system may be configured to recompute force/moment commands. A detailed description of recomputing force/moment commands is provided in FIG. 11 description above.

Figure 25A:
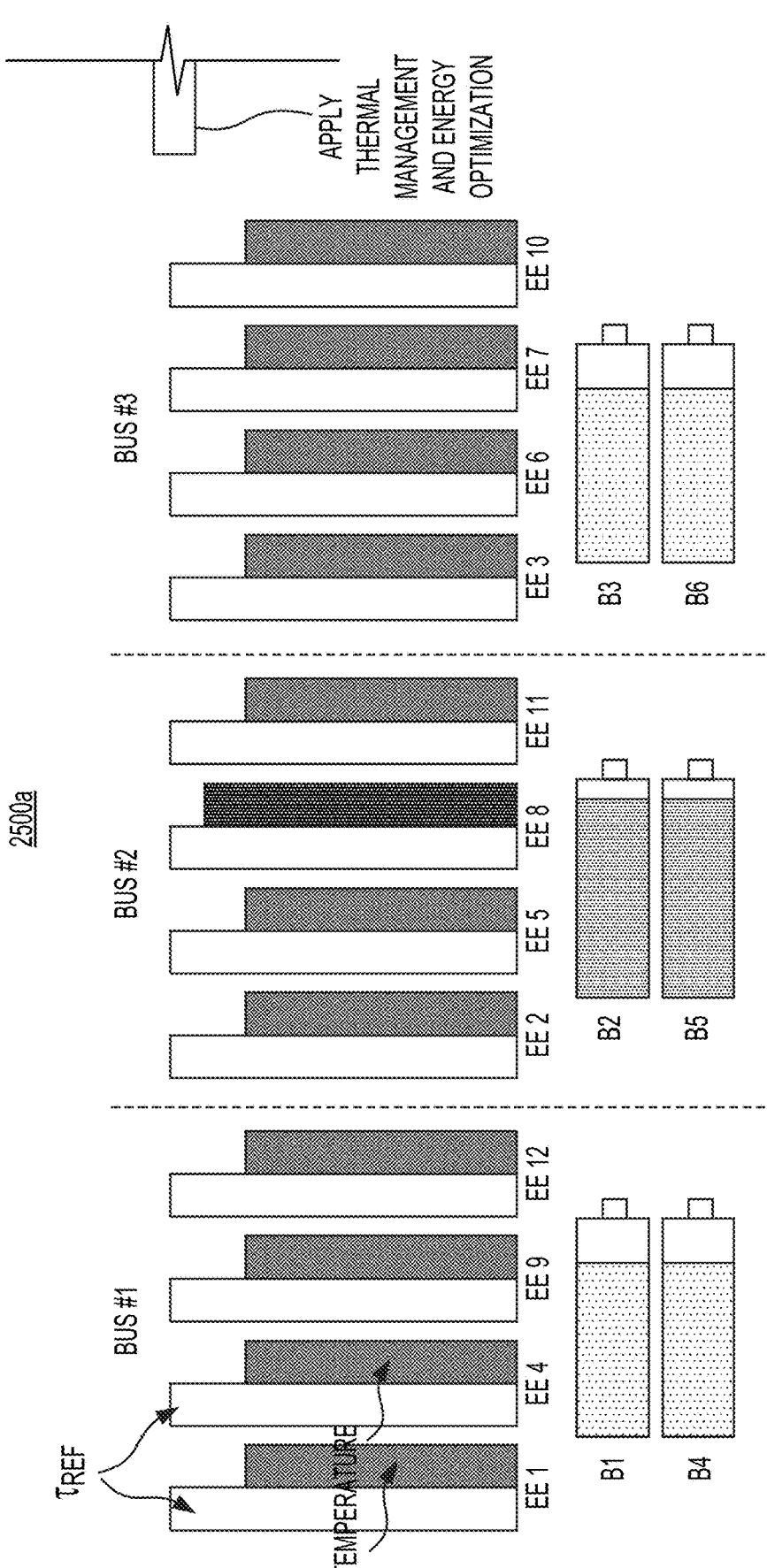
FIGS. 25A and 25B show an exemplary scenario implementing thermal management and energy optimization, according to some embodiments.
Figure 25B:
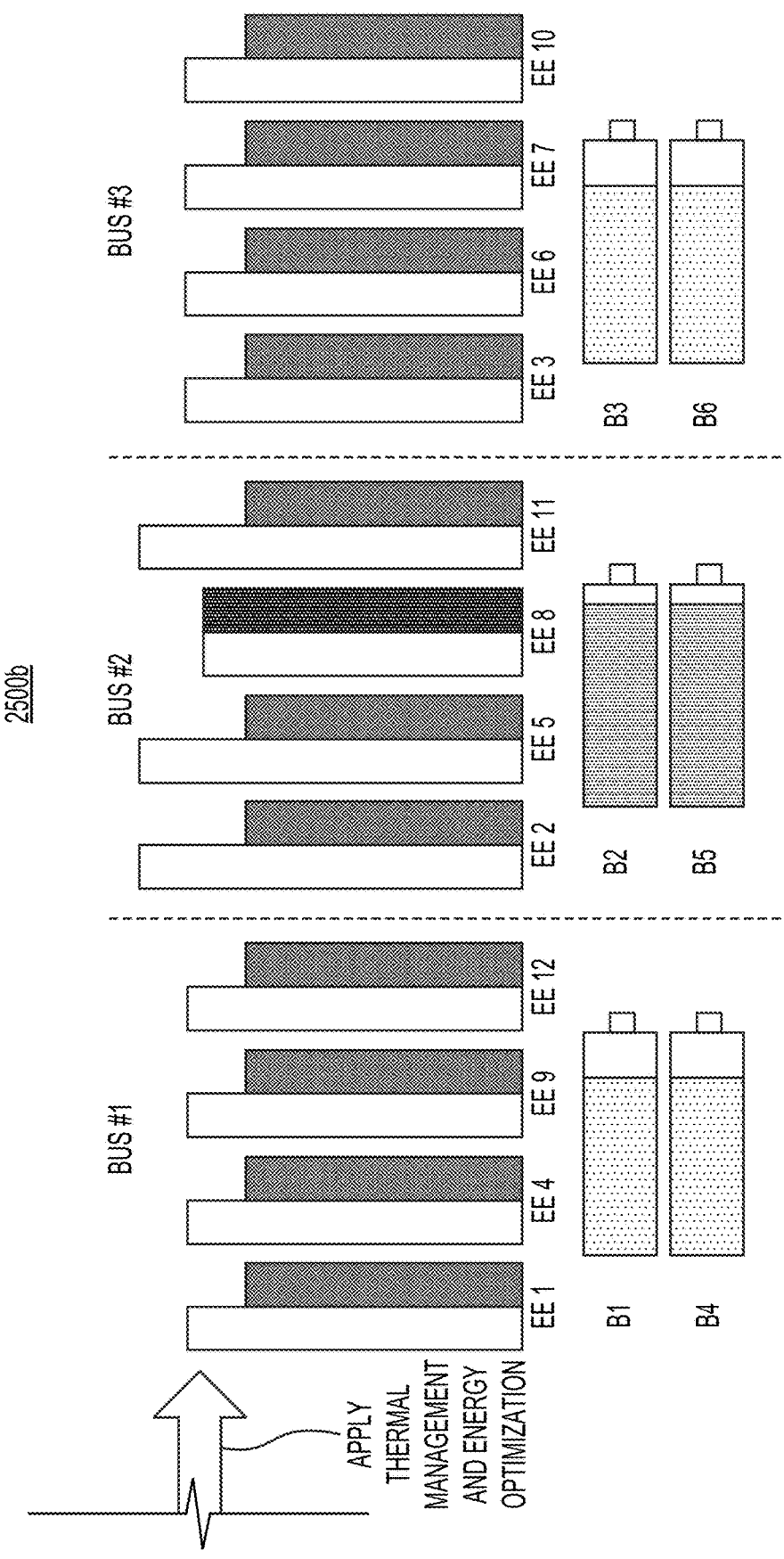

FIGS. 25A and 25B illustrate an exemplary scenario where both thermal management and energy optimizing are performed, according to some embodiments (e.g., using and/or according to system 1100, method 1200, method 2300, and/or method 2400). As shown in chart 2500a of FIG. 25A, all electric engines start with the same initial torque reference values (e.g., reference commands, $\tau_{ref}$), HV bus 2 has more energy than buses 1 and 3 (indicated by B2 and B5 being more full than B1 and B4 as well as B3 and B6), and electric engine (EE) 8 is hotter than the other engines. As shown in chart 2500b of FIG. 25B, thermal management and energy optimizing is performed by adjusting the initial torque reference values. For example, a reference value associated with electric engines 2, 5 and 11 of bus 2, which has the most available energy, is increased (e.g., to increase usage of electric engines 2, 5 and 11) while a reference value associated with electric engine 8 is decreased (e.g., to decrease usage relative to other engines). In addition, reference values associated with electric engines of buses 1 and 3 are adjusted such that a usage of engines associated with each of buses 1 and 3 is lower than a usage of engines 2, 5 and 11. Performing both thermal management and energy optimizing may result in full energy utilization on all HV buses while staying within engine thermal limits.

In some embodiments, the engine thermal management may be prioritized over energy optimizing. Alternatively, energy optimizing may be prioritized over engine thermal management.

Additional aspects of the present disclosure may be further described via the following clauses:

1. A computer-implemented method comprising:

determining one or more desired commands for an aircraft;

determining at least one reference command based on the one or more desired commands and one or more aircraft conditions;

monitoring energy states of a plurality of battery packs of the aircraft, wherein at least a first battery pack of the plurality of battery packs is electrically isolated from at least a second battery pack of the plurality of battery packs;

adjusting the at least one reference command based on the monitored energy states of the plurality of battery packs;

generating control commands for a plurality of effectors of the aircraft based on the adjusted at least one reference command; and controlling the plurality of effectors according to the generated control commands to meet the one or more desired commands of the aircraft.

2. The computer-implemented method of clause 1, wherein the monitored energy state includes a usable energy of the plurality of battery packs.

3. The computer-implemented method of clause 1 or 2, wherein the monitored energy state includes a remaining discharge time associated with one or more high voltage channels.

4. The computer-implemented method of any of clauses 1-3, wherein the monitored energy state includes a difference in energy states between at least two battery packs of the plurality of battery packs.

5. The computer-implemented method of any of clauses 1-4, wherein the monitored energy state includes a difference in power draw between at least a first engine and a second engine of a plurality of electric propulsion units of the aircraft.

6. The computer-implemented method of clause 5, wherein the first engine has a lower power draw than the second engine, and wherein the generated control commands cause a reduction in power draw from the second engine.

7. The computer-implemented method of any of clauses 1-6, wherein adjusting the at least one reference command is further based on a state of one or more engines of a plurality of electric propulsion units of the aircraft.

8. The computer-implemented method of any of clauses 1-7, wherein adjusting the at least one reference command includes updating one or more reference commands to optimize a remaining discharge time across one or more high voltage channels.

9. The computer-implemented method of any of clauses 1-8, wherein the at least one reference command comprises one or more of a reference engine command, a reference power command, a reference torque command, or a reference speed command.

10. The computer-implemented method of any of clauses 1-9, wherein the one or more aircraft conditions include one or more of vehicle dynamics, flight conditions, or a status of at least one aircraft component.

11. A computer-implemented method of controlling an aircraft that includes a plurality of effectors including a plurality of electric propulsion units and a plurality of battery packs that power the plurality of electric propulsion units, the method comprising:
  determining one or more desired commands for the aircraft;
  determining at least one reference command based on the desired commands and one or more aircraft conditions;
  monitoring energy states of the plurality of battery packs, wherein at least a first battery pack of the plurality of battery packs is electrically isolated from at least a second battery pack of the plurality of battery packs;
  adjusting the at least one reference command based on the monitored energy states of the plurality of battery packs;
  generating control commands for the plurality of effectors based on the adjusted at least one reference command; and
  controlling the plurality of effectors according to the generated control commands to meet the one or more desired commands of the aircraft.

12. A flight control computer comprising:
  one or more memory devices storing processor-executable instructions; and
  one or more processors configured to execute the instructions to cause the flight control computer to perform the computer-implemented method of any of clauses 1-11.

13. A non-transitory computer-readable medium having stored thereon computer-readable instructions that, when executed by at least one processor, cause the at least one processor to execute the computer-implemented method of any of clauses 1-11.

14. An aircraft comprising at least one flight control computer configured to perform the computer-implemented method of any of clauses 1-11.

15. A flight control system comprising:
  at least one memory storing instructions; and
  at least one processor configured to execute the instructions to perform the computer-implemented method of any of clauses 1-11.

16. A flight control system of an aircraft comprising:
  at least one memory storing instructions; and
  at least one processor configured to execute the instructions to perform one or more operations, the operations comprising:
    determining one or more desired commands for an aircraft;
    determining at least one reference command based on the one or more desired commands and one or more aircraft conditions;

monitoring energy states of a plurality of battery packs of the aircraft, wherein at least a first battery pack of the plurality of battery packs is electrically isolated from at least a second battery pack of the plurality of battery packs;
    adjusting the at least one reference command based on the monitored energy states of the plurality of battery packs;
    generating control commands for a plurality of effectors of the aircraft based on the adjusted at least one reference command; and
    controlling the plurality of effectors according to the generated control commands to meet the one or more desired commands of the aircraft.

17. The flight control system of clause 16, wherein the monitored energy state includes a usable energy of the plurality of battery packs.

18. The flight control system of clause 16 or 17, wherein the monitored energy state includes a remaining discharge time associated with one or more high voltage channels.

19. The flight control system of any of clauses 16-18, wherein the monitored energy state includes a difference in energy states between at least two battery packs of the plurality of battery packs.

20. The flight control system of any of clauses 16-19, wherein the monitored energy state includes a difference in power draw between at least a first engine and a second engine of a plurality of electric propulsion units of the aircraft.

21. The flight control system of clause 20, wherein the first engine has a lower power draw than the second engine, and wherein the generated control commands cause a reduction in power draw from the second engine.

22. The flight control system of any of clauses 16-21, wherein adjusting the at least one reference command is further based on a state of one or more engines of a plurality of electric propulsion units of the aircraft.

23. The flight control system of any of clauses 16-22, wherein adjusting the at least one reference command includes updating one or more reference commands to optimize a remaining discharge time across one or more high voltage channels.

24. The flight control system of any of clauses 16-23, wherein the at least one reference command comprises one or more of a reference engine command, a reference power command, a reference torque command, or a reference speed command.

25. The flight control system of any of clauses 16-24, wherein the one or more aircraft conditions include one or more of vehicle dynamics, flight conditions, or a status of at least one aircraft component.

26. A non-transitory computer-readable medium storing one or more instructions that, when executed by at least one processor, cause the at least one processor to perform operations comprising:
  determining one or more desired commands for an aircraft;
  determining at least one reference command based on the one or more desired commands and one or more aircraft conditions;
  monitoring energy states of a plurality of battery packs of the aircraft, wherein at least a first battery pack of the plurality of battery packs is electrically isolated from at least a second battery pack of the plurality of battery packs;

adjusting the at least one reference command based on the monitored energy states of the plurality of battery packs;

generating control commands for a plurality of effectors of the aircraft based on the adjusted at least one reference command; and controlling the plurality of effectors according to the generated control commands to meet the one or more desired commands of the aircraft.

27. A computer-readable medium having stored thereon computer-readable instructions that, when executed by at least one processor, cause the at least one processor to execute the method of any of clauses 1-11.

28. A computer-implemented method comprising:

determining one or more desired commands for an aircraft;

receiving engine information for at least one electric propulsion unit (EPU) of a plurality of EPUs of the aircraft, wherein the engine information includes at least one temperature associated with the at least one EPU;

generating control commands for a plurality of effectors of the aircraft based on the received engine information; and controlling the plurality of effectors according to the generated control commands to meet the one or more desired commands of the aircraft.

29. The computer-implemented method of clause 28, wherein the engine information further includes a time related to at least one temperature generated by the at least one EPU.

30. The computer-implemented method of clause 29, wherein the time is generated by determining a current temperature of each component of a plurality of engine components for at least one EPU.

31. The computer-implemented method of clause 30, wherein the time is generated by normalizing the determined temperature of the plurality of engine components, one or more engine components having different temperature limits, using time-based metric for temperature.

32. The computer-implemented method of clause 30, wherein the time is generated based on a prediction of a time remaining at a current torque rating associated with an engine of the EPU.

33. The computer-implemented method of any of clauses 28-32, wherein the engine information further includes a status of at least one engine associated with the plurality of EPUs.

34. The computer-implemented method of clause 33, wherein the status comprises one of active or inactive.

35. The computer-implemented method of any of clauses 28-34, wherein generating the control commands is further based on a maximum torque that an engine may be capable of producing under normal operating conditions.

36. The computer-implemented method of any of clauses 28-35, wherein generating the control commands is further based on one or more aircraft conditions.

37. The computer-implemented method of clause 36, wherein the one or more aircraft conditions include one or more of vehicle dynamics, flight conditions, or a status of at least one aircraft component.

38. The computer-implemented method of clause 29, wherein the time comprises a time remaining determined by a machine learning model of the engine.

39. The computer-implemented method of any of clauses 28-38, wherein the engine information further includes a temperature associated with an engine of the at least one EPU.

40. A method of controlling an aircraft that includes a plurality of effectors including a plurality of electric propulsion units (EPUs) and a plurality of battery packs that power the plurality of electric propulsion units, the method comprising:

determining one or more desired commands for the aircraft;

receiving engine information for at least one EPU of the plurality of EPUs, wherein the engine information includes at least one temperature associated with the at least one EPU;

generating control commands for the plurality of effectors based on the received engine information; and controlling the plurality of effectors according to the generated control commands to meet the one or more desired commands of the aircraft.

41. A flight control computer comprising:

one or more memory devices storing processor-executable instructions; and one or more processors configured to execute the instructions to cause the flight control computer to perform the computer-implemented method of any of clauses 28-40.

42. A non-transitory computer-readable medium having stored thereon computer-readable instructions that, when executed by at least one processor, cause the at least one processor to execute the computer-implemented method of any of clauses 28-40.

43. An aircraft comprising at least one flight control computer configured to perform the computer-implemented method of any of clauses 28-40.

44. A flight control system comprising:

at least one memory storing instructions; and at least one processor configured to execute the instructions to perform the computer-implemented method of any of clauses 28-40.

45. A flight control system of an aircraft comprising:

at least one memory storing instructions; and at least one processor configured to execute the instructions to perform one or more operations, the operations comprising:

determining one or more desired commands for an aircraft;

receiving engine information for at least one electric propulsion unit (EPU) of a plurality of EPUs of the aircraft, wherein the engine information includes at least one temperature associated with the at least one EPU;

generating control commands for a plurality of effectors of the aircraft based on the received engine information; and controlling the plurality of effectors according to the generated control commands to meet the one or more desired commands of the aircraft.

46. The flight control system of clause 45, wherein the engine information further includes a time related to at least one temperature generated by the at least one EPU.

47. The flight control system of clause 46, wherein the time is generated by determining a current temperature of each component of a plurality of engine components for at least one EPU.

48. The flight control system of clause 47, wherein the time is generated by normalizing the determined temperature of the plurality of engine components, one or more engine components having different temperature limits, using time-based metric for temperature.

49. The flight control system of clause 48, wherein the time is generated based on a prediction of a time remaining at a current torque rating associated with an engine of the EPU.

50. The flight control system of any of clauses 45-49, wherein the engine information further includes a status of at least one engine associated with the plurality of EPUs.

51. The flight control system of clause 50, wherein the status comprises one of active or inactive.

52. The flight control system of any of clauses 45-51, wherein generating the control commands is further based on a maximum torque that an engine may be capable of producing under normal operating conditions.

53. The flight control system of any of clauses 45-52, wherein generating the control commands is further based on one or more aircraft conditions.

54. The flight control system of clause 53, wherein the one or more aircraft conditions include one or more of vehicle dynamics, flight conditions, or a status of at least one aircraft component.

55. The flight control system of clause 46, wherein the time comprises a time remaining determined by a machine learning model of the engine.

56. The flight control system of any of clauses 45-55, wherein the engine information further includes a temperature associated with an engine of the at least one EPU.

57. A non-transitory computer-readable medium storing one or more instructions that, when executed by at least one processor, cause the at least one processor to perform operations comprising:
   determining one or more desired commands for an aircraft;
   receiving engine information for at least one electric propulsion unit (EPU) of a plurality of EPUs of the aircraft, wherein the engine information includes at least one temperature associated with the at least one EPU;
   generating control commands for a plurality of effectors of the aircraft based on the received engine information; and
   controlling the plurality of effectors according to the generated control commands to meet the one or more desired commands of the aircraft.

58. A computer-readable medium having stored thereon computer-readable instructions that, when executed by at least one processor, cause the at least one processor to execute the method of any of clauses 28-40.

59. An engine of an aircraft comprising:
   at least one memory storing instructions; and
   at least one processor configured to execute the instructions to perform one or more operations comprising, the operations comprising:
      determining one or more temperatures associated with one or more components of the engine; and
      estimating a time remaining for the engine at current power settings based on the determined one or more temperatures, wherein the estimated time remaining corresponds to a prediction of when the engine will reach one or more predetermined limits.

60. A computer-implemented method comprising:
   determining one or more desired commands for an electric aircraft;
   receiving engine information for at least one engine of at least one electric propulsion unit (EPU);
   receiving battery information for at least one battery pack;
   generating control commands for a plurality of effectors of the electric aircraft based on the received engine information and battery information; and
   controlling the plurality of effectors according to the generated control commands to meet the one or more desired commands of the electric aircraft.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer-readable medium that can direct one or more hardware processors of a computer, other programmable data processing apparatus, or other devices to function in a particular manner, such that the instructions stored in the computer-readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed (e.g., executed) on the computer, other programmable apparatus or other devices to produce a computer implemented process such that the instructions that execute on the computer or other programmable apparatus provide processes for implementing the functions/acts specified in the flowchart or block diagram block or blocks.

Any combination of one or more computer-readable medium(s) may be utilized. The computer-readable medium may be a non-transitory computer-readable storage medium. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber cable, RF, IR, etc., or any suitable combination of the foregoing.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. As used herein, unless specifically stated otherwise, being "based on" may include being dependent on, being interdependent with, being associated with, being defined at least in part by, being influenced by, or being responsive to. As used herein, "related to" may include being inclusive of, being expressed by, being indicated by, or being based on. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:

1. A computer-implemented method comprising:
   determining, using at least one hardware processor, one or more desired commands for an aircraft;
   determining, using the at least one hardware processor, a reference command for an effector based on the one or more desired commands and one or more aircraft conditions, the effector comprising at least one of an actuator, control surface, or propulsion unit;
   monitoring, using the at least one hardware processor, energy states of a plurality of battery packs of the aircraft, wherein at least a first battery pack of the plurality of battery packs is electrically isolated from at least a second battery pack of the plurality of battery packs;
   adjusting, using the at least one hardware processor, the reference command for the effector based on the monitored energy states of the plurality of battery packs, the adjusted reference command being configured to optimize a remaining discharge time across multiple high voltage channels of the aircraft;
   generating, using the at least one hardware processor, control commands for a plurality of effectors of the aircraft based on the adjusted reference command; and
   controlling, using the at least one hardware processor, the plurality of effectors according to the generated control commands to meet the one or more desired commands of the aircraft.

2. The computer-implemented method of claim 1, wherein the monitored energy states comprise a usable energy of the plurality of battery packs.

3. The computer-implemented method of claim 1, wherein the monitored energy states comprise a remaining discharge time associated with one or more high voltage channels.

4. The computer-implemented method of claim 1, wherein the monitored energy states comprise a difference in energy states between at least two battery packs of the plurality of battery packs.

5. The computer-implemented method of claim 1, wherein the monitored energy states comprise a difference in power draw between at least a first engine and a second engine of a plurality of electric propulsion units of the aircraft.

6. The computer-implemented method of claim 5, wherein the first engine has a lower power draw than the second engine, and wherein the generated control commands cause a reduction in power draw from the second engine.

7. The computer-implemented method of claim 1, wherein adjusting the reference command is further based on a state of one or more engines of a plurality of electric propulsion units of the aircraft.

8. The computer-implemented method of claim 1, wherein the reference command comprises one or more of a reference engine command, a reference power command, a reference torque command, or a reference speed command.

9. The computer-implemented method of claim 1, wherein the one or more aircraft conditions comprise at least one of vehicle dynamics, flight conditions, or a status of at least one aircraft component.

10. The computer-implemented method of claim 1, wherein adjusting the reference command is further based on a prediction of power usage by one or more components of the aircraft.

11. The computer-implemented method of claim 10, wherein the prediction of power usage is determined using simulation or historical data, the simulation or historical data comprising at least one of flight test data, weather data, route data, expected discharge data, range data, or battery health data.

12. The computer-implemented method of claim 1, wherein adjusting the reference command causes a remaining discharge time associated with a first battery pack of the plurality of battery packs to be within a predetermined difference from each remaining discharge time associated with the remaining battery packs of the plurality of battery packs.

13. The computer-implemented method of claim 1, further comprising:

determining, using the at least one hardware processor, based on the monitored energy states, a remaining discharge time associated with each bus of a plurality of buses configured to distribute energy from the plurality of battery packs, wherein adjusting the reference command based on the monitored energy states of the plurality of battery packs comprises adjusting the reference command based on the determined remaining discharge time associated with each bus.

14. The computer-implemented method of claim 1, wherein the reference command comprises a predetermined effector command associated with the one or more desired commands.

15. A flight control system comprising:

at least one memory storing instructions; and at least one processor configured to execute the instructions to perform one or more operations, the operations comprising:

determining one or more desired commands for an aircraft;

determining a reference command for an effector based on the one or more desired commands and one or more aircraft conditions, the effector comprising at least one of an actuator, control surface, or propulsion unit;

monitoring energy states of a plurality of battery packs of the aircraft, wherein at least a first battery pack of the plurality of battery packs is electrically isolated from at least a second battery pack of the plurality of battery packs;

adjusting the reference command based on the monitored energy states of the plurality of battery packs, the adjusted reference command being configured to optimize a remaining discharge time across multiple high voltage channels of the aircraft;

generating control commands for a plurality of effectors of the aircraft based on the adjusted reference command; and controlling the plurality of effectors according to the generated control commands to meet the one or more desired commands of the aircraft.

16. The flight control system of claim 15, wherein the monitored energy states comprise a usable energy of the plurality of battery packs.

17. The flight control system of claim 15, wherein the monitored energy states comprise a remaining discharge time associated with one or more high voltage channels.

18. The flight control system of claim 15, wherein the monitored energy states comprise a difference in energy states between at least two battery packs of the plurality of battery packs.

19. The flight control system of claim 15, wherein the monitored energy states comprise a difference in power draw between at least a first engine and a second engine of a plurality of electric propulsion units of the aircraft.

20. The flight control system of claim 19, wherein the first engine has a lower power draw than the second engine, and wherein the generated control commands cause a reduction in power draw from the second engine.

21. The flight control system of claim 15, wherein adjusting the reference command is further based on a state of one or more engines of a plurality of electric propulsion units of the aircraft.

22. The flight control system of claim 15, wherein the reference command comprises one or more of a reference engine command, a reference power command, a reference torque command, or a reference speed command.

23. The flight control system of claim 15, wherein the one or more aircraft conditions comprises one or more of vehicle dynamics, flight conditions, or a status of at least one aircraft component.

24. The flight control system of claim 15, wherein adjusting the reference command is further based on a prediction of power usage by one or more components of the aircraft.

25. The flight control system of claim 24, wherein the prediction of power usage is determined using simulation or historical data including one or more of flight test data, weather data, route data, expected discharge data, range data, or battery health data.

26. The flight control system of claim 15, further comprising:

determining, based on the monitored energy states, a remaining discharge time associated with each bus of a plurality of buses configured to distribute energy from the plurality of battery packs, wherein adjusting the reference command based on the monitored energy states of the plurality of battery packs comprises adjusting the reference command based on the determined remaining discharge time associated with each bus.

27. The flight control system of claim 15, wherein the reference command comprises a predetermined effector command associated with the one or more desired commands.

28. A non-transitory computer-readable medium storing one or more instructions that, when executed by at least one processor, cause the at least one processor to perform operations comprising:

determining one or more desired commands for an aircraft;

determining a reference command for an effector based on the one or more desired commands and one or more aircraft conditions, the effector comprising at least one of an actuator, control surface, or propulsion unit;

monitoring energy states of a plurality of battery packs of the aircraft, wherein at least a first battery pack of the plurality of battery packs is electrically isolated from at least a second battery pack of the plurality of battery packs;

adjusting the reference command based on the monitored energy states of the plurality of battery packs, the adjusted reference command being configured to optimize a remaining discharge time across multiple high voltage channels of the aircraft;

generating control commands for a plurality of effectors of the aircraft based on the adjusted reference command; and controlling the plurality of effectors according to the generated control commands to meet the one or more desired commands of the aircraft.

* * * * *